(12) United States Patent
Chen et al.

(10) Patent No.: US 10,523,850 B2
(45) Date of Patent: Dec. 31, 2019

(54) CAMERA DEVICE WITH ADJUSTABLE APERTURE

(71) Applicants: SINTAI OPTICAL (SHENZHEN) CO., LTD., Shenzhen, Guandong Province (CN); ASIA OPTICAL CO., INC., Taichung (TW)

(72) Inventors: Chien-hung Chen, Taichung (TW); Hsi-ling Chang, Taichung (TW); Chun-hung Huang, Taichung (TW)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 15/396,198

(22) Filed: Dec. 30, 2016

(65) Prior Publication Data

US 2017/0195530 A1 Jul. 6, 2017

(30) Foreign Application Priority Data

Dec. 30, 2015 (CN) .......................... 2015 1 1020384
Dec. 30, 2015 (CN) .......................... 2015 1 1027143

(51) Int. Cl.
*H04N 5/225* (2006.01)
*G02B 27/00* (2006.01)
(Continued)

(52) U.S. Cl.
CPC ........... *H04N 5/2252* (2013.01); *G02B 5/005* (2013.01); *G02B 9/60* (2013.01); *G02B 13/0045* (2013.01);
(Continued)

(58) Field of Classification Search
CPC ...... G02B 5/005; G02B 27/0006; G02B 9/60; G02B 13/0045; H04N 5/2252; H04N 5/2254
(Continued)

(56) References Cited

U.S. PATENT DOCUMENTS 4,609,273 A 9/1986 Kaise
5,659,821 A * 8/1997 Kawakita ................. G03B 9/18
310/328

(Continued)

FOREIGN PATENT DOCUMENTS

CN 1481065 A 3/2004
CN 101167346 A 4/2008
(Continued)

*Primary Examiner* — Clayton E. LaBalle
*Assistant Examiner* — Linda B Smith
(74) *Attorney, Agent, or Firm* — Muncy, Geissler, Olds & Lowe, P.C.

(57) ABSTRACT

A camera device is packaged inside an external shell of an electronic apparatus. The external shell has an opening. The camera device has a transparent plate, a part of which is adjacent to the opening of the external shell. The transparent plate forms an accommodating space for accommodating other components of the camera device. Thus, the dust can be prevented from falling into a shutter blade room of the camera device. The camera device also includes a shutter blade, a driver, and a plate. The plate has an aperture, and the aperture of the camera device is defined thereby. The aperture of the plate is completely pervious to light when the shutter blade is at a first position, and the aperture of the plate is partially pervious to light when the shutter blade is at a second position, thereby changing the aperture of the camera device.

28 Claims, 36 Drawing Sheets

(51) Int. Cl.
*G02B 13/00* (2006.01)
*G02B 9/60* (2006.01)
*G02B 5/00* (2006.01)

(52) U.S. Cl.
CPC ....... *G02B 27/0006* (2013.01); *H04N 5/2254* (2013.01)

(58) Field of Classification Search
USPC .......................................................... 396/452
See application file for complete search history.

(56) References Cited

U.S. PATENT DOCUMENTS

| | | | |
|---|---|---|---|
| 7,699,542 B2* | 4/2010 | Watanabe | H04M 1/0264 396/448 |
| 2004/0126106 A1 | 7/2004 | Horiike | |
| 2006/0029385 A1* | 2/2006 | Huang | G03B 9/08 396/452 |
| 2009/0052886 A1 | 2/2009 | Watanabe et al. | |
| 2010/0220993 A1 | 9/2010 | Sawanobori et al. | |
| 2012/0024126 A1 | 2/2012 | Numnual et al. | |
| 2013/0142503 A1 | 6/2013 | Kim et al. | |
| 2015/0086190 A1* | 3/2015 | Kozu | G03B 9/06 396/462 |

FOREIGN PATENT DOCUMENTS

| | | |
|---|---|---|
| CN | 101750841 A | 6/2010 |
| CN | 101819371 A | 9/2010 |
| JP | H02287446 A | 11/1990 |
| JP | 2001075145 A | 3/2001 |
| JP | 2005292355 A | 10/2005 |
| JP | 2006072161 A | 3/2006 |
| JP | 2007033602 A | 2/2007 |
| JP | 2007183490 A | 7/2007 |
| JP | 2010210955 A | 9/2010 |
| JP | 2015129869 | 7/2015 |
| KR | 20110014380 A | 2/2011 |
| KR | 101259026 B1 | 4/2013 |
| KR | 101272790 B1 | 6/2013 |

* cited by examiner

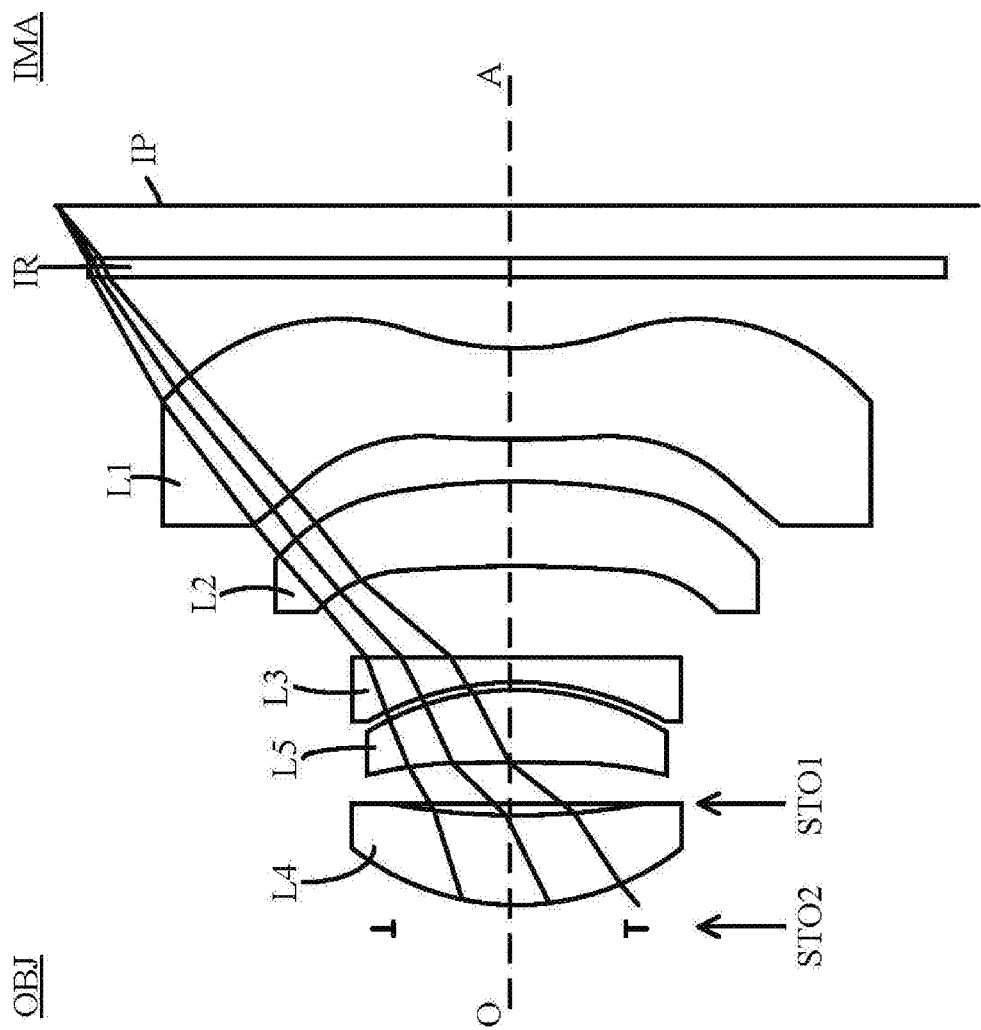

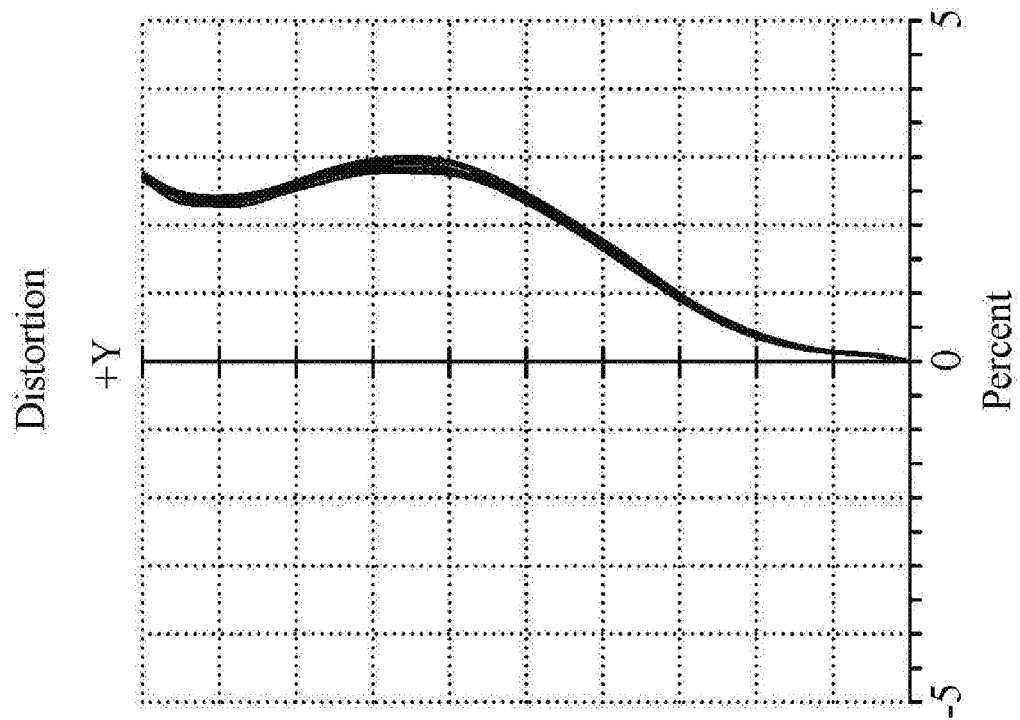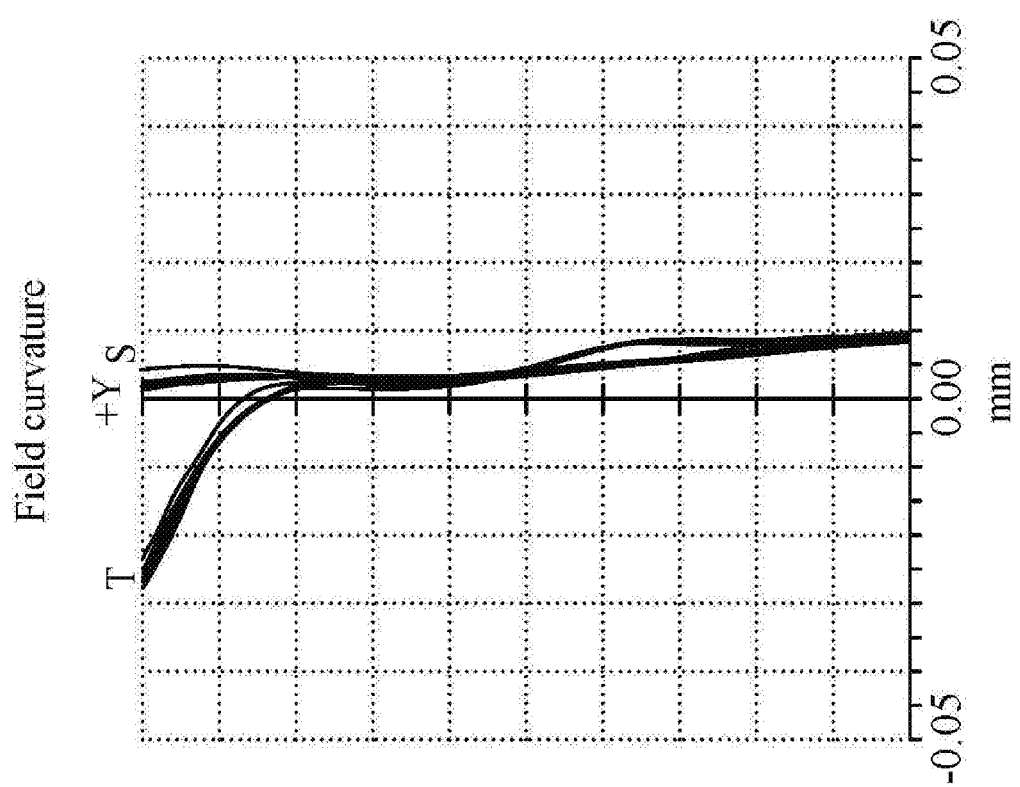
FIG. 11C

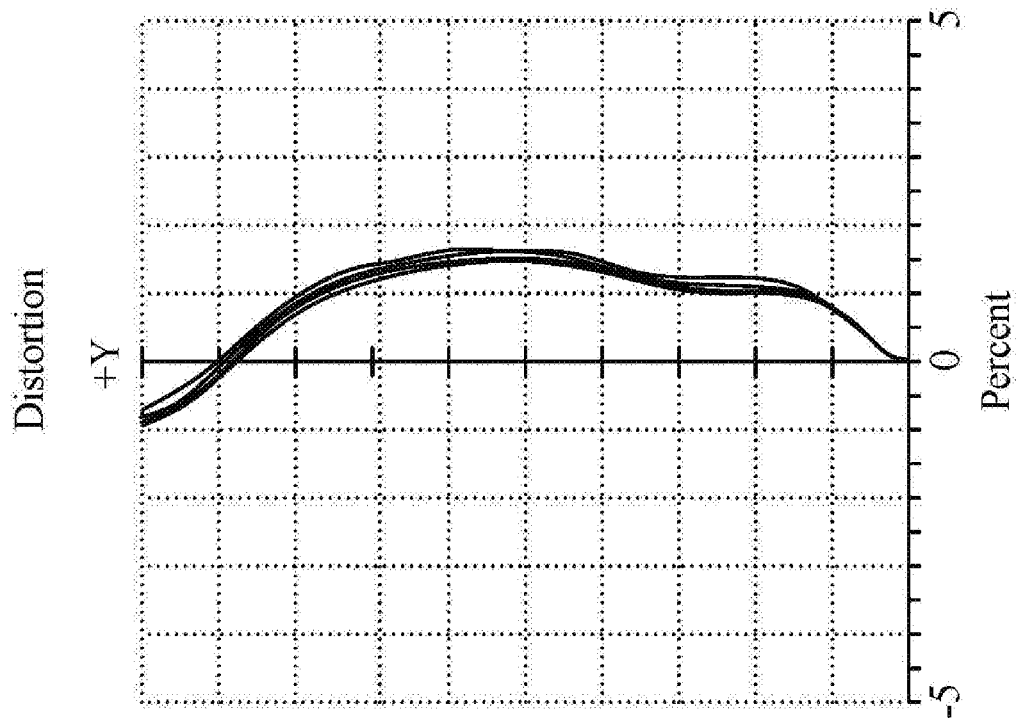
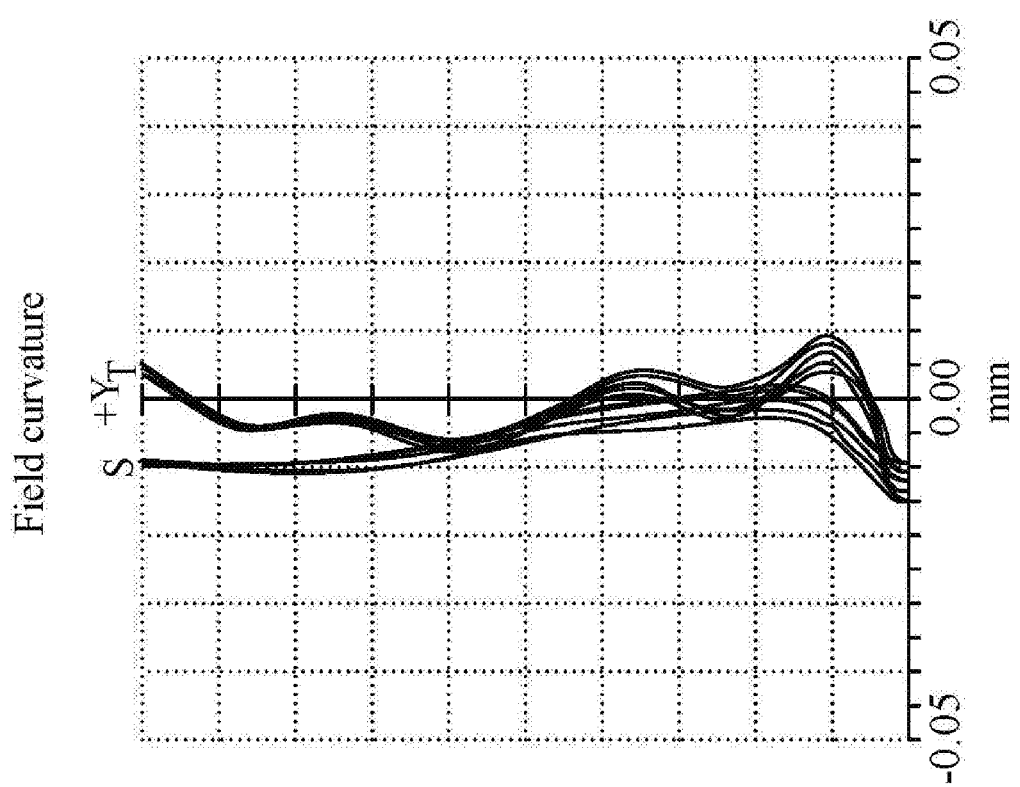
FIG. 12B

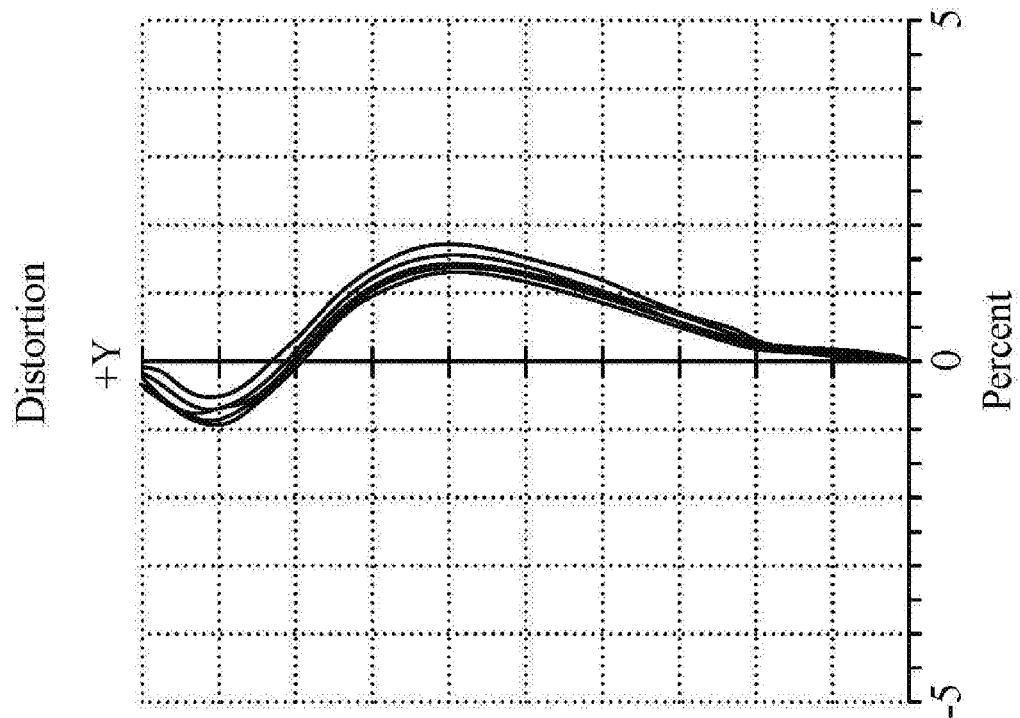
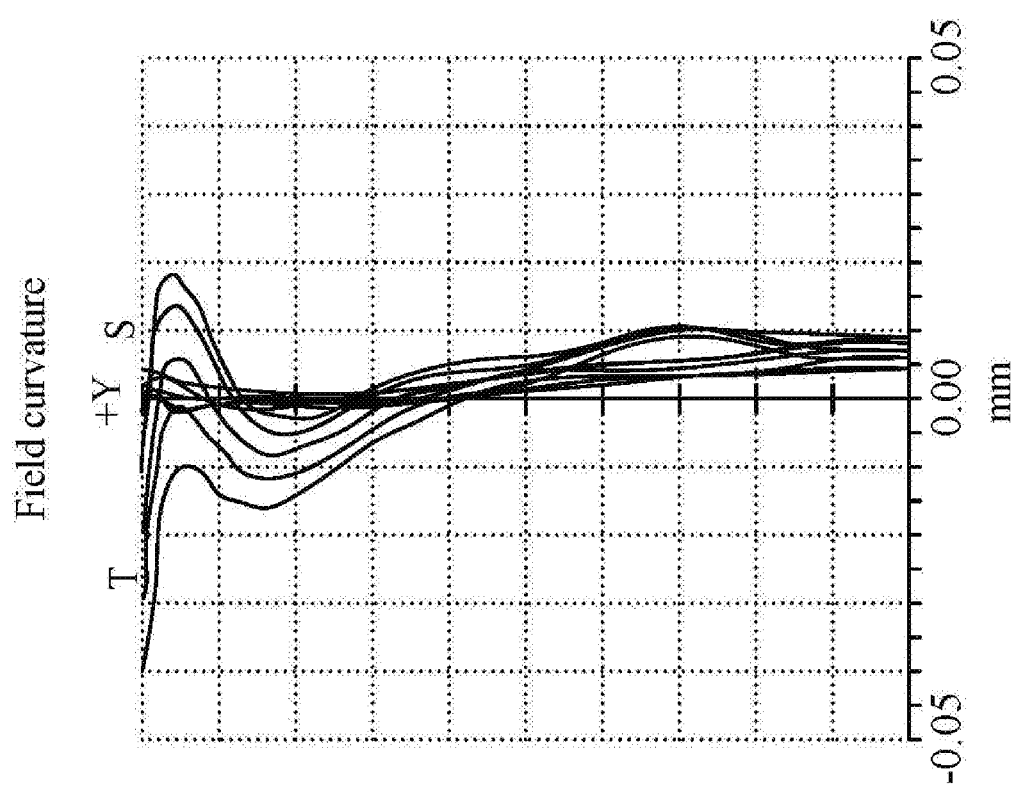
FIG. 13C

CAMERA DEVICE WITH ADJUSTABLE APERTURE

TECHNICAL FIELD OF THE DISCLOSURE

The present invention relates to a camera device, and more particularly, to a camera device with an adjustable aperture

BACKGROUND OF THE DISCLOSURE

In conventional skills, an electronic apparatus equipped with a camera usually has an opening disposed on an external shell thereof. Thus, light rays can be transmitted to the lenses of the camera via the opening for facilitating image formation. Generally, such an opening will be covered by a transparent plate for preventing the dust from falling into the inner part of the electronic apparatus. However, in order to be convenient for manufacture, the transparent plate is just adhered to an external surface of the external shell in the conventional skills. Using such an approach, it is difficult to prevent the dust from falling into a blade room of an aperture adjusting device if the camera is of an aperture-adjustable type. In addition, if the size and volume of the camera can be further reduced, the thickness of the electronic apparatus equipped with the camera can be reduced as well. The thickness of conventional electronic apparatus equipped with the camera is still far from perfect.

Further, an aperture-adjustable camera is only carried out by a digital still camera or a digital camcorder, for example. Although photographic ability can be increased for a smartphone or a tablet by equipping with an external camera lens and the aperture adjustment can be carried out by the external camera lens, the aperture of a camera on a mobile terminal usually is fixed. Based on the requirement of thickness of the mobile terminal, it is a tough problem in this technical field to deploy an aperture adjusting device into the mobile terminal. However, it is quite useful if the aperture adjusting function is brought out to the mobile terminal since it can change the depth of field and improve the quality of a captured picture. Therefore, how to bring out the aperture adjusting function to the mobile terminal is an important development direction in this technical field.

SUMMARY OF THE DISCLOSURE

An objective of the present invention is to provide a camera device for solving the technical problem caused by the dust falling into a blade room of an aperture adjusting device in the conventional skills.

Another object of the present invention is to provide a camera device for reducing the thickness of an electronic apparatus equipped with the camera device.

Another object of the present invention is to provide a camera device for carrying out an adjustment of aperture of a camera lens.

In an aspect, the present invention provides a camera device, which is disposed in an electronic apparatus, the electronic apparatus having an external shell with an opening exposed, the camera device having an optical system frame and a lens system deployed in the external shell of the electronic apparatus, the lens system being mounted on the optical system frame, the camera device comprising a bottom plate fastened to the optical system frame or formed by extending from the optical system frame, a cover plate fastened to the bottom plate and distanced away from the bottom plate, at least one shutter blade disposed between the cover plate and the bottom plate, configured to adjust an aperture of the camera device, and a transparent plate forming an accommodating space for accommodating the optical system frame, the bottom plate, and the cover plate, the transparent plate being located in the external shell and a part of the transparent plate being located between the bottom plate and the opening of the external shell, or between the cover plate and the opening of the external shell.

In another aspect, the present invention provides a camera device, which is disposed in an electronic apparatus, the electronic apparatus having an external shell with an opening exposed, the camera device having an optical system frame and a lens system deployed in the external shell of the electronic apparatus, the lens system being mounted on the optical system frame, the camera device comprising a bottom plate having a first opening, the bottom plate being fastened to the optical system frame or formed by extending from the optical system frame, the bottom plate further having a concave part formed thereon, a cover plate having a second opening, the cover plate being distanced away from the bottom plate, a fastening member having a base and an elongated part extending from the base, the base of the fastening member being accommodated in the concave part of the bottom plate, and the elongated part of the fastening member penetrating the concave part of the bottom plate and being fastened to the cover plate, and at least one shutter blade disposed between the cover plate and the bottom plate, configured to adjust an aperture of the camera device, wherein light rays are transmitted to the lens system sequentially via the opening of the external shell, the first opening of the bottom plate, and an aperture established by the shutter blade, and the second opening of the cover plate, or emitted out from the opening of the external shell in a reverse order.

In still another aspect, the present invention provides a camera device with adjustable aperture, comprising an optical system frame, a lens system mounted on the optical system frame, a plate configured to be fastened to the optical system frame or be formed by extending the optical system frame, the plate having an aperture; a shutter blade coupled to the plate, the aperture of the plate being completely pervious to light when the shutter blade is at a first position, the aperture of the plate being partially pervious to light when the shutter blade is at a second position, and a driver connecting to the shutter blade for causing a displacement of the shutter blade.

In another aspect, the present invention provides a camera device, which is disposed in an electronic apparatus, the electronic apparatus having an external shell with an opening exposed, the camera device having an optical system frame and an optical system deployed in the external shell of the electronic apparatus, the lens system being mounted on the optical system frame, the optical system comprising the present invention provides an optical lens, which makes object light rays transmit from an object side to an image side on an optical axis and form an image on an image plane, said optical lens comprising a lens group establishing the optical axis, comprising a first lens and a second lens arranged in order from the image side to the object side, wherein the first lens has an image-side surface which is a concave face and has a point of inflection arranged thereon, a first aperture stop and a second aperture stop separately located on the optical axis.

In still another aspect, the present invention provides a camera device, which is disposed in an electronic apparatus, the electronic apparatus having an external shell with an opening exposed, the camera device having an optical system frame and an optical system deployed in the external shell of the electronic apparatus, the lens system being mounted on the optical system frame, the optical system comprising a lens group establishing the optical axis, a first aperture stop disposed within the lens group and a second aperture stop disposed at the object side outside the lens group.

In another aspect, the present invention provides a camera device, which is disposed in an electronic apparatus, the electronic apparatus having an external shell with an opening exposed, the camera device having an optical system frame and a lens system deployed in the external shell of the electronic apparatus, the lens system being mounted on the optical system frame, the camera device comprising a bottom plate fastened to the optical system frame or formed by extending from the optical system frame, a cover plate fastened to the bottom plate and distanced away from the bottom plate, at least one shutter blade disposed between the cover plate and the bottom plate, configured to adjust an aperture of the camera device, and a transparent plate forming an accommodating space for accommodating the optical system frame, the bottom plate, and the cover plate, the transparent plate being located in the external shell and a part of the transparent plate being located between the bottom plate and the opening of the external shell, or between the cover plate and the opening of the external shell, wherein a lens system comprises a first lens, a first aperture stop, a second lens and a second aperture stop arranged in order from the image side to the object side.

In the embodiments of the present invention, the shutter blade of the aperture-adjustable device is deployed between the exposed opening of the external shell and the outermost lens of the lens system. Therefore, there has more room at the lateral side for accommodating the driver or other components of the aperture-adjustable device. Further, a part of the transparent plate is arranged corresponding to the opening and abuts on the external shell. The transparent plate is fastened to or adhered on the optical system frame. Every component of the camera devices is disposed in the accommodating space formed by the transparent plate. Therefore, this can further prevent the dust from falling into a blade room of the aperture-adjustable device accommodating the shutter blade and prevent a user finger from touch. In addition, the cover plate can be disposed within coverage of the bottom plate. It is easy to process the optical system frame made of a plastic material to remove or cut out some parts thereof for deploying a room accommodating the fastening member, thereby reducing the total thickness of the camera device.

In the embodiments of the present invention, the shutter blade has a hole having an aperture. The aperture of a camera lens can be adjusted by driving the shutter blade using a driver and thus making the hole move toward the optical axis and shift to a position overlapping the original aperture. There can have multiple sets of the shutter blade and the driver so as to carry out a multi-stage aperture adjustment of the camera lens. An adjustment of depth of field can thus be carried out by a selection of aperture. In addition, in the embodiments of the present invention, one shutter blade is cooperated with one driver. It is convenient in replacement when these components are malfunctioned.

BRIEF DESCRIPTION OF THE DRAWINGS

FIG. 10A is a schematic diagram showing an optical structure in accordance with a fifth embodiment of an optical lens of the present invention.

FIG. 11C is a diagram showing the optical performance including field curvature and distortion of the optical lens according to the sixth embodiment of the present invention in the condition that the first aperture stop is in the inactive state and the second aperture stop is in the active state.

FIG. 12B is a diagram showing the optical performance including field curvature and distortion of the optical lens according to the seventh embodiment of the present invention in the condition that a first aperture stop is in an active state and a second aperture stop is in an inactive state.

FIG. 13C is a diagram showing the optical performance including field curvature and distortion of the optical lens according to the eighth embodiment of the present invention in the condition that the first aperture stop is in the inactive state and the second aperture stop is in the active state.

DETAILED DESCRIPTION OF THE DISCLOSURE

To make the objectives, technical schemes, and technical effects of the present invention more clearly and definitely, the present invention will be described in details below by using embodiments in conjunction with the appending drawings. It should be understood that the specific embodiments described herein are merely for explaining the present invention, and as used herein, the term "embodiment" refers to an instance, an example, or an illustration but is not intended to limit the present invention. In addition, the articles "a" and "an" as used in the specification and the appended claims should generally be construed to mean "one or more" unless specified otherwise or clear from the context to be directed to a singular form. Also, in the appending drawings, the components having similar or the same structure or function are indicated by the same reference number.

Figure 1:
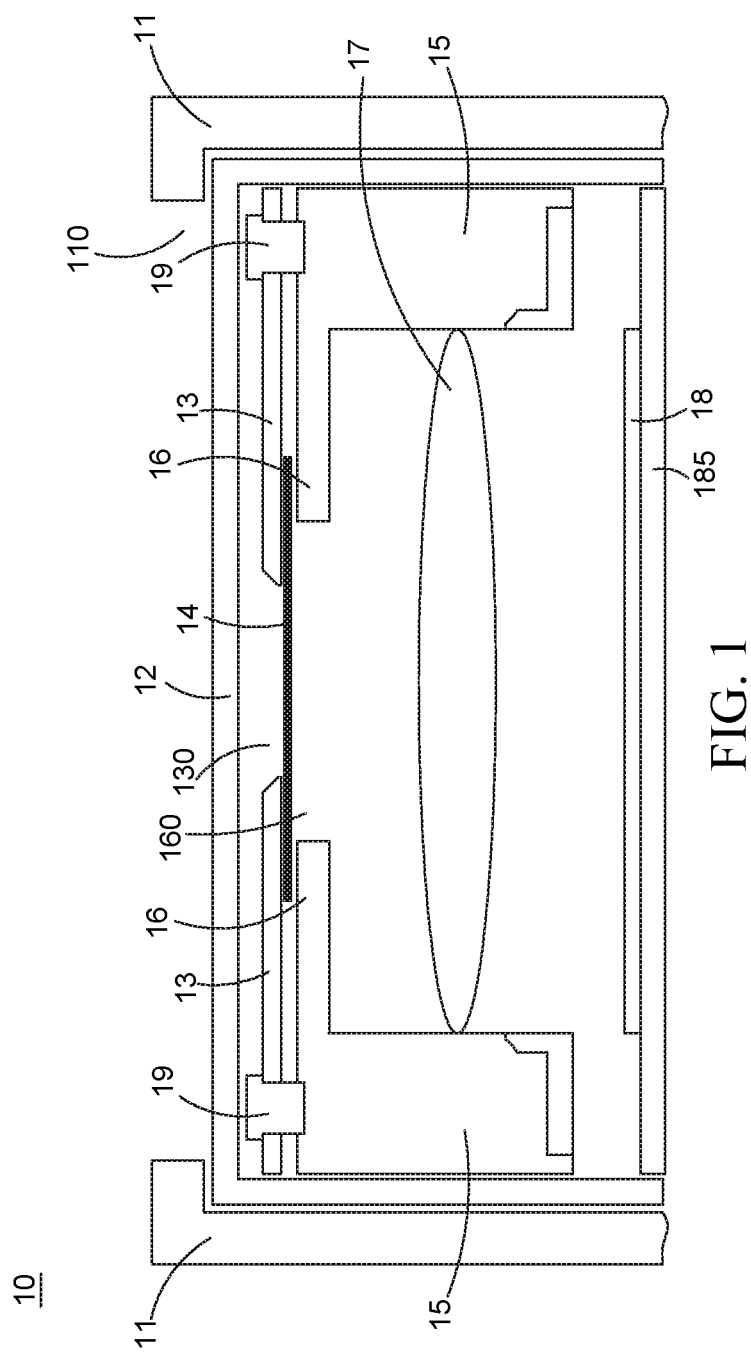
FIG. 1 is a schematic diagram showing a camera device in accordance with a first embodiment of the present invention.
Figure 2:
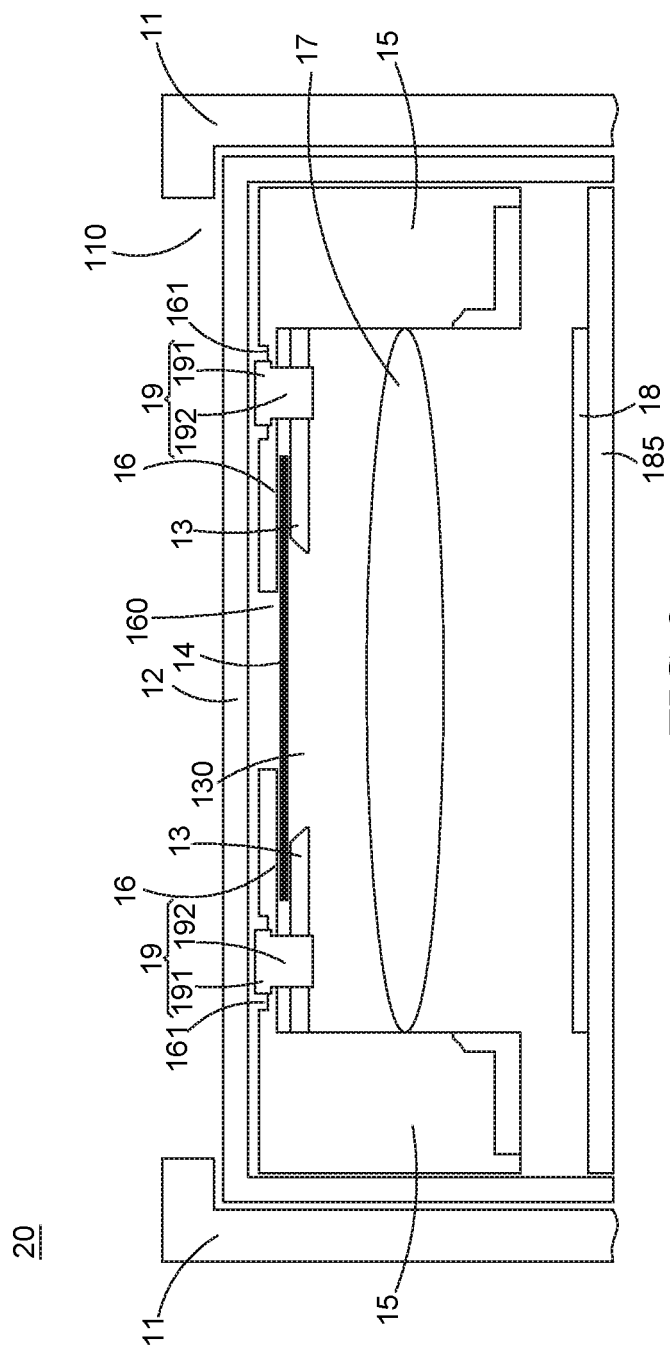
FIG. 2 is a schematic diagram showing a camera device in accordance with a second embodiment of the present invention.

Please refer to FIG. 1, which is a schematic diagram showing a camera device 10 in accordance with a first embodiment of the present invention. The camera device 10 is disposed in an electronic apparatus. For example, cell phones, smartphones, tablet computers, wearable devices, handheld game players, and other mobile terminals equipped with a camera lens are applicable to the electronic apparatuses. The electronic apparatuses can also be implemented by cameras or video recorders having a camera lens inherently, or by apparatuses having optical systems, such as projectors. The electronic apparatus has a shell or an external shell 11. Necessary electronic components or structural components supporting the electronic components are disposed inside the external shell 11. The external shell 11 is the outermost shell of the electronic apparatus. The external shell 11 has an opening 110 exposed. Light rays can go into the inner space of the camera device 10 (such as an image capture device) from the opening 110 or be emitted out from the inner space of the camera device 10 (such as a projector) via the opening 110. Taking a camera lens for example, the camera device 10 will be illustrated in the following.

As shown in FIG. 1, the camera device 10 has an optical system frame 15, a lens system 17, and an image recorder 18. The optical system frame 15 is made of a plastic material, and is a fastening component of the optical system. The components of the optical system can be mounted or fastened on the optical system frame 15. In addition, there is only one piece of lens shown in FIG. 1 but this is merely for illustration. It can be understood that the lens system 17 may include more than one lenses. The lenses of the lens system 17 are mounted on the optical system frame 15. The image recorder 18 is disposed on a lower plate 185 and is configured to record images. Specifically, the image recorder 18 can receive the light rays passing the lens system 17 and form an image on an image plane.

Referring to FIG. 1, the camera device 10 having a camera lens also has a transparent plate 12, a cover plate 13, a bottom plate 16, and at least one shutter blade 14. The transparent plate 12 adopts a high-transparent material. The transparent plate 12 is disposed at an inner side of the external shell 11 and adjacent to the exposed opening 110 of the external shell 11, and is fastened on the optical system frame 15. The transparent plate 12 forms an accommodating space. The optical system frame 15, the bottom plate 16, and the cover plate 13 are placed into the accommodating space formed by the transparent plate 12. The transparent plate 12 can be completely made of the high-transparent material. Alternatively, only a part of the transparent plate 12 corresponding to the exposed opening 110 of the external shell 11 is made of the high-transparent material, and the material of other parts is not limited. Further, a part of the transparent plate 12 is disposed between the exposed opening 110 of the external shell 11 and the cover plate 13. The bottom plate 16 is fastened to the optical system frame 15 or extending from the optical system frame 15. The bottom plate 16 also has an opening 16. The cover plate 13 is a metal flat plate, and is perforated to form an opening 130 in the center such that light rays can transmit into the optical system. The cover plate 13 is distanced away from the bottom plate 16, and is fastened to the bottom plate 16 or the optical system frame 15. A screw 19 may be used to fasten the cover plate 13 to the bottom plate 16 or the optical system frame 15. The shutter blade 14 is a part of components of an aperture adjusting device of the camera lens, and is driven by a driver of the aperture adjusting device. The size of aperture is adjusted by adjusting the position of the shutter blade 14. The shutter blade 14 is disposed between the cover plate 13 and the bottom plate 16 fastened to the optical system frame 15 or extending from the optical system frame 15, and is configured to adjust the aperture. It is known that as to the package framework of the camera device 10, a part of the transparent plate 12, the cover plate 13, the shutter blade 14, the bottom plate 16, the lens system 17, and the image recorder 18 are arranged in order from the exposed opening 110 of the external shell 11 to the lower plate 185. In addition, the light rays transmit into the lens system 17 sequentially via the exposed opening 110 of the external shell 11, a part of the transparent plate 12, the opening 130 of the cover plate 13, the aperture established by the shutter blade 14, and the opening 160 of the bottom plate 16. In other applications (e.g., projectors), the light rays may be emitted out from the exposed opening 110 of the external shell 11 in a reverse order.

In addition, the lens system 17 may include at least two pieces of lenses and an aperture stop disposed between the two lenses or between the set of the two lenses and the image plane. For instance, the aperture established by the shutter blade 14 is an adjustable aperture while the aperture of the aperture stop arranged in the lens system 17 is a fixed aperture. The aperture established by the shutter blade 14 is smaller than or equal to the aperture of the aperture stop arranged in the lens system 17. The aperture of the optical system is defined by the aperture established by the shutter blade 14 when a small aperture is required by the optical system. The aperture of the optical system is defined by the aperture of the aperture stop arranged in the lens system 17 when a large aperture is required by the optical system. For instance, when a small aperture is required, the aperture established by the shutter blade 14 is adjusted to decrease the size of aperture thereof. The aperture stop arranged in the lens system 17 ceases to be effective due to the evolution of light path and is thus in an inactive state. When a large aperture is required, the aperture established by the shutter blade 14 is adjusted to be equal to the aperture of the aperture stop arranged in the lens system 17, and meanwhile the aperture of the optical system is defined by the aperture of the aperture stop arranged in the lens system 17. In this way, an aperture-adjustable device having the shutter blades 14 can be deployed at the outer side of the lens at the most object side. Since there has more room for accommodating such an aperture-adjustable device in this configuration, the size of the camera device 10 can be reduced.

In the embodiments of the present invention, the shutter blade 14 of the aperture-adjustable device is deployed between the exposed opening 110 of the external shell 11 and the outermost lens of the lens system 17. Therefore, there has more room at the lateral side for accommodating the driver or other components of the aperture-adjustable device. If the shutter blade 14 of the aperture-adjustable device is arranged between any two lenses, the deployment of the driver or other components of the aperture-adjustable device will be limited and such a deployment is more complicated and inconvenient. Further, in the embodiments of the present invention, a part of the transparent plate 12 is arranged corresponding to the opening 110 and abuts on the external shell 11. The transparent plate 12 is fastened to or adhered on the optical system frame 15. Every component of the camera devices is disposed in the accommodating space formed by the transparent plate 12. Therefore, this can further prevent the dust from falling into a blade room of the aperture-adjustable device accommodating the shutter blade 14 and prevent a user finger from touch.

The differences between the camera device 20 of the second embodiment and the camera device 10 of the first embodiment are that in the second embodiment of the present invention, the cover plate 13 is disposed within coverage of the bottom plate 16, and the bottom plate 16 is arranged at an upper side while the cover plate 13 is changed in its position to be at a lower side. A fastening member (e.g., a screw) 19 is utilized to fasten the cover plate 13 to the bottom plate 16 or the optical system frame 15. The shutter blade 14 is accommodated between the cover plate 13 and the bottom plate 16. Specifically, the bottom plate 16 has a concave part 161. The fastening member 19 has a base 191 and an elongated part 192 extending from the base 191. The base 191 of the fastening member 19 is accommodated into the concave part 161 of the bottom plate 161. The elongated part 192 of the fastening member 19 penetrates the concave part 161 of the bottom plate 16 and is fastened on the cover plate 13. In addition, as to the package framework of the camera device 20, a part of the transparent plate 12, the bottom plate 16, the shutter blade 14, the cover plate 13, the lens system 17, and the image recorder 18 are arranged in order from the exposed opening 110 of the external shell 11 to the lower plate 185. In addition, the light rays transmit into the lens system 17 sequentially via the exposed opening 110 of the external shell 11, a part of the transparent plate 12, the opening 160 of the bottom plate 16, the aperture established by the shutter blade 14, and the opening 130 of the cover plate 13. In other applications (e.g., projectors), the light rays may be emitted out from the exposed opening 110 of the external shell 11 in a reverse order. The advantages of such a technical scheme are that it is easy to process the optical system frame 15 made of a plastic material to remove or cut out some parts thereof for deploying a room accommodating the fastening member, thereby reducing the total thickness of the camera device.

The present invention can also have the camera device equipped with a aperture adjusting function such that an adjustment of depth of field can be carried out by a selection of aperture when a user takes pictures using the camera device on a mobile terminal, for example.

Figure 3:
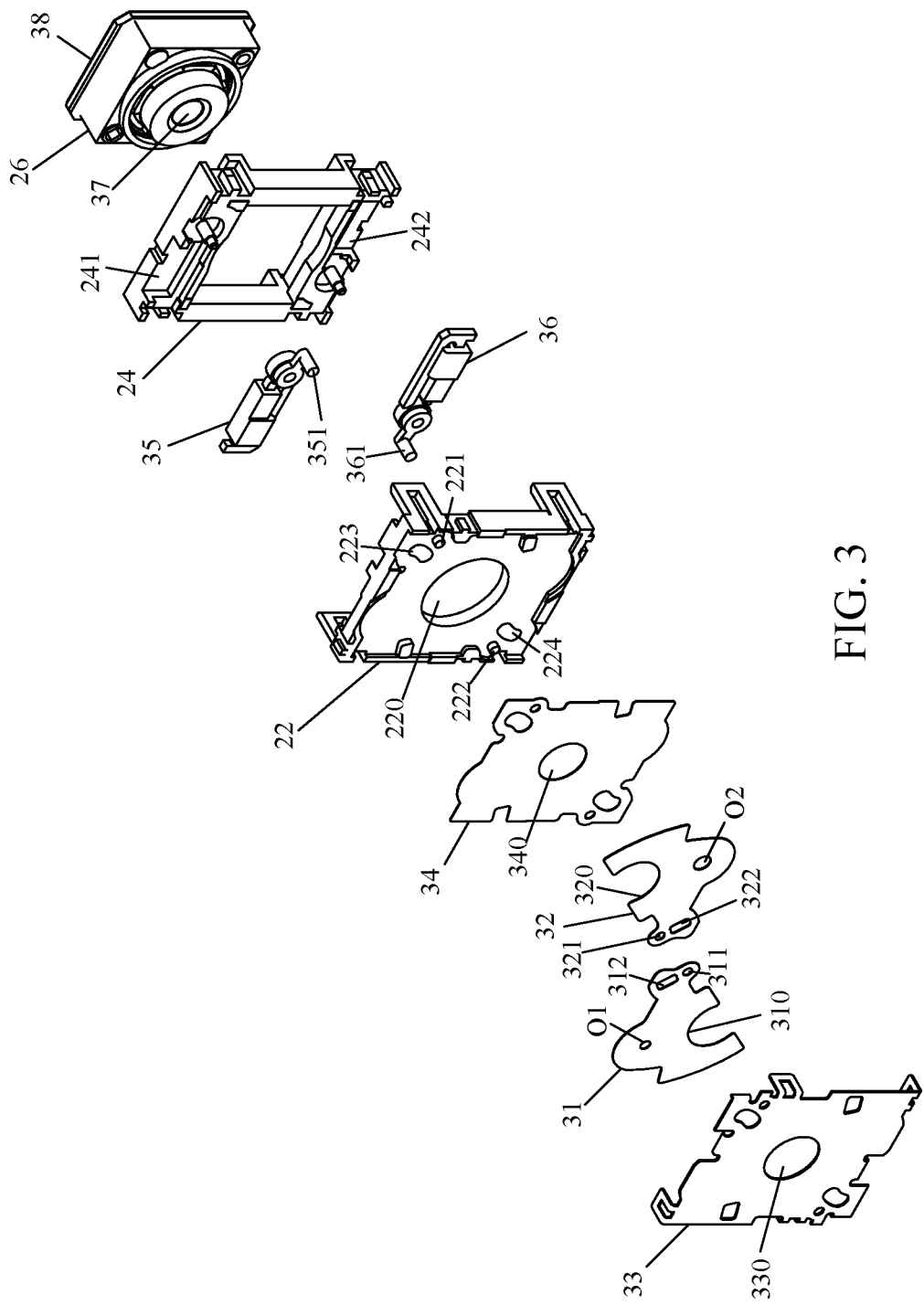
FIG. 3 is an exploded view of a camera device with adjustable aperture in accordance with a third embodiment of the present invention.

Please refer to FIG. 3, which is an exploded view of a camera device with adjustable aperture in accordance with a third embodiment of the present invention. As shown in FIG. 3, the camera device of the third embodiment of the present invention includes a supporting base 22, a driver supporting base 24, and a lens supporting base 26. The camera device further includes a first shutter blade 31, a second shutter blade 32, a cover plate 33, a bottom plate 34, a first driver 35, a second driver 36, a lens system 37, and an image recorder 38. As shown in the embodiment depicted in FIG. 3, the first shutter blade 31, the second shutter blade 32, the cover plate 33, and the bottom plate 41 can be mounted on the supporting base 22. The first driver 35 and the second driver 36 can be mounted on the driver supporting base 24. The lens system 37 and the image recorder 38 can be deployed on the lens supporting base 26.

It should be noted that the afore-described deployment is merely for illustration, and the supporting base 22, the driver supporting base 24, and the lens supporting base 26 may not be clearly distinguished. They can be deemed as an optical system frame, or any two of them can be combined into one entity, or at least two of the supporting base 22, the driver supporting base 24, and the lens supporting base 26 or all of them are integratedly formed or made of a same material. In this way, the size of overall camera device can be reduced. For instance, the driver supporting base 24 and the lens supporting base 26 can be manufactured to be an integratedly-formed supporting base.

Specifically, the bottom plate 34 is fastened on the supporting base 22. Alternatively, the bottom plate 34 can also be formed by extending from the supporting base 22, or is just a part of the supporting base 22. The cover plate 33 is distanced a part from the bottom plate 34. Preferably, the cover plate 33 is fastened to the supporting base 22. Various types of ways may be utilized to fasten the cover plate 33 to the supporting base 22. For instance, the cover plate 33 has some branches while supporting base 22 has slots corresponding to the branches. By engaging the branches and the slots, the cover plate 33 can thus be fastened on the supporting base 22.

The cover plate 33 and the bottom plate 34 are separated from each other. An accommodating space is formed between the cover plate 33 and the bottom plate 34, and is configured to accommodate the first shutter blade 31 and the second shutter blade 32, which are utilized to change or adjust the effective aperture of the camera device. In addition, as shown in FIG. 3, the driver supporting base 24 has a first accommodating room 241 and a second accommodating room 242 for accommodating the first driver 35 and the second driver 36, respectively. The first driver 35 is configured to drive the first shutter blade 31 and bring about a displacement of the first shutter blade 31, and the second driver 36 is configured to drive the second shutter blade 32 and bring about a displacement of the second shutter blade 32, thereby changing or adjusting the effective aperture of the camera device. Preferably, the first driver 35 and the second driver 36 are implemented by an electric motor such as a current-control-type electric motor. The first driver 35 and the second driver 36 can adopt a structure or configuration as the same as that of a conventional electric motor.

As shown in FIG. 3, the supporting base 22 has a first axle rod 221, and the first shutter blade 31 has a first axle hole 311 disposed corresponding to the position of the first axle rod 221. The bottom plate 34 and the cover plate 33 are perforated to form holes in corresponding positions. The first axle rod 221 penetrates the corresponding holes of the bottom plate 34 and the cover plate 33 and the first axle hole 311 of the first shutter blade 31. Alternatively, the bottom plate 34 and the cover plate 33 are manufactured with a configuration that is not prohibiting the first axle rod 221 from going through the first axle hole 311 of the first shutter blade 31. In this way, by using the deployment of the first axle rod 221 and the first axle hole 311, the first shutter blade 31 can pivot about an axial of the first axle rod 221.

Correspondingly, the supporting base 22 has a second axle rod 222, and the second shutter blade 32 has a second axle hole 321 disposed corresponding to the position of the second axle rod 222. The bottom plate 34 and the cover plate 33 are perforated to form holes in corresponding positions. The second axle rod 222 penetrates the corresponding holes of the bottom plate 34 and the cover plate 33 and the second axle hole 321 of the second shutter blade 32. Alternatively, the bottom plate 34 and the cover plate 33 are manufactured with a configuration that is not prohibiting the second axle rod 222 from going through the second axle hole 321 of the second shutter blade 32. In this way, by using the deployment of the second axle rod 222 and the second axle hole 321, the second shutter blade 32 can pivot about an axial of the second axle rod 222.

The first driver 35 has a first rotating rod 351 disposed thereon. The first rotating rod 351 is driven by the first driver 35 and thus moves in an arc orbit. The first driver 35 can make the first rotating rod 351 move circularly or in an arc fashion. An appropriate transmission mechanism or structure can be deployed between the first driver 35 and the first rotating rod 351. For instance, the first rotating rod 351 is protruded from the surface of a disc, and the disc transfers the force of a rotation generated by the first driver 35 by using a wheel gear. The supporting base 22 has a first orbital hole 223 disposed corresponding to the arc orbit of the first rotating rod 351 of the first driver 35, and the first shutter blade 31 has a first applying hole 312, correspondingly. The bottom plate 34 and the cover plate 33 has holes in corresponding positions. The first rotating rod 351 of the first driver 35 penetrates the first orbital hole 223 of the supporting base 22, the corresponding holes of the bottom plate 34 and the cover plate 33 and the first applying hole 312 of the first shutter blade 31. The first applying hole 312 can also be configured to be intersect with the first orbital hole 223. Of course, the bottom plate 34 and the cover plate 33 can also be configured not to affect the movement of the first rotating rod 351. When the first rotating rod 351 rotates under control of the first driver 35, the first rotating rod 351 moves from a first position to a second position within the first orbital hole 223 of the supporting base 22. Meanwhile, the first rotating rod 351 applies a force to the first shutter blade 31 through the first applying hole 312, thereby generating a torque for the first shutter blade 31 in a first direction. Thus, the first shutter blade 31 rotates around the first axel rod 221 from a turn-on position to a turn-off position, for example. When the first rotating rod 351 moves from the second position to the first position within the first orbital hole 223, the first rotating rod 351 gives to the first shutter blade 31 a torque of a second direction opposite to the first direction. Meanwhile, the first shutter blade 31 rotates from the turn-off position to the turn-on position, for example.

Similarly, the second driver 36 has a second rotating rod 361 disposed thereon. The second rotating rod 361 is driven by the second driver 36 and thus moves in an arc orbit. An appropriate transmission mechanism or structure can be deployed between the second driver 36 and the second rotating rod 361 such that the second driver 36 can make the second rotating rod 361 move circularly or in an arc fashion. The supporting base 22 has a second orbital hole 224 disposed corresponding to the arc orbit of the second rotating rod 361 of the second driver 36, and the second shutter blade 32 has a second applying hole 322, correspondingly. The bottom plate 34 and the cover plate 33 has holes in corresponding positions. The second rotating rod 361 of the second driver 36 penetrates the second orbital hole 224 of the supporting base 22, the corresponding holes of the bottom plate 34 and the cover plate 33 and the second applying hole 322 of the second shutter blade 32. The second applying hole 322 can also be configured to be intersect with the second orbital hole 224. Of course, the bottom plate 34 and the cover plate 33 can also be configured not to affect the movement of the second rotating rod 361. When the second rotating rod 361 rotates under control of the second driver 36, the second rotating rod 361 moves from a first position to a second position within the second orbital hole 224 of the supporting base 22. Meanwhile, the second rotating rod 361 applies a force to the second shutter blade 32 through the second applying hole 322, thereby generating a torque for the second shutter blade 32 in a first direction. Thus, the second shutter blade 32 rotates around the second axel rod 222 from a turn-on position to a turn-off position, for example. When the second rotating rod 361 moves from the second position to the first position within the second orbital hole 224, the second rotating rod 361 gives to the second shutter blade 32 a torque of a second direction opposite to the first direction. Meanwhile, the second shutter blade 32 rotates from the turn-off position to the turn-on position, for example.

The bottom plate 34, the cover plate 33, and the supporting base 22 respectively has openings 340, 330, and 220 arranged along an optical axis of the camera device, for the entrance of light rays. The aperture of the camera device can be defined by an opening of a plate, which can be implemented by any one of the bottom plate 34, the cover plate 33, and the supporting base 22, or by other components having an opening on the optical axis. The overall aperture of the camera decreases when such an opening is blocked and thus decreases in size.

As shown in FIG. 3, the first shutter blade 31 further includes a first arc contour 310 and a first hole O1 having a first aperture, and the second shutter blade 32 further includes a second arc contour 320 and a second hole O2 having a second aperture. The size of the first hole O1 of the first shutter blade 31 and the size of the second hole O2 of the second shutter blade 32 are different from the aperture size defined by the plate, or are smaller than the aperture size of the plate. Also, the first aperture of the first hole O1 of the first shutter blade 31 is different from the second aperture of second hole O2 of the second shutter blade 32. As shown in FIG. 3, in one example, the first aperture of the first shutter blade 31 is smaller than the second aperture of the second shutter blade 32.

For instance, when the first shutter blade 31 is at the turn-on position, the aperture of the plate is completely pervious to light; when the first shutter blade 31 is at the turn-off position, the aperture of the plate is partially pervious to light. Similarly, when the second shutter blade 32 is at the turn-on position, the aperture of the plate is completely pervious to light; when the second shutter blade 32 is at the turn-off position, the aperture of the plate is partially pervious to light.

Figure 4:
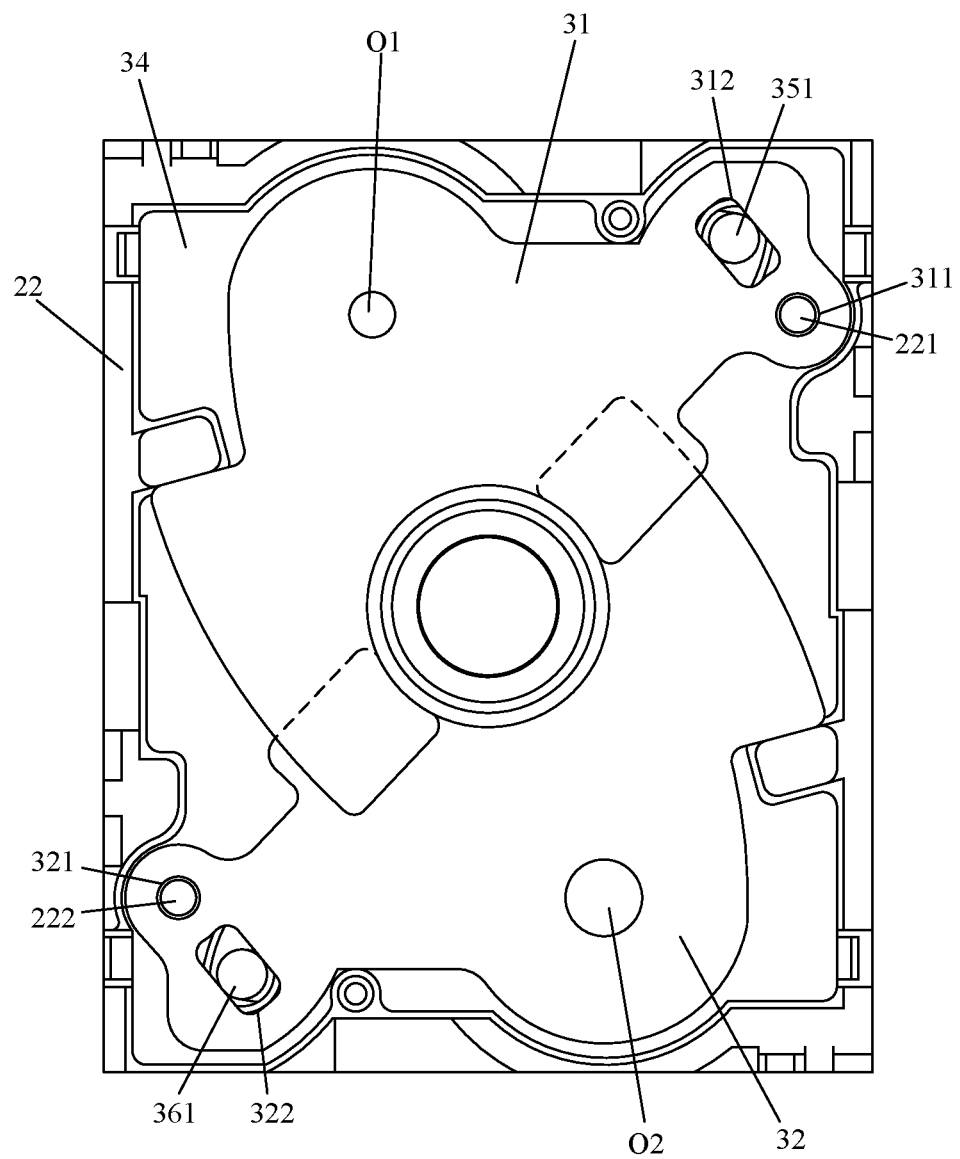
FIG. 4 is a schematic diagram showing that a first shutter blade and a second shutter blade are at turn-on positions in accordance with the first embodiment of the present invention.

Please refer to FIG. 4 with reference to FIG. 3. For instance, when the first driver 35 drives the first shutter blade 31 and makes it be located at the turn-on position and the second driver 36 drives the second shutter blade 32 and makes it be located at the turn-on position, the first arc contour 310 of the first shutter blade 31 will park at a position corresponding to a part of contours of the openings 340, 330, and 220 respectively of the bottom plate 34, the cover plate 33, and the supporting base 22 and the second arc contour 320 of the second shutter blade 32 will park at a position corresponding to the other part of contours of the openings 340, 330, and 220 respectively of the bottom plate 34, the cover plate 33, and the supporting base 22. That is, the aperture of the overall camera device is unchanged at the time and is an initial value. The first shutter blade 31 and the second shutter blade 32 are modularized respectively with the first driver 35 and the second driver 36. When the first shutter blade 31 and the second shutter blade 32 are disposed crossover from each other (e.g., in a top-to-down overlap configuration), it is convenient to replace the module of the first or the second shutter blade 31, 32 without interfering by another module.

Figure 5:
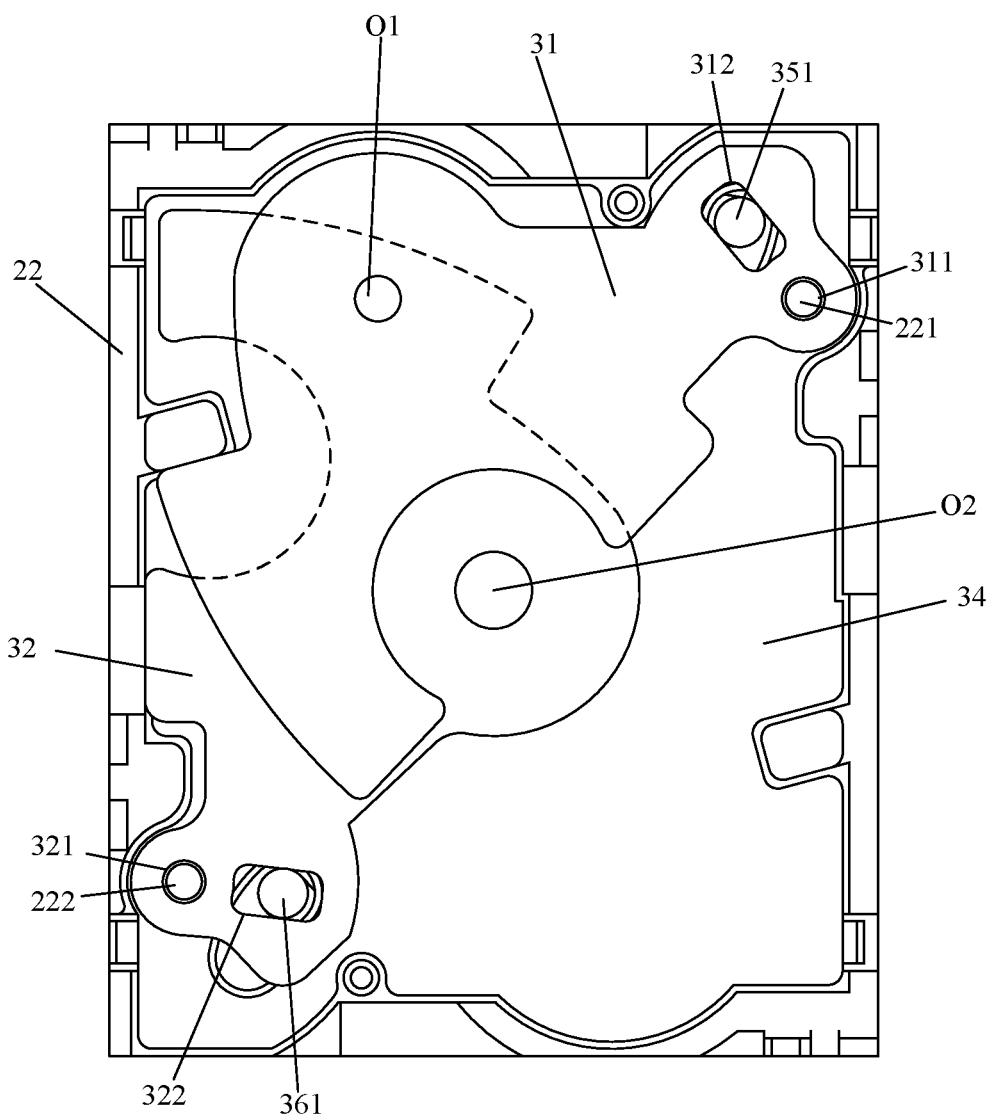
FIG. 5 is a schematic diagram showing that the first shutter blade is at a turn-on position and the second shutter blade are at a turn-off position in accordance with the first embodiment of the present invention.

Please refer to FIG. 5 with reference to FIG. 3. When the first driver 35 drives the first shutter blade 31 and makes it be located at the turn-on position and the second driver 36 drives the second shutter blade 32 and makes it be located at the turn-off position, the first arc contour 310 of the first shutter blade 31 will park at a position corresponding to a part of contours of the openings 340, 330, and 220 respectively of the bottom plate 34, the cover plate 33, and the supporting base 22 and the second driver 36 makes the second hole O2 of the second shutter blade 32 move toward the optical axis of the camera lens and shift to a position overlapping the aperture of the plate (e.g., the bottom plate 34, the cover plate 33, or the supporting base 22). Meanwhile, the aperture of the camera device is defined by the second aperture of the second hole O2 of the second shutter blade 32.

Figure 6:
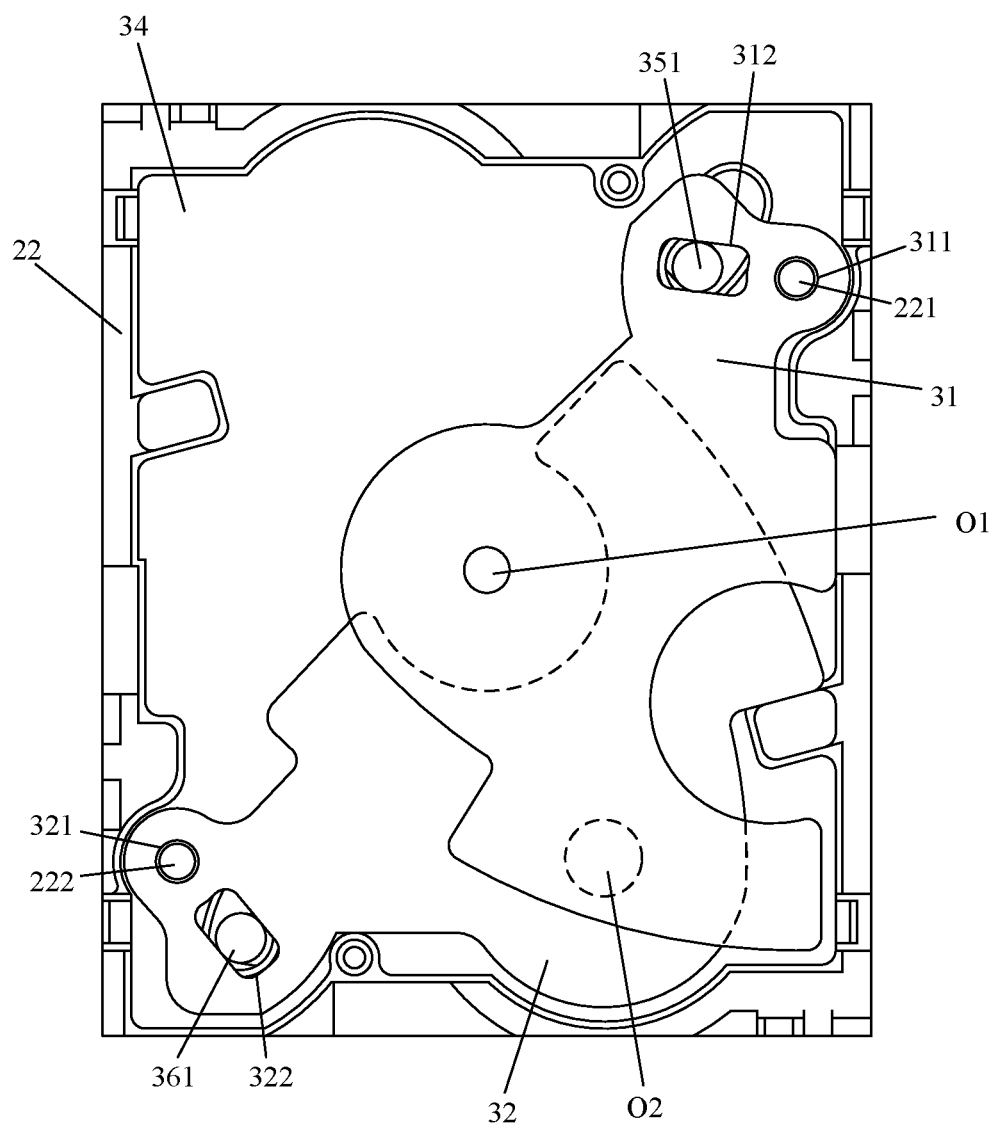
FIG. 6 is a schematic diagram showing that the first shutter blade is at a turn-off position and the second shutter blade are at a turn-on position in accordance with the first embodiment of the present invention.

Please refer to FIG. 6 with reference to FIG. 3. When the first driver 35 drives the first shutter blade 31 and makes it be located at the turn-off position and the second driver 36 drives the second shutter blade 32 and makes it be located at the turn-on position, the second arc contour 320 of the second shutter blade 32 will park at a position corresponding to a part of contours of the openings 340, 330, and 220 respectively of the bottom plate 34, the cover plate 33, and the supporting base 22 and the first driver 35 makes the first hole O1 of the first shutter blade 31 move toward the optical axis of the camera lens and shift to a position overlapping the aperture of the plate (e.g., the bottom plate 34, the cover plate 33, or the supporting base 22). Meanwhile, the aperture of the camera device is defined by the first aperture of the first hole O1 of the first shutter blade 31.

The afore-described framework can carry out a three-stage aperture adjustment. The aperture of the optical system can be adjusted to the aperture of the plate, the first aperture, and the second aperture. In addition, the first driver 35 and the second driver 36 can be deployed at the lateral side of the optical system frame, for example, be disposed at two opposite sides of the driver supporting base. The above-described embodiments are illustrated by two shutter blades 31 and 32 cooperating with two drivers 35 and 36. It can be understood that assuming that one shutter blade and one driver are taken as a set of aperture adjusting device, there can have only one set of aperture adjusting device. However, it can also deploy three, four, or more sets of aperture adjusting device at the lateral side of the optical system frame for carrying out a multi-stage aperture adjustment. Further, it can also deploy two or more than two blade rooms arranged front and back. The holes of the shutter blades in the blade rooms are arranged with different apertures. In this way, this increases the number of types of aperture for the user to choose.

Figure 7:
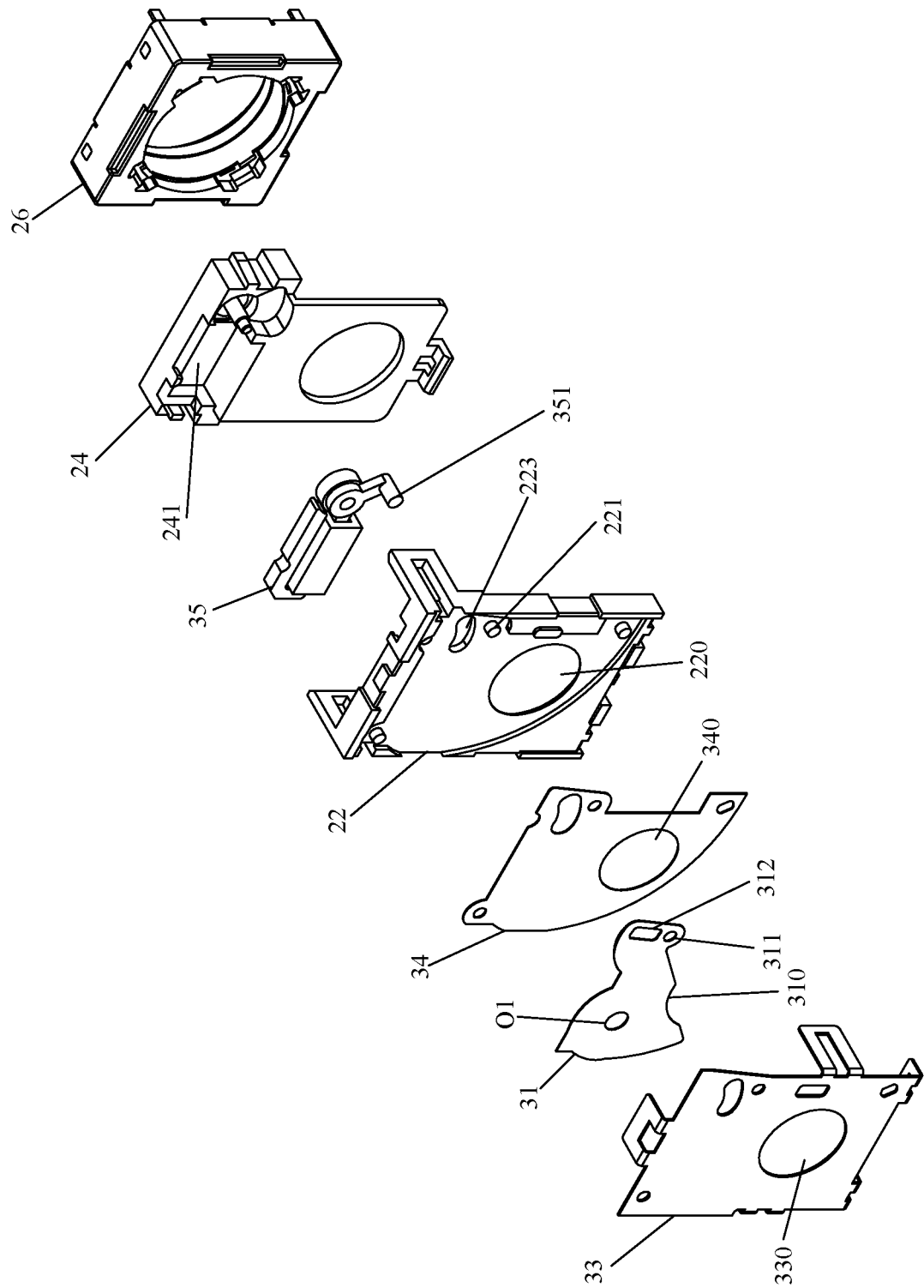
FIG. 7 is an exploded view of a camera device with adjustable aperture in accordance with a fourth embodiment of the present invention.

The present invention further provides a fourth embodiment. As shown in FIG. 7, the fourth embodiment follows the reference numbers used in the third embodiment. The difference between the fourth embodiment and the third embodiment is that the camera device of the fourth embodiment includes the first shutter aperture 31 and the first driver 35 without including the second shutter aperture 32 and the second driver 36.

Figure 8:
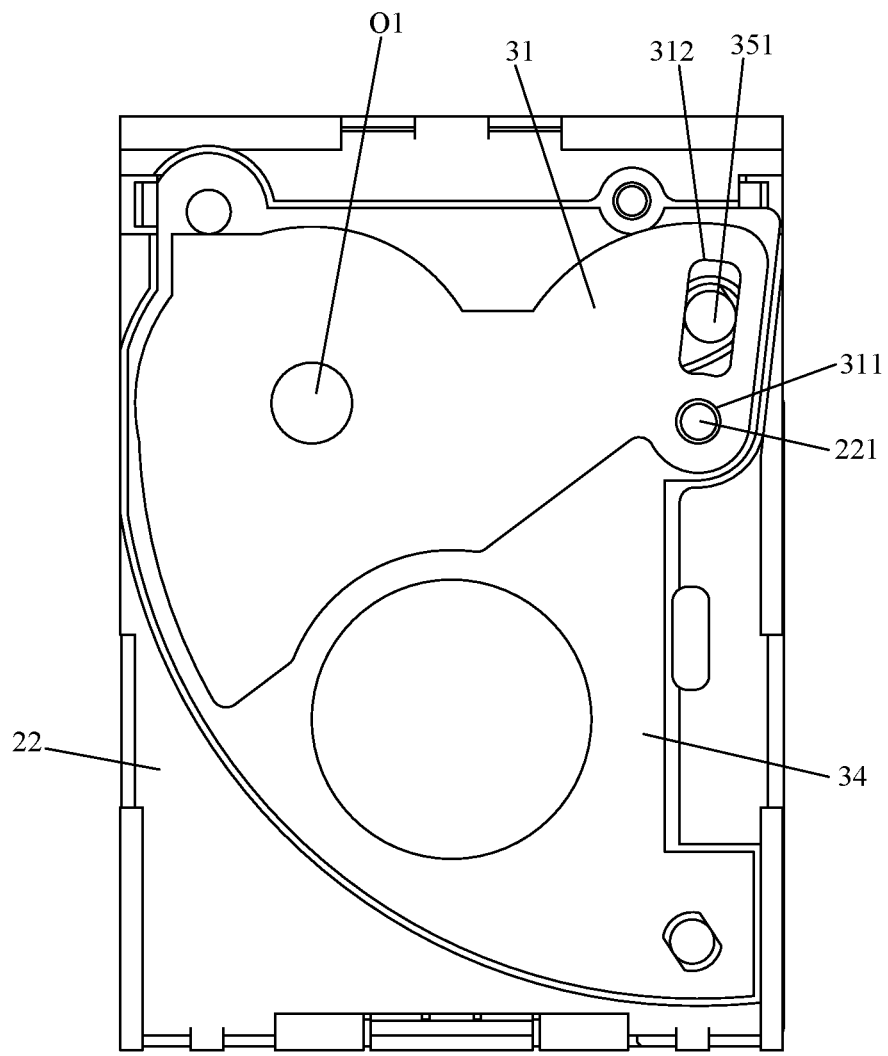
FIG. 8 is a schematic diagram showing that a first shutter blade is at a turn-on position in accordance with the second embodiment of the present invention.

Please refer to FIG. 8 with reference to FIG. 7. When the first driver 35 drives the first shutter blade 31 and makes it be located at the turn-on position, the first arc contour 310 of the first shutter blade 31 will park at a position corresponding to a part of contours of the openings 340, 330, and 220 respectively of the bottom plate 34, the cover plate 33, and the supporting base 22. That is, the aperture of the overall camera device is unchanged at the time and is an initial value. The first shutter blade 31 is modularized with the first driver 35.

Figure 9:
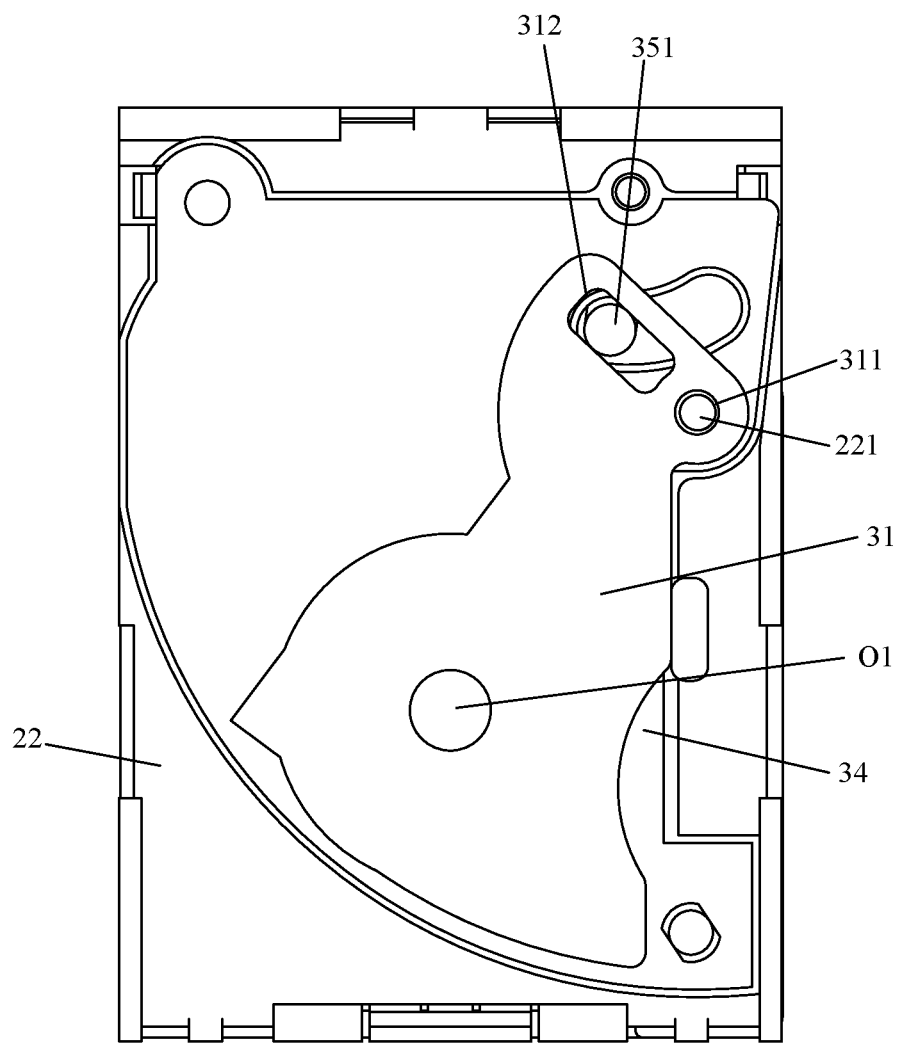
FIG. 9 is a schematic diagram showing that the first shutter blade is at a turn-off position in accordance with the second embodiment of the present invention.

Please refer to FIG. 9 with reference to FIG. 7. When the first driver 35 drives the first shutter blade 31 and makes it be located at the turn-off position, the first driver 35 makes the first hole O1 of the first shutter blade 31 move toward the optical axis of the camera lens and shift to a position overlapping the aperture of the plate (e.g., the bottom plate 34, the cover plate 33, or the supporting base 22). Meanwhile, the aperture of the camera device is defined by the first aperture of the first hole O1 of the first shutter blade 31.

The basic structure of the optical lens of the present inventions are illustrated by FIG. 10A, FIG. 11A, FIG. 12A, FIG. 13A and FIG. 14A (respectively corresponding to a fifth, a sixth, a seventh, an eighth and a ninth embodiments). The basic structure of the optical lens of the present inventions are described by Table 1, Table 2, Table 3, Table 4 and Table 5 (respectively corresponding to a fifth, a sixth, a seventh, an eighth and a ninth embodiments). The optical lens comprises a lens group, which establishes an optical axis OA and is arranged along the optical axis OA. Object light rays enter such an optical system from an object side OBJ of the optical axis OA and form an image on an image plane IP at an image side IMA thereof. The optical lens further comprises a first aperture stop STO1 and a second aperture stop STO2. Preferably, the first aperture stop STO1 is disposed inside the lens group, that is, between any two lenses of the lens group; and the second aperture stop STO2 is disposed outside the lens group at the outside of the object side OBJ of the optical axis OA, that is, at the outside of a lens of the lens group at the most object side OBJ.

In the illustrated optical lens, the aperture of the optical lens is defined by the aperture of the second aperture stop STO2 when a smaller aperture is required; the aperture of the optical lens is defined by the aperture of the first aperture stop STO1 when a larger aperture is required. For instance, when a smaller aperture is required, decrease the aperture of the second aperture stop STO2 to be at least less than the aperture of the first aperture stop STO1. Since the aperture of the first aperture stop STO1 is greater than that of the second aperture stop STO2, the first aperture stop STO1 ceases to be effective due to the evolution of light path and is thus in an inactive state. Meanwhile, the second aperture stop STO2 is in an active state, and therefore the smaller aperture of the optical lens is now defined by the aperture of the second aperture stop STO2. When a larger aperture is required, increase the aperture of the second aperture stop STO2 to be at least greater than the aperture of the first aperture stop STO1. Meanwhile, the second aperture stop STO2 ceases to be effective due to the evolution of light path and is thus in an inactive state. The first aperture stop STO1 is in an active state, and therefore the aperture of the optical lens is now defined by the first aperture stop STO1. The afore-described example is illustrated by taking the second aperture stop STO2 as an aperture stop with adjustable aperture for example. However, the following examples can also achieve above effects, that is, the first aperture stop STO1 is an aperture stop with adjustable aperture or both of the first aperture stop STO1 and the second aperture stop STO2 are adjustable in aperture. However, the second aperture stop STO2 that is adjustable in aperture has an advantage. That is, the aperture stop with adjustable aperture can be deployed at the outside of the lens at the most object side. Since there has more room for accommodating an aperture adjusting device in this configuration, the size of the optical lens can be reduced.

The afore-described optical framework improves the effective aperture range. In comparison to the optical lens having an aperture stop with adjustable aperture disposed within the lens group in the conventional skills, the optical lens of the present invention can deploy the aperture stop with adjustable aperture (that is, the second aperture stop STO2) at the outside of the lens group, and therefore the structural components or electric control components required to be used to mount the aperture-adjustable stop can be moved to the outside of the lens group, thereby carrying out further thinning of the optical lens.

The following is described with a package structure of the optical lens of the present invention.

Figure 15:
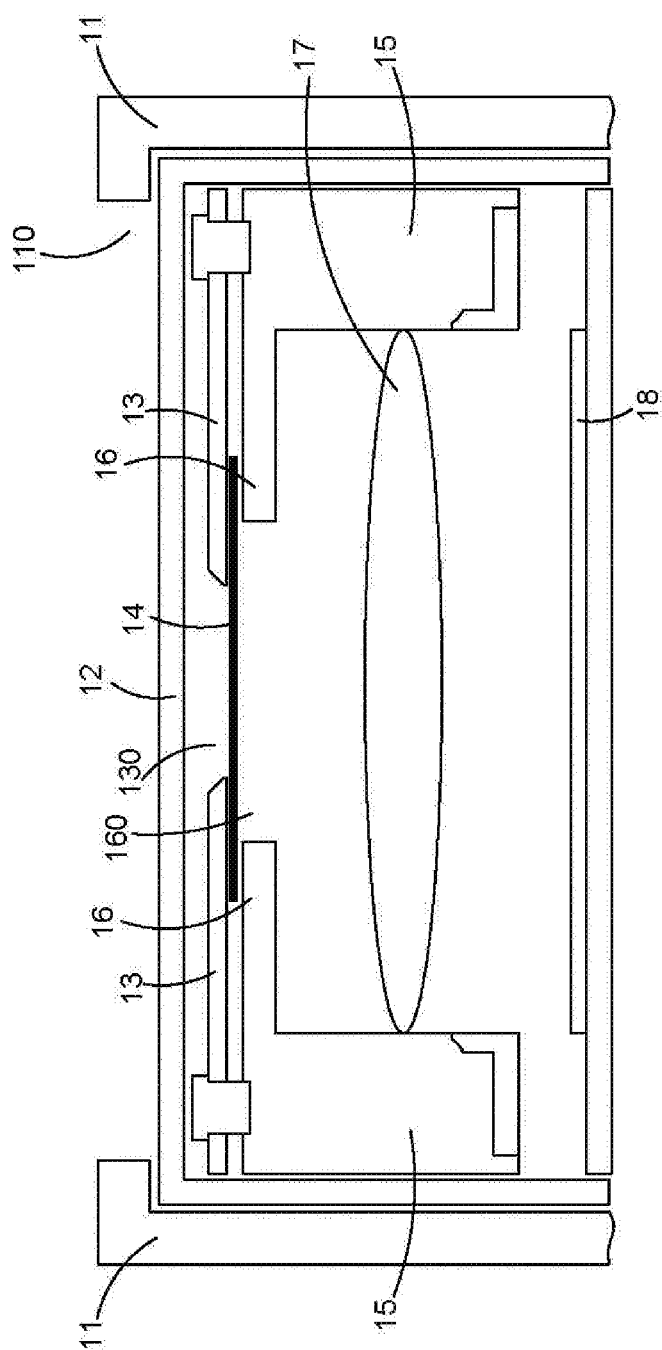
FIG. 15 is a schematic diagram showing a package structure in accordance with a fifth embodiment of an optical lens of the present invention.

Please refer to FIG. 15, which is a schematic diagram showing a package structure in accordance with a fifth embodiment of an optical lens of the present invention. The optical lens is packaged in an electronic device equipped with a photographing function and is disposed inside an external case 11 of the electronic device. The external case 11 has an opening 110 exposed therefrom, and light rays can thus enter the inner space of the optical lens through the opening 110. The optical lens has an optical system frame 15, a lens system 17, and an image recorder 18. The optical system frame 15 is made of plastic and is a fastening member of the optical system. The lens system 17 comprises one or more lenses mounted on the optical system frame 15. The image recorder 18 can receive the light rays transmitted from the lens system 17 and thus form an image on the image plane. The optical lens also has a transparent plate 12, a cover plate 13, a base plate 16, and one or more aperture adjusting blades 14. The base plate 16 is fastened on the optical system frame 15 or formed by extending from the optical system frame 15. The base plate 16 has an opening 160 disposed at a central part thereof. The cover plate 13 is spaced apart from the base plate 16 and is fastened to the base plate 16 or the optical system frame 15. The cover plate 13 is a flat metal plate and is perforated to form an opening 130 at a central part thereof. The opening 130 of the cover plate 13 corresponds to the opening 160 of the base plate 16. The aperture adjusting blade 14 is disposed in an accommodating space formed between the cover plate 13 and the base plate 16. This optical lens is an aperture-adjustable optical lens. The aperture adjusting blade 14 is driven by a driver (not shown) of an aperture adjusting device (not shown). The aperture of the optical lens is altered by adjusting the position of the aperture adjusting blade 14. The transparent plate 12 is disposed at the inner side of the external case 11 and is disposed next to the exposed opening 110 of the external case 11. Also, the transparent plate 12 is attached to the optical system frame 15. As can be seen from FIG. 15, the lens system 17, the base plate 16, the aperture adjusting blade 14, the cover plate 13, and the transparent plate 12 are sequentially arranged in order from the image side to the object side, that is, from the image recorder 18 to the exposed opening 110 of the external case 11.

As described above, the aperture adjusting blade 14 is disposed between the lens at the most object side and the exposed opening 110 of the external case 11. Therefore, in comparison to that disposed between any two lenses, this deployment leads to have more room at the lateral side for accommodating its driver and leads not to affect the deployment of other components. Further, the transparent plate 12 is fastened or attached to the optical system frame 15. Such a technical scheme can further prevent the dust from falling into the blade room accommodating the aperture adjusting blade 14.

Figure 16:
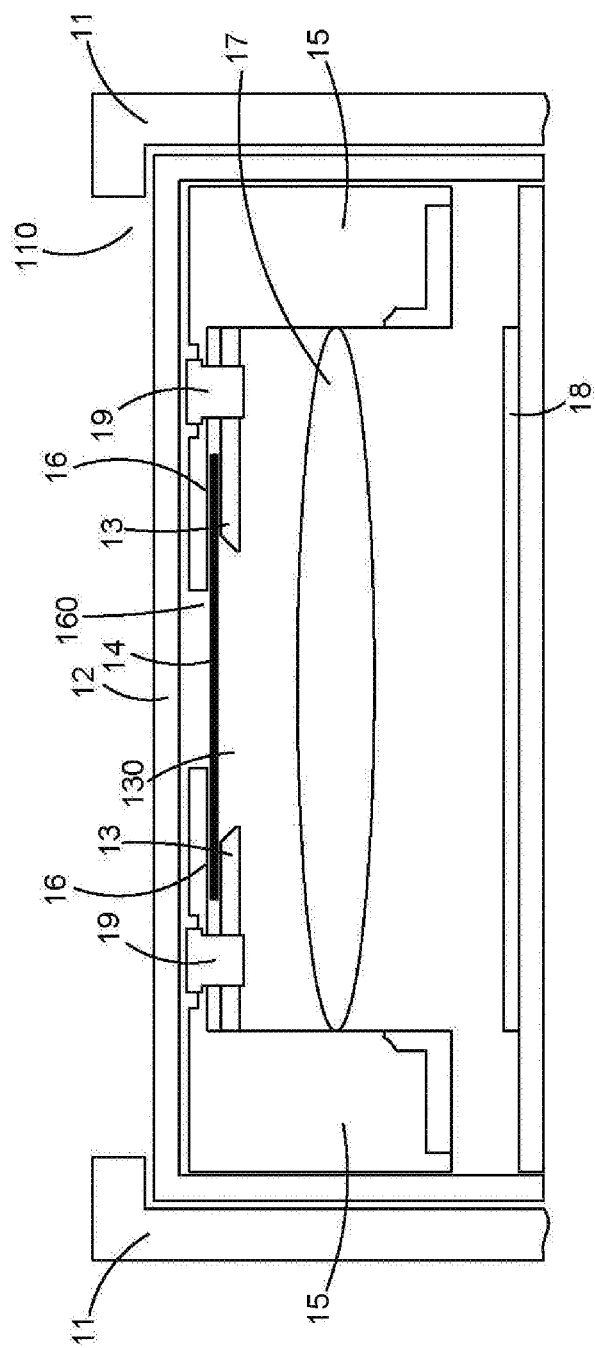
FIG. 16 is a schematic diagram showing a package structure in accordance with a sixth embodiment of an optical lens of the present invention.

Please refer to FIG. 16, which is a schematic diagram showing a package structure in accordance with a sixth embodiment of an optical lens of the present invention. In comparison to the package structure described in the fifth embodiment, the present embodiment locates the base plate 16 at the upper side and locates the cover plate 13 at the lower side. Screws 19 are utilized to fasten the cover plate 13 to the base plate 16 or the optical system frame 15. The cover plate 13 and the base plate 16 are spaced a part from each other. The aperture adjusting blade 14 is accommodated between the cover plate 13 and the base plate 16. As can be seen from FIG. 16, the lens system 17, the cover plate 13, the aperture adjusting blade 14, the base plate 16, and the transparent plate 12 are sequentially arranged in order from the image side to the object side, that is, from the image recorder 18 to the exposed opening 110 of the external case 11. In such a technical scheme, the cover plate 13 is moved to the lower side and thus the plastic material of the optical system frame 15 can be partially removed for deploying a space for disposing the screws 19, and therefore the fastening position of the screw can be moved down. In comparison to the embodiment shown in FIG. 15, this embodiment can reduce the thickness of the optical lens, and thus reduce the thickness of the device equipped with the optical lens.

The optical lens provided in the present invention will be further described with reference to the following five embodiments taking a mobile phone camera lens for example and the data adopted in the respective embodiments are listed for reference. The fifth embodiment is illustrated in FIGS. 10A to 10E; the sixth embodiment is illustrated in FIGS. 11A to 11E; the seventh embodiment is illustrated in FIGS. 12A to 12E; the eighth embodiment is illustrated in FIGS. 13A to 13E; and the ninth embodiment is illustrated in FIGS. 14A to 14E.

Some lenses in the optical lens of the present invention are aspheric lenses. The shape of an aspheric lens may be expressed by the following formula:

$$z(r) = \frac{C \cdot r^2}{1 + \sqrt{1 - (1+k) \cdot C^2 \cdot r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16} + \alpha_9 r^{18} + \alpha_{10} r^{20} \ldots$$

where z represents the sag of a point on the aspheric surface at a height h distanced to a central axis of the lens; C is a reciprocal of a paraxial curvature radius; r represents a height of a point on the aspheric surface with respect to the central axis; k is the conic constant of the aspheric lens; and $\alpha_1, \alpha_2, \ldots,$ and $\alpha_{10}$ are aspheric surface coefficients for even (greater than or equal to two) order terms.

FIG. 10A is a schematic diagram showing an optical structure in accordance with a fifth embodiment of an optical lens of the present invention. The optical lens according to the fifth embodiment of the present invention comprises five pieces of lenses, which are a first lens L1, a second lens L2, a third lens L3, a fifth lens L5, and a fourth lens L4 arranged in order from the image side IMA to the object side OBJ. The optical lens utilizes two low-dispersion lenses L2 and L3 cooperating with three high-dispersion lenses L1, L4, and L5. The framework of its refractive power is negative, positive, negative, positive, and positive in order form the image side to the object side. Specifically, the first lens L1 is a lens having negative refractive power, and the image-side surface thereof is a concave face and has at least a point of inflection arranged thereon. The second lens L2 is a lens having positive refractive power and has a concave surface facing the object side and a convex surface facing the image side. The third lens L3 is approximate to a plano-concave lens. The fifth lens L5 is approximate to a meniscus convex lens. The fourth lens L4 is also approximate to a meniscus convex lens.

The optical lens according to the fifth embodiment of the present invention also has at least two aperture stops, that is, a first aperture stop STO1 and a second aperture stop STO2. The first aperture stop STO1 is disposed between the fourth lens L4 and the fifth lens L5 and the second aperture stop STO2 is disposed at the outside of the lens at the most object side (that is, the fourth lens L4). The distance on the optical axis from the first aperture stop STO1 to the image plane IP is SL1, the distance on the optical axis from the second aperture stop STO2 to the image plane IP is SL2, and the distance on the optical axis from the object-side surface of the lens at the most object side (that is, the fourth lens L4) to the image plane IP is TTL. The optical lens according to the fifth embodiment of the present invention satisfies the following equation: 1.2<(SL1+SL2)/TTL<2.5.

As shown in Table 1 below, related data of the respective lenses of the optical lens shown in FIG. 10A are shown in the condition that the first aperture stop STO1 is in an active state and the second aperture stop STO2 is in an inactive state. Table 1 shows that the focal length of the optical lens according to the fifth embodiment of the present invention is 4.363, and the refractive power for the respective lenses sequentially is −6.54966, 20.2192, −4.7998, 4.1284, and 4.7496 in order from L1, L2, L3, L5, and L4. In the condition that the first aperture stop STO1 is in the active state, the effective f-number of this optical system is 1.8, the viewing angle is 76 degrees, and the total length of the optical lens is 5.21 mm. Further, in the condition that the second aperture stop STO2 is in the active state, the effective f-number of this optical system is 2.4.

TABLE 1

Focal length = 4.36 mm F-number = 1.8 Maximum half angle of view = 38

| Surface Index | | Radius of Curvature R (mm) | Thickness/ Distance D (mm) | Refractive Index (Nd) | Abbe No. (Vd) | Conic Constant |
|---|---|---|---|---|---|---|
| R0 | Image Side | | | | | |
| R1 | IR | Plano | 0.399847 | 1.5168 | 64.16734 | 0 |
| R2 | | Plano | 0.145 | | | 0 |
| R3 | L1 | ∞ | 0.517358 | 1.535037 | 55.71072 | −7.31959 |
| R4 | | 3.224664 | 0.687077 | | | −37.468 |
| R5 | L2 | −6.84747 | 0.316889 | 1.651 | 21.5 | 12.32 |
| R6 | | −13.594 | 0.626108 | | | −3121.95 |
| R7 | L3 | −202.472 | 0.655789 | 1.651 | 21.5 | −7063.6 |
| R8 | | −3.109 | 0.232827 | | | 0 |
| R9 | L5 | −2.63506 | 0.038179 | 1.79679 | 45.35 | 0 |
| R10 | | −11.8121 | 0.530297 | | | 0 |
| R11 | STO1 | ∞ | 0.301989 | | | 0 |
| R12 | L4 | 4.492898 | 0.090208 | 1.58913 | 61.18217 | 0 |
| R13 | | 1.824606 | 0.67288 | | | −0.68912 |
| R14 | STO2 | ∞ | 0 | | | 0 |
| R15 | Object Side | | | | | |

Table 2 shows related data of aspheric lenses shown in Table 1.

TABLE 2

| | Coefficient on $r^2$ | Coefficient on $r^4$ | Coefficient on $r^6$ | Coefficient on $r^8$ | Coefficient on $r^{10}$ |
|---|---|---|---|---|---|
| IMA surface of L1 | 0 | −0.068326463 | 0.022631598 | −0.005707664 | 0.00079391 |
| | Coefficient on $r^{12}$ | Coefficient on $r^{14}$ | Coefficient on $r^{16}$ | Coefficient on $r^{18}$ | Coefficient on $r^{20}$ |
| | −5.06E−05 | −5.04E−08 | 1.18281E−07 | 1.18281E−07 | 1.18281E−07 |
| OBJ surface of L1 | Coefficient on $r^2$ | Coefficient on $r^4$ | Coefficient on $r^6$ | Coefficient on $r^8$ | Coefficient on $r^{10}$ |
| | 0 | −0.16234125 | 0.063601191 | −0.014359732 | −0.000663867 |
| | Coefficient on $r^{12}$ | Coefficient on $r^{14}$ | Coefficient on $r^{16}$ | Coefficient on $r^{18}$ | Coefficient on $r^{20}$ |
| | 0.000669046 | −5.70E−06 | −1.02112E−05 | −1.02112E−05 | −1.02112E−05 |
| IMA surface of L2 | Coefficient on $r^2$ | Coefficient on $r^4$ | Coefficient on $r^6$ | Coefficient on $r^8$ | Coefficient on $r^{10}$ |
| | 0 | −0.037355326 | 0.056839178 | −0.047227199 | 0.017140171 |
| | Coefficient on $r^{12}$ | Coefficient on $r^{14}$ | Coefficient on $r^{16}$ | Coefficient on $r^{18}$ | Coefficient on $r^{20}$ |
| | −0.002734669 | −7.68765E−05 | 6.53917E−05 | 6.53917E−05 | 6.53917E−05 |
| OBJ surface of L2 | Coefficient on $r^2$ | Coefficient on $r^4$ | Coefficient on $r^6$ | Coefficient on $r^8$ | Coefficient on $r^{10}$ |
| | 0 | −0.046389552 | 0.054728295 | −0.087083506 | 0.053893156 |
| | Coefficient on $r^{12}$ | Coefficient on $r^{14}$ | Coefficient on $r^{16}$ | Coefficient on $r^{18}$ | Coefficient on $r^{20}$ |
| | −0.016201546 | 0.000158368 | 0.000723711 | 0.000723711 | 0.000723711 |
| IMA surface of L3 | Coefficient on $r^2$ | Coefficient on $r^4$ | Coefficient on $r^6$ | Coefficient on $r^8$ | Coefficient on $r^{10}$ |
| | 0 | −0.064112847 | 0.017941495 | 0.038314249 | −0.029126597 |
| | Coefficient on $r^{12}$ | Coefficient on $r^{14}$ | Coefficient on $r^{16}$ | Coefficient on $r^{18}$ | Coefficient on $r^{20}$ |
| | 0.008533352 | 0.002185878 | −0.000751704 | −0.000751704 | −0.000751704 |
| OBJ surface of L3 | Coefficient on $r^2$ | Coefficient on $r^4$ | Coefficient on $r^6$ | Coefficient on $r^8$ | Coefficient on $r^{10}$ |
| | 0 | −0.072558289 | −0.015939819 | 0.077639598 | −0.013915421 |
| | Coefficient on $r^{12}$ | Coefficient on $r^{14}$ | Coefficient on $r^{16}$ | Coefficient on $r^{18}$ | Coefficient on $r^{20}$ |
| | −0.02624593 | 0.00666058 | −0.000299104 | −0.000299104 | −0.000299104 |
| IMA surface of L4 | Coefficient on $r^2$ | Coefficient on $r^4$ | Coefficient on $r^6$ | Coefficient on $r^8$ | Coefficient on $r^{10}$ |
| | 0 | −0.013943442 | 0.020475405 | −0.057163629 | 0.023398376 |
| | Coefficient on $r^{12}$ | Coefficient on $r^{14}$ | Coefficient on $r^{16}$ | Coefficient on $r^{18}$ | Coefficient on $r^{20}$ |
| | 0.012274819 | −0.012467014 | −0.000474625 | −0.000474625 | −0.000474625 |
| OBJ surface of L4 | Coefficient on $r^2$ | Coefficient on $r^4$ | Coefficient on $r^6$ | Coefficient on $r^8$ | Coefficient on $r^{10}$ |
| | 0 | 0.006641832 | 0.01166876 | −0.001369296 | −0.022192564 |
| | Coefficient on $r^{12}$ | Coefficient on $r^{14}$ | Coefficient on $r^{16}$ | Coefficient on $r^{18}$ | Coefficient on $r^{20}$ |
| | 0.025460709 | −0.011215628 | 0.000876751 | 0.000376751 | 0.000876751 |
| IMA surface of L5 | Coefficient on $r^2$ | Coefficient on $r^4$ | Coefficient on $r^6$ | Coefficient on $r^8$ | Coefficient on $r^{10}$ |
| | 0 | −0.013306555 | −0.034459418 | 0.011549355 | 0.044164219 |
| | Coefficient on $r^{12}$ | Coefficient on $r^{14}$ | Coefficient on $r^{16}$ | Coefficient on $r^{18}$ | Coefficient on $r^{20}$ |
| | −0.047675783 | 0.004435779 | 0.004355224 | 0.004355224 | 0.004355224 |
| OBJ surface of L5 | Coefficient on $r^2$ | Coefficient on $r^4$ | Coefficient on $r^6$ | Coefficient on $r^8$ | Coefficient on $r^{10}$ |
| | 0 | −0.02213491 | −0.023906357 | 0.000935276 | 0.011708534 |
| | Coefficient on $r^{12}$ | Coefficient on $r^{14}$ | Coefficient on $r^{16}$ | Coefficient on $r^{18}$ | Coefficient on $r^{20}$ |
| | −0.028121262 | 0.009003516 | 0.002926885 | 0.002926385 | 0.002926885 |

Figure 10B:
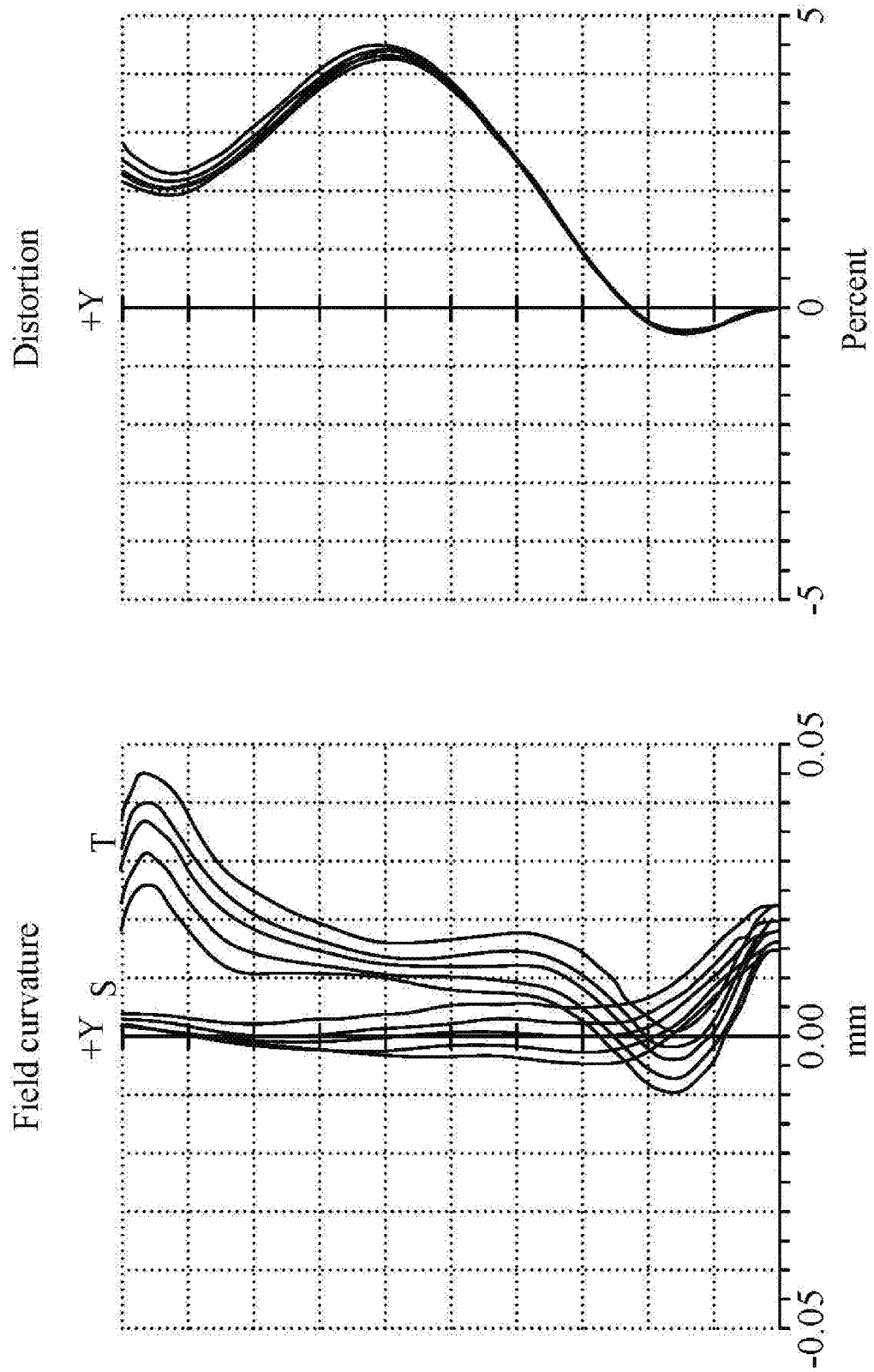
FIG. 10B is a diagram showing the optical performance including field curvature and distortion of the optical lens according to the fifth embodiment of the present invention in the condition that a first aperture stop is in an active state and a second aperture stop is in an inactive state.
Figure 10C:
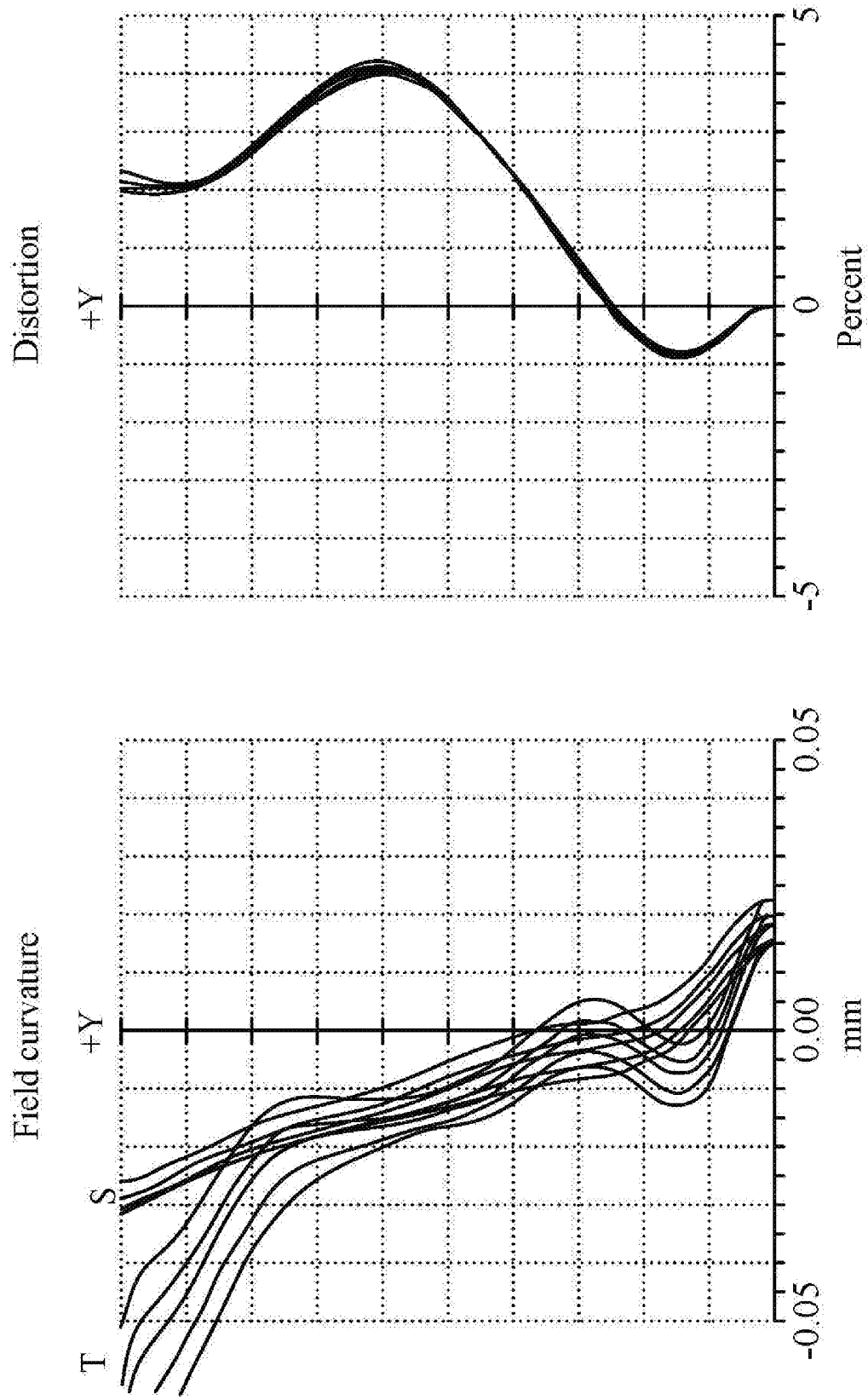
FIG. 10C is a diagram showing the optical performance including field curvature and distortion of the optical lens according to the fifth embodiment of the present invention in the condition that the first aperture stop is in the inactive state and the second aperture stop is in the active state.
Figure 10D:
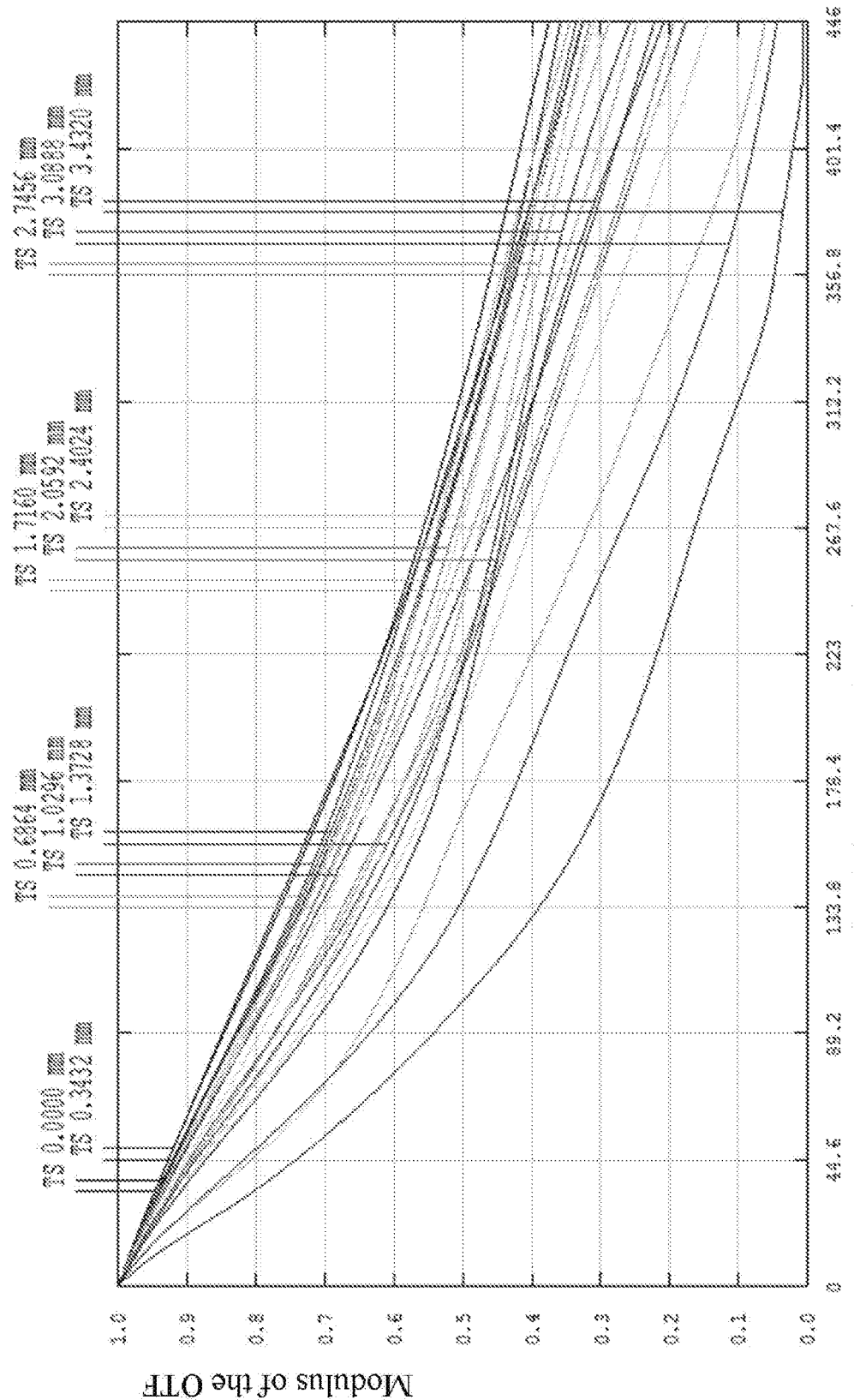
FIG. 10D is a diagram showing polychromatic diffraction modulation transfer function (MTF) of the optical lens according to the fifth embodiment of the present invention in the condition that the first aperture stop is in the active state and the second aperture stop is in the inactive state.
Figure 10E:
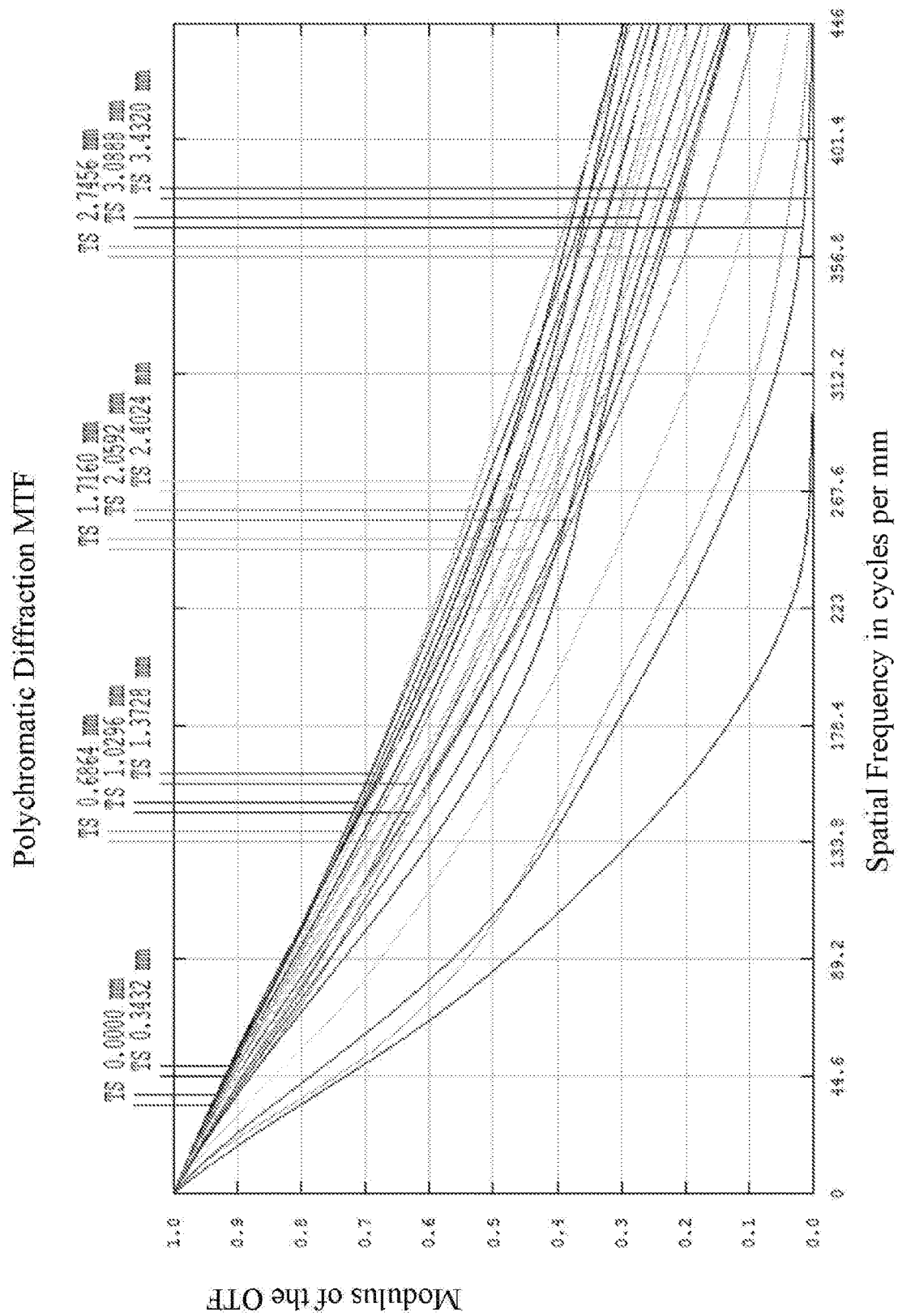
FIG. 10E is a diagram showing polychromatic diffraction modulation transfer function of the optical lens according to the fifth embodiment of the present invention in the condition that the first aperture stop is in the inactive state and the second aperture stop is in the active state.
Figure 11A:
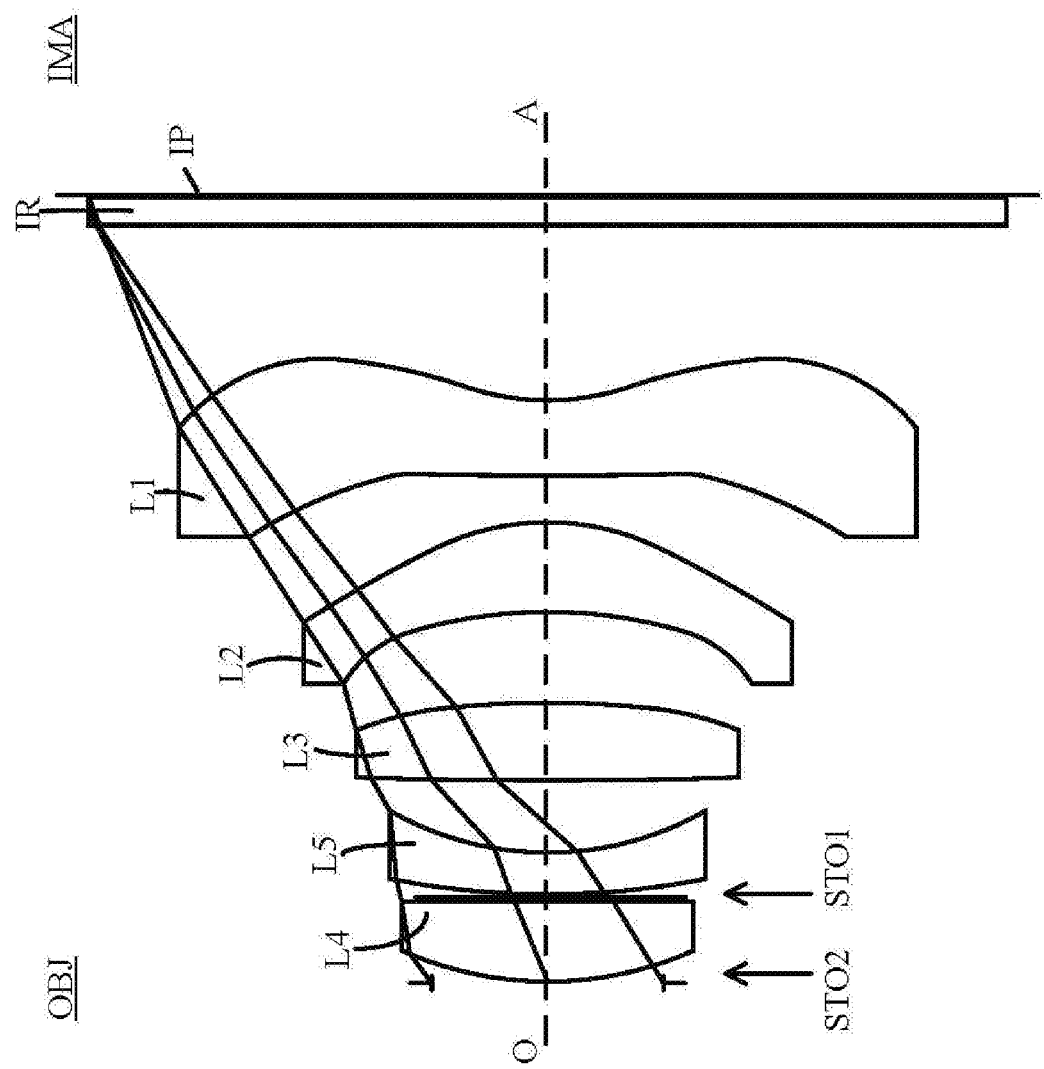
FIG. 11A is a schematic diagram showing an optical structure in accordance with a sixth embodiment of an optical lens of the present invention.
Figure 11B:
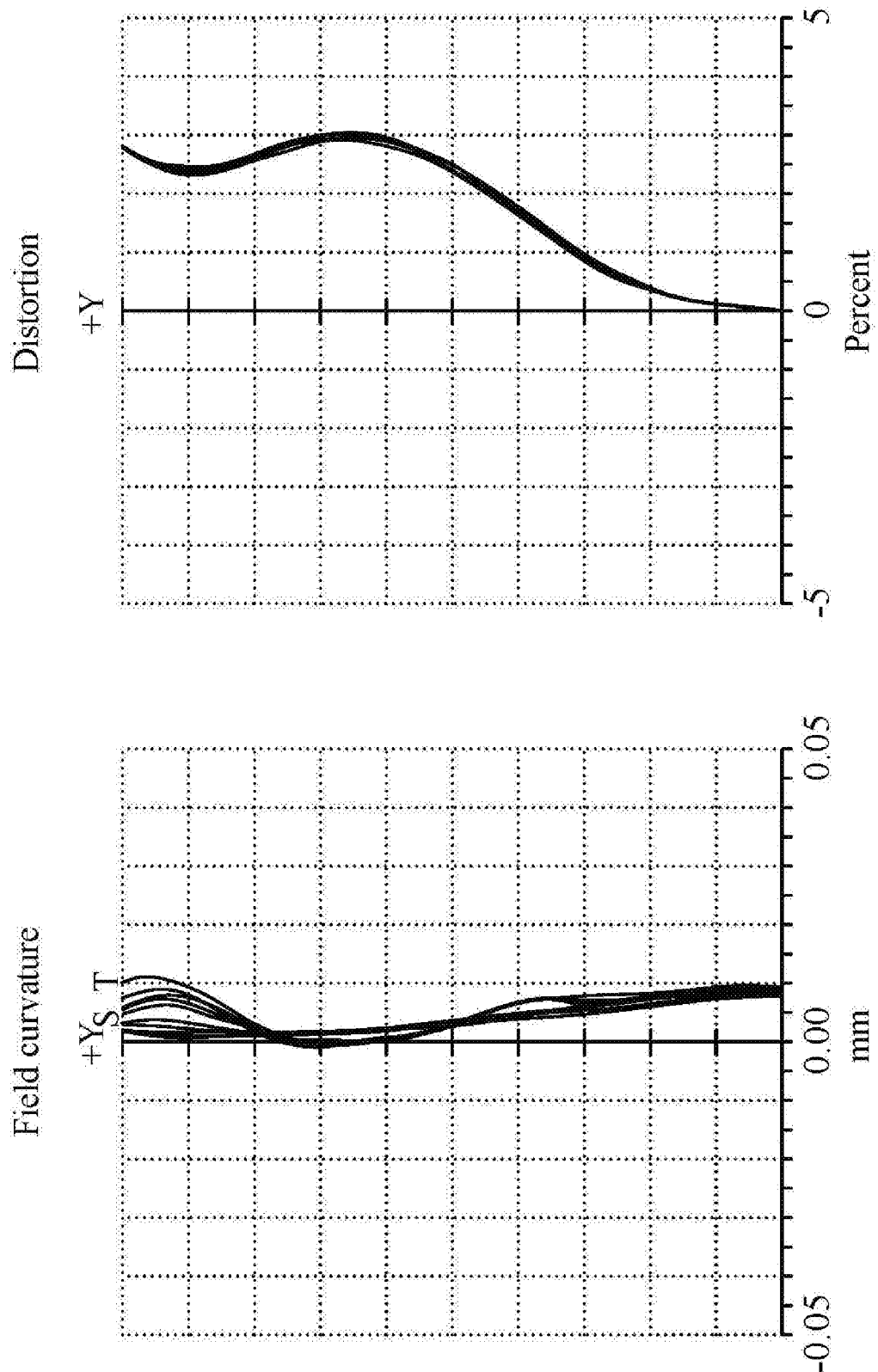
FIG. 11B is a diagram showing the optical performance including field curvature and distortion of the optical lens according to the sixth embodiment of the present invention in the condition that a first aperture stop is in an active state and a second aperture stop is in an inactive state.
Figure 11D:
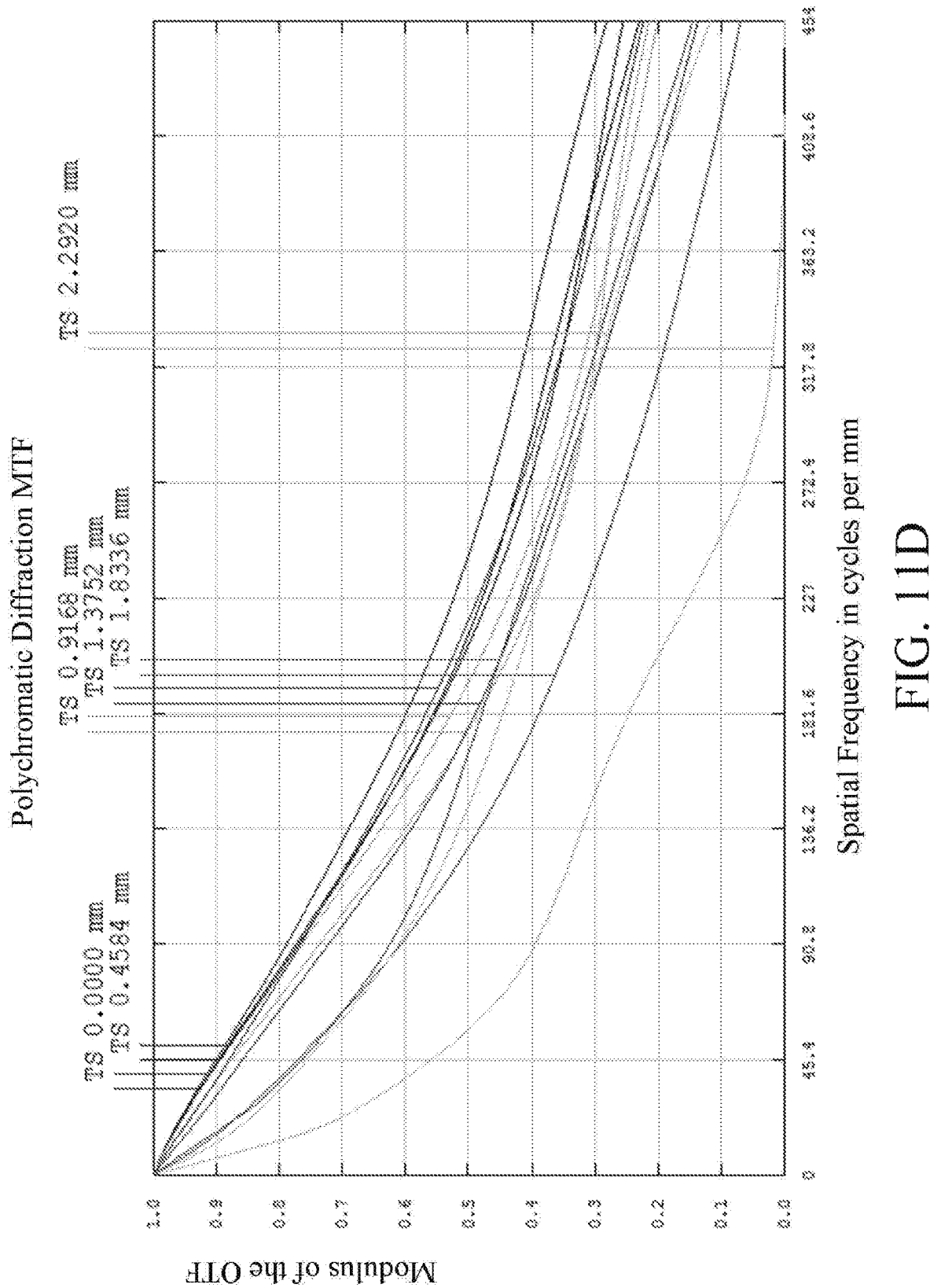
FIG. 11D is a diagram showing polychromatic diffraction modulation transfer function (MTF) of the optical lens according to the sixth embodiment of the present invention in the condition that the first aperture stop is in the active state and the second aperture stop is in the inactive state.
Figure 11E:
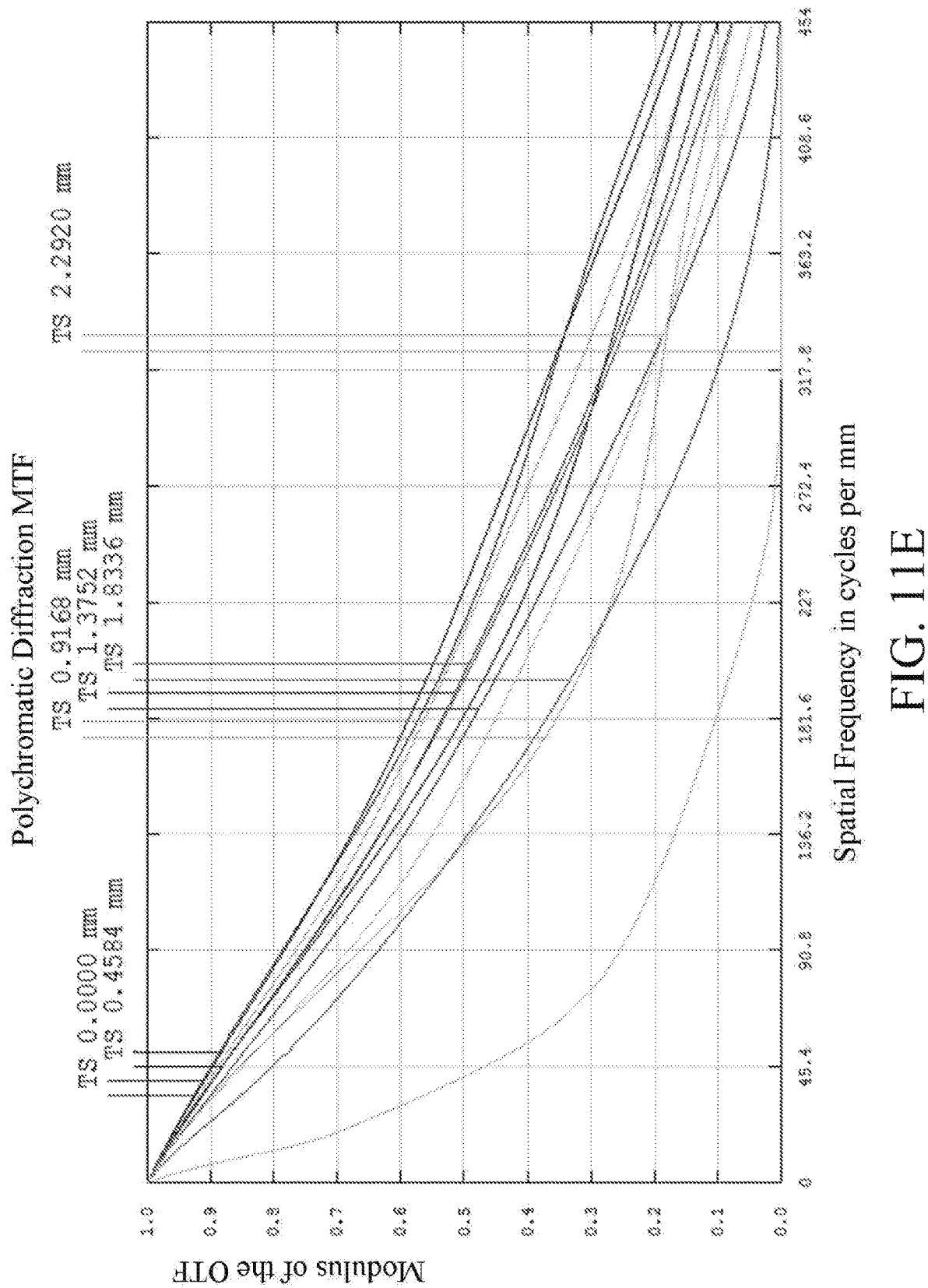
FIG. 11E is a diagram showing polychromatic diffraction modulation transfer function of the optical lens according to the sixth embodiment of the present invention in the condition that the first aperture stop is in the inactive state and the second aperture stop is in the active state.

FIG. 10B is a diagram showing the optical performance including field curvature and distortion of the optical lens according to the fifth embodiment of the present invention in the condition that the first aperture stop STO1 is in the active state and the second aperture stop STO2 is in the inactive state. FIG. 10C is a diagram showing the optical performance including field curvature and distortion of the optical lens according to the fifth embodiment of the present invention in the condition that the first aperture stop STO1 is in the inactive state and the second aperture stop STO2 is in the active state. FIG. 10D is a diagram showing polychromatic diffraction modulation transfer function (MTF) of the optical lens according to the fifth embodiment of the present invention in the condition that the first aperture stop STO1 is in the active state and the second aperture stop STO2 is in the inactive state. FIG. 10E is a diagram showing polychromatic diffraction modulation transfer function of the optical lens according to the fifth embodiment of the present invention in the condition that the first aperture stop STO1 is in the inactive state and the second aperture stop STO2 is in the active state.

TABLE 3

Focal length = 3.29 mm F-number = 2.0 Maximum half angle of view = 34.5

| Surface Index | | Radius of Curvature R (mm) | Thickness/ Distance D (mm) | Refractive Index (Nd) | Abbe No. (Vd) | Conic Constant |
|---|---|---|---|---|---|---|
| R0 | Image Side | | | | | |
| R1 | IR | Plano | 0.004258 | 1.5168 | 64.16734 | 0 |
| R2 | | Plano | 0.145 | | | 0 |
| R3 | L1 | ∞ | 0.88 | 1.5441 | 56.0936 | −6.35903 |
| R4 | | 4.088057 | 0.378762 | | | −133.327 |
| R5 | L2 | −1.05192 | 0.238975 | 1.5441 | 56.0936 | −0.77093 |
| R6 | | −2.37771 | 0.450713 | | | 0.179669 |
| R7 | L3 | −6.89504 | 0.464627 | 1.5441 | 56.0936 | 28.14493 |
| R8 | | 10.49814 | 0.390025 | | | 20.16273 |
| R9 | L5 | 1.193641 | 0.364742 | 1.635517 | 23.97184 | −6.08747 |
| R10 | | 2.664022 | 0.215475 | | | −35.7261 |
| R11 | STO1 | ∞ | 0.036573 | | | 0 |
| R12 | L4 | −6.82072 | −0.00473 | 1.5441 | 56.0936 | 7.335077 |
| R13 | | 1.644252 | 0.408306 | | | 0.125673 |
| R14 | STO2 | ∞ | 0 | | | 0 |
| R15 | Object Side | | | | | |

Table 4 shows related data of aspheric lenses shown in Table 3.

TABLE 4

| | Coefficient on r^2 | Coefficient on r^4 | Coefficient on r^6 | Coefficient on r^8 | Coefficient on r^10 |
|---|---|---|---|---|---|
| IMA surface of L1 | 0 | −0.12261161 | 0.049977706 | −0.017665442 | 0.003089853 |
| | Coefficient on r^12 | Coefficient on r^14 | Coefficient on r^16 | Coefficient on r^18 | Coefficient on r^20 |
| | −2.24E−04 | 0.00E+00 | 0 | 0 | 0 |
| OBJ surface of L1 | Coefficient on r^2 | Coefficient on r^4 | Coefficient on r^6 | Coefficient on r^8 | Coefficient on r^10 |
| | 0 | −0.16359498 | 0.04211978 | −0.001194497 | −0.000624809 |
| | Coefficient on r^12 | Coefficient on r^14 | Coefficient on r^16 | Coefficient on r^18 | Coefficient on r^20 |
| | 4.89916E−05 | 0.00E+00 | 0 | 0 | 0 |
| IMA surface of L2 | Coefficient on r^2 | Coefficient on r^4 | Coefficient on r^6 | Coefficient on r^8 | Coefficient on r^10 |
| | 0 | 0.24409123 | −0.17355054 | 0.070243881 | −0.004203009 |
| | Coefficient on r^12 | Coefficient on r^14 | Coefficient on r^16 | Coefficient on r^18 | Coefficient on r^20 |
| | −0.000699114 | 0 | 0 | 0 | 0 |
| OBJ surface of L2 | Coefficient on r^2 | Coefficient on r^4 | Coefficient on r^6 | Coefficient on r^8 | Coefficient on r^10 |
| | 0 | 0.038536069 | −0.11142259 | 0.013661737 | −0.021625202 |
| | Coefficient on r^12 | Coefficient on r^14 | Coefficient on r^16 | Coefficient on r^18 | Coefficient on r^20 |
| | −0.013949816 | 0 | 0 | 0 | 0 |
| IMA surface of L3 | Coefficient on r^2 | Coefficient on r^4 | Coefficient on r^6 | Coefficient on r^8 | Coefficient on r^10 |
| | 0 | −0.055902836 | −0.038874183 | 0.017980386 | −0.028521372 |
| | Coefficient on r^12 | Coefficient on r^14 | Coefficient on r^16 | Coefficient on r^18 | Coefficient on r^20 |
| | 0.042884788 | 0 | 0 | 0 | 0 |
| OBJ surface of L3 | Coefficient on r^2 | Coefficient on r^4 | Coefficient on r^6 | Coefficient on r^8 | Coefficient on r^10 |
| | 0 | −0.051388901 | −0.03247322 | 0.15238218 | −0.077963205 |
| | Coefficient on r^12 | Coefficient on r^14 | Coefficient on r^16 | Coefficient on r^18 | Coefficient on r^20 |
| | −0.013538712 | 0 | 0 | 0 | 0 |
| IMA surface of L4 | Coefficient on r^2 | Coefficient on r^4 | Coefficient on r^6 | Coefficient on r^8 | Coefficient on r^10 |
| | 0 | 0.13622006 | −0.16886925 | 0.34374751 | −0.58600811 |
| | Coefficient on r^12 | Coefficient on r^14 | Coefficient on r^16 | Coefficient on r^18 | Coefficient on r^20 |
| | 0.4616599 | 0 | 0 | 0 | 0 |
| OBJ surface of L4 | Coefficient on r^2 | Coefficient on r^4 | Coefficient on r^6 | Coefficient on r^8 | Coefficient on r^10 |
| | 0 | 0.009462623 | −0.012480374 | −0.01772093 | 0.044712063 |
| | Coefficient on r^12 | Coefficient on r^14 | Coefficient on r^16 | Coefficient on r^18 | Coefficient on r^20 |
| | 0.013373029 | 0 | 0 | 0 | 0 |
| IMA surface of L5 | Coefficient on r^2 | Coefficient on r^4 | Coefficient on r^6 | Coefficient on r^8 | Coefficient on r^10 |
| | 0 | 0.044795139 | 0.11055632 | −0.15080884 | −0.070661935 |
| | Coefficient on r^12 | Coefficient on r^14 | Coefficient on r^16 | Coefficient on r^18 | Coefficient on r^20 |
| | 0.095626162 | 0 | 0 | 0 | 0 |
| OBJ surface of L5 | Coefficient on r^2 | Coefficient on r^4 | Coefficient on r^6 | Coefficient on r^8 | Coefficient on r^10 |
| | 0 | 0.040196019 | −0.090194898 | 0.2241962 | −0.41489922 |
| | Coefficient on r^12 | Coefficient on r^14 | Coefficient on r^16 | Coefficient on r^18 | Coefficient on r^20 |
| | 0.22564468 | 0 | 0 | 0 | 0 |

Figure 12A:
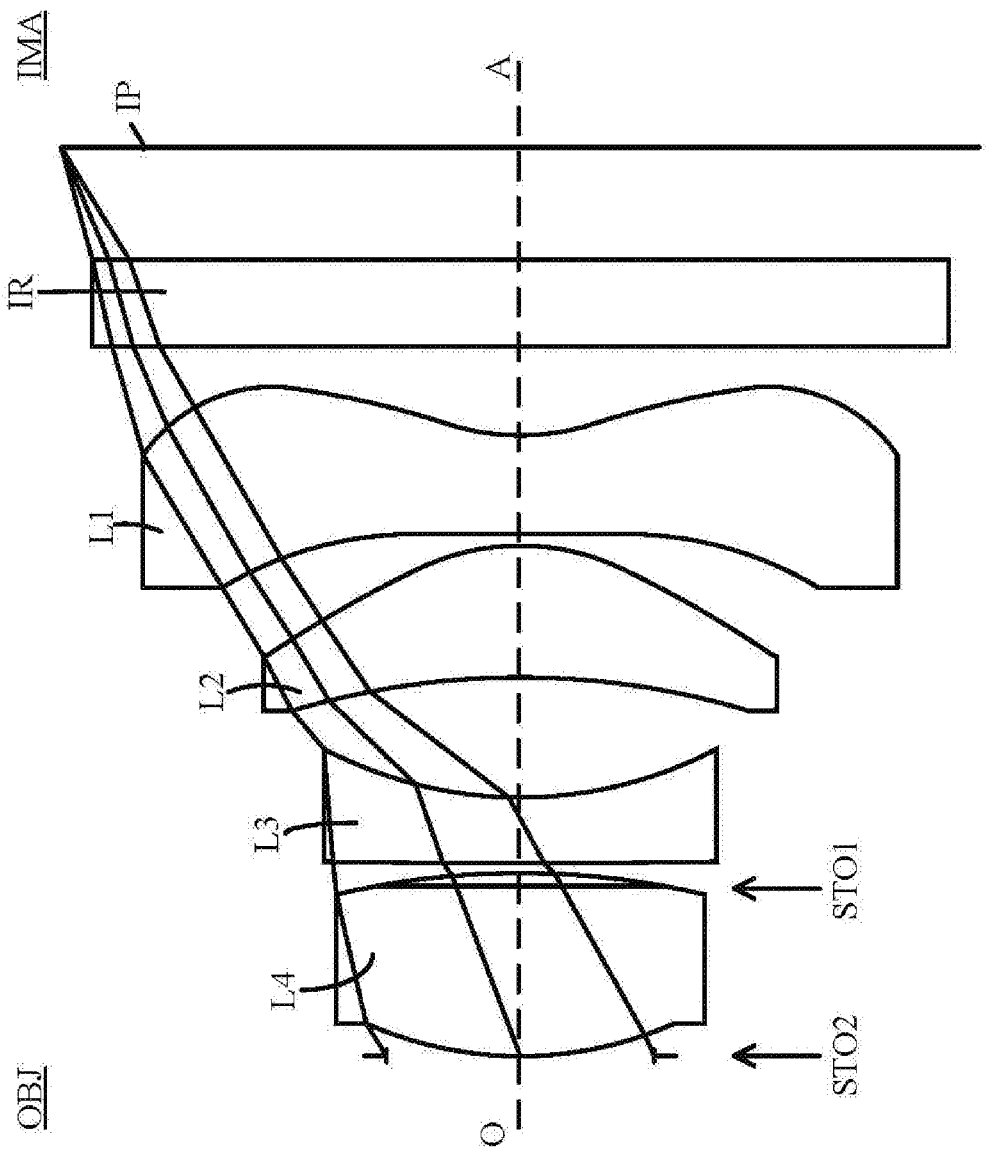
FIG. 12A is a schematic diagram showing an optical structure in accordance with a seventh embodiment of an optical lens of the present invention.

FIG. 12A is a schematic diagram showing an optical structure in accordance with a seventh embodiment of an optical lens of the present invention. The optical lens according to the seventh embodiment of the present invention comprises four pieces of lenses, which are a first lens L1, a second lens L2, a third lens L3, and a fourth lens L4 arranged in order from the image side IMA to the object side OBJ. The optical lens utilizes one low-dispersion lens L3 cooperating with three high-dispersion lenses L1, L2, and L4. The framework of its refractive power is negative, positive, negative, and positive in order form the image side to the object side. Specifically, the first lens L1 is a lens having negative refractive power, and the image-side surface thereof is a concave face and has at least a point of inflection arranged thereon. The second lens L2 is a lens having positive refractive power and has a concave surface facing the object side and a convex surface facing the image side. The third lens L3 is approximate to a meniscus concave lens. The fourth lens L4 is approximate to a bi-convex lens.

The optical lens according to the seventh embodiment of the present invention also has at least two aperture stops, that is, a first aperture stop STO1 and a second aperture stop STO2. The first aperture stop STO1 is disposed between the third lens L3 and the fourth lens L4 and the second aperture stop STO2 is disposed at the outside of the lens at the most object side (that is, the fourth lens L4). The distance on the optical axis from the first aperture stop STO1 to the image plane IP is SL1, the distance on the optical axis from the second aperture stop STO2 to the image plane IP is SL2, and the distance on the optical axis from the object-side surface of the lens at the most object side (that is, the fourth lens L4) to the image plane IP is TTL. The optical lens according to the seventh embodiment of the present invention satisfies the following equation: 1.2<(SL1+SL2)/TTL<2.5.

As shown in Table 5 below, related data of the respective lenses of the optical lens shown in FIG. 12A are shown in the condition that the first aperture stop STO1 is in an active state and the second aperture stop STO2 is in an inactive state. Table 5 shows that the focal length of the optical lens according to the seventh embodiment of the present invention is 2.224, and the refractive power for the respective lenses sequentially is −1.27834, 1.15622, −2.82002, and 1.81389 in order from L1, L2, L3, and L4. In the condition that the first aperture stop STO1 is in the active state, the effective f-number of this optical system is 1.8, the viewing angle is 70 degrees, and the total length of the optical lens is 3.09 mm. Further, in the condition that the second aperture stop STO2 is in the active state, the effective f-number of this optical system is 2.4.

TABLE 5

| Surface Index | | Radius of Curvature R (mm) | Thickness/ Distance D (mm) | Refractive Index (Nd) | Abbe No. (Vd) | Conic Constant |
|---|---|---|---|---|---|---|
| Focal length = 2.22 mm F-number = 1.8 Maximum half angle of view = 35 | | | | | | |
| R0 | Image Side | | | | | |
| R1 | IR | Plano | 0.377173 | 1.51633 | 64,14202 | 0 |
| R2 | | Plano | 0.3 | | | 0 |
| R3 | L1 | 0.634243 | 0.3 | 1.5441 | 56.0936 | −7.33354 |
| R4 | | 8.27339 | 0.33814 | | | −10914.700000 |
| R5 | L2 | −0.65879 | 0.035445 | 1.69003 | 52.75 | −3.17751 |
| R6 | | −2.65838 | 0.459447 | | | −8.45873 |
| R7 | L3 | 1.547733 | 0.397755 | 1.632755 | 23.29495 | −5.06099 |
| R8 | | 11.75026 | 0.229978 | | | 0 |
| R9 | STO1 | ∞ | 0.075473 | | | 0 |
| R10 | L4 | −3.3504 | −0.04548 | 1.54 | 56.0936 | 0 |
| R11 | | 1.313104 | 0.623902 | | | 0.124189 |
| R12 | STO2 | ∞ | 0 | | | 0 |
| R13 | Object Side | | | | | |

Table 6 shows related data of aspheric lenses shown in Table 5.

TABLE 6

| | Coefficient on r^2 | Coefficient on r^4 | Coefficient on r^6 | Coefficient on r^8 | Coefficient on r^10 |
|---|---|---|---|---|---|
| IMA surface of L1 | 0 | −0.28029487 | 0.22709754 | −0.15016616 | 0.034805119 |
| | Coefficient on r^12 | Coefficient on r^14 | Coefficient on r^16 | Coefficient on r^18 | Coefficient on r^20 |
| | −0.001965392 | 0.003020866 | −0.001881296 | −0.001881296 | −0.001881296 |
| OBJ surface of L1 | Coefficient on r^2 | Coefficient on r^4 | Coefficient on r^6 | Coefficient on r^8 | Coefficient on r^10 |
| | 0 | −0.28339184 | 0.21241489 | −0.093783116 | −0.033079793 |
| | Coefficient on r^12 | Coefficient on r^14 | Coefficient on r^16 | Coefficient on r^18 | Coefficient on r^20 |
| | 0.017751576 | −0.023275011 | 0.028276075 | 0.028276075 | 0.028276075 |
| IMA surface of L2 | Coefficient on r^2 | Coefficient on r^4 | Coefficient on r^6 | Coefficient on r^8 | Coefficient on r^10 |
| | 0 | 0.056170984 | −0.75262164 | 1.8432287 | −1.4175232 |
| | Coefficient on r^12 | Coefficient on r^14 | Coefficient on r^16 | Coefficient on r^18 | Coefficient on r^20 |
| | −0.81543338 | 1.2821335 | 0 | 0 | 0 |
| OBJ surface of L2 | Coefficient on r^2 | Coefficient on r^4 | Coefficient on r^6 | Coefficient on r^8 | Coefficient on r^10 |
| | 0 | 0.004277422 | 0.014660242 | −0.024193322 | 0.18893841 |
| | Coefficient on r^12 | Coefficient on r^14 | Coefficient on r^16 | Coefficient on r^18 | Coefficient on r^20 |
| | −1.7521547 | 2.2681374 | 0 | 0 | 0 |
| IMA surface of L3 | Coefficient on r^2 | Coefficient on r^4 | Coefficient on r^6 | Coefficient on r^8 | Coefficient on r^10 |
| | 0 | 0.12014168 | −0.039058636 | −0.73253478 | 4.5037627 |
| | Coefficient on r^12 | Coefficient on r^14 | Coefficient on r^16 | Coefficient on r^18 | Coefficient on r^20 |
| | 4.6527637 | 0 | 0 | 0 | 0 |

TABLE 6-continued

| | | | | | |
|---|---|---|---|---|---|
| OBJ surface of L3 | Coefficient on r^2<br>0 | Coefficient on r^4<br>−0.13331015 | Coefficient on r^6<br>−1.0335069 | Coefficient on r^8<br>5.1431284 | Coefficient on r^10<br>4.7487291 |
| | Coefficient on r^12<br>−1.1243573 | Coefficient on r^14<br>0 | Coefficient on r^16<br>0 | Coefficient on r^18<br>0 | Coefficient on r^20<br>0 |
| IMA surface of L4 | Coefficient on r^2<br>0 | Coefficient on r^4<br>−0.015180883 | Coefficient on r^6<br>−1.1936464 | Coefficient on r^8<br>4.9505495 | Coefficient on r^10<br>−5.7629299 |
| | Coefficient on r^12<br>0 | Coefficient on r^14<br>0 | Coefficient on r^16<br>0 | Coefficient on r^18<br>0 | Coefficient on r^20<br>0 |
| OBJ surface of L4 | Coefficient on r^2<br>0 | Coefficient on r^4<br>−0.047670449 | Coefficient on r^6<br>−0.1274337 | Coefficient on r^8<br>0.12082106 | Coefficient on r^10<br>−0.45177542 |
| | Coefficient on r^12<br>0 | Coefficient on r^14<br>0 | Coefficient on r^16<br>0 | Coefficient on r^18<br>0 | Coefficient on r^20<br>0 |

Figure 12C:
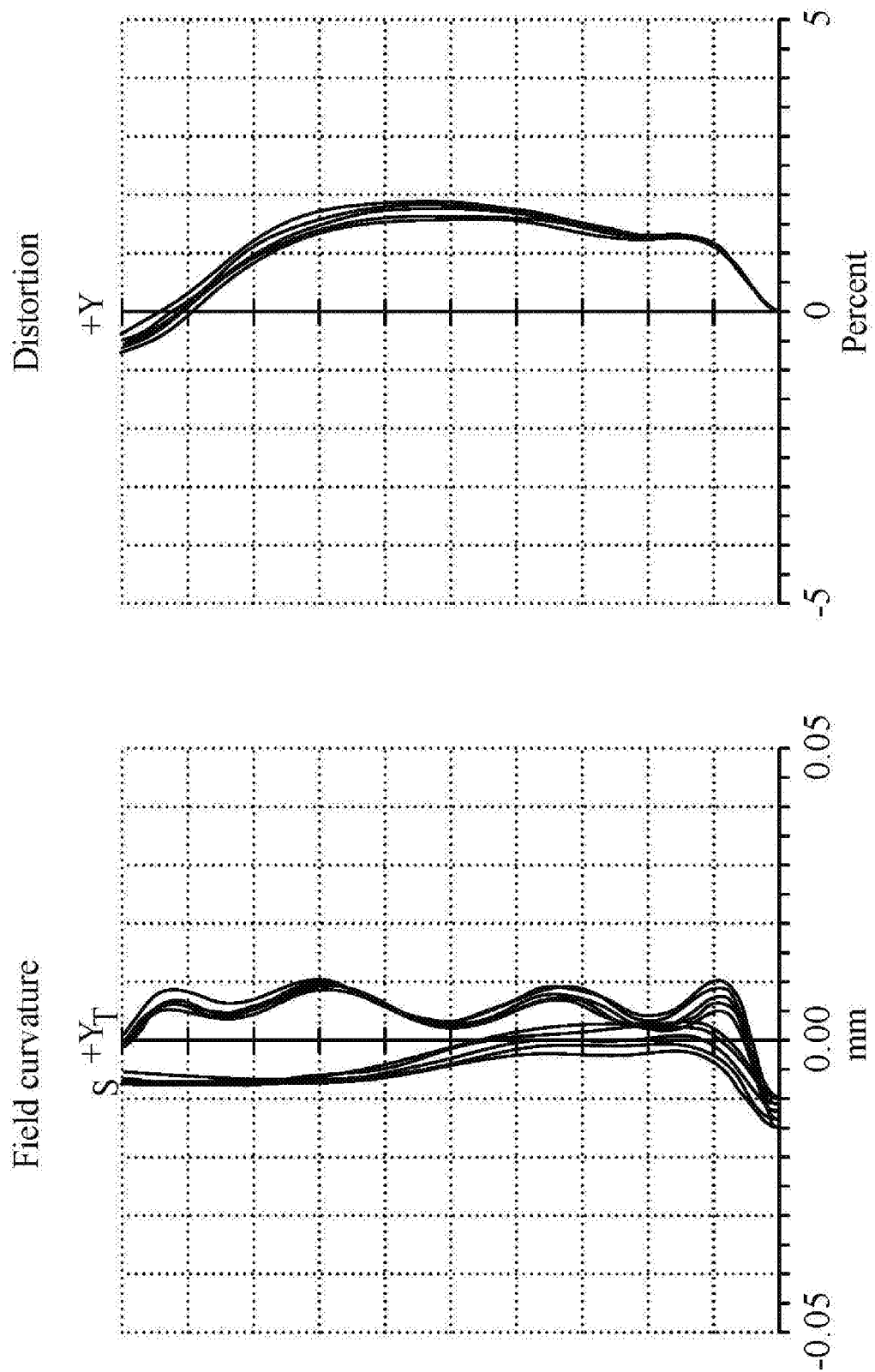
FIG. 12C is a diagram showing the optical performance including field curvature and distortion of the optical lens according to the seventh embodiment of the present invention in the condition that the first aperture stop is in the inactive state and the second aperture stop is in the active state.
Figure 12D:
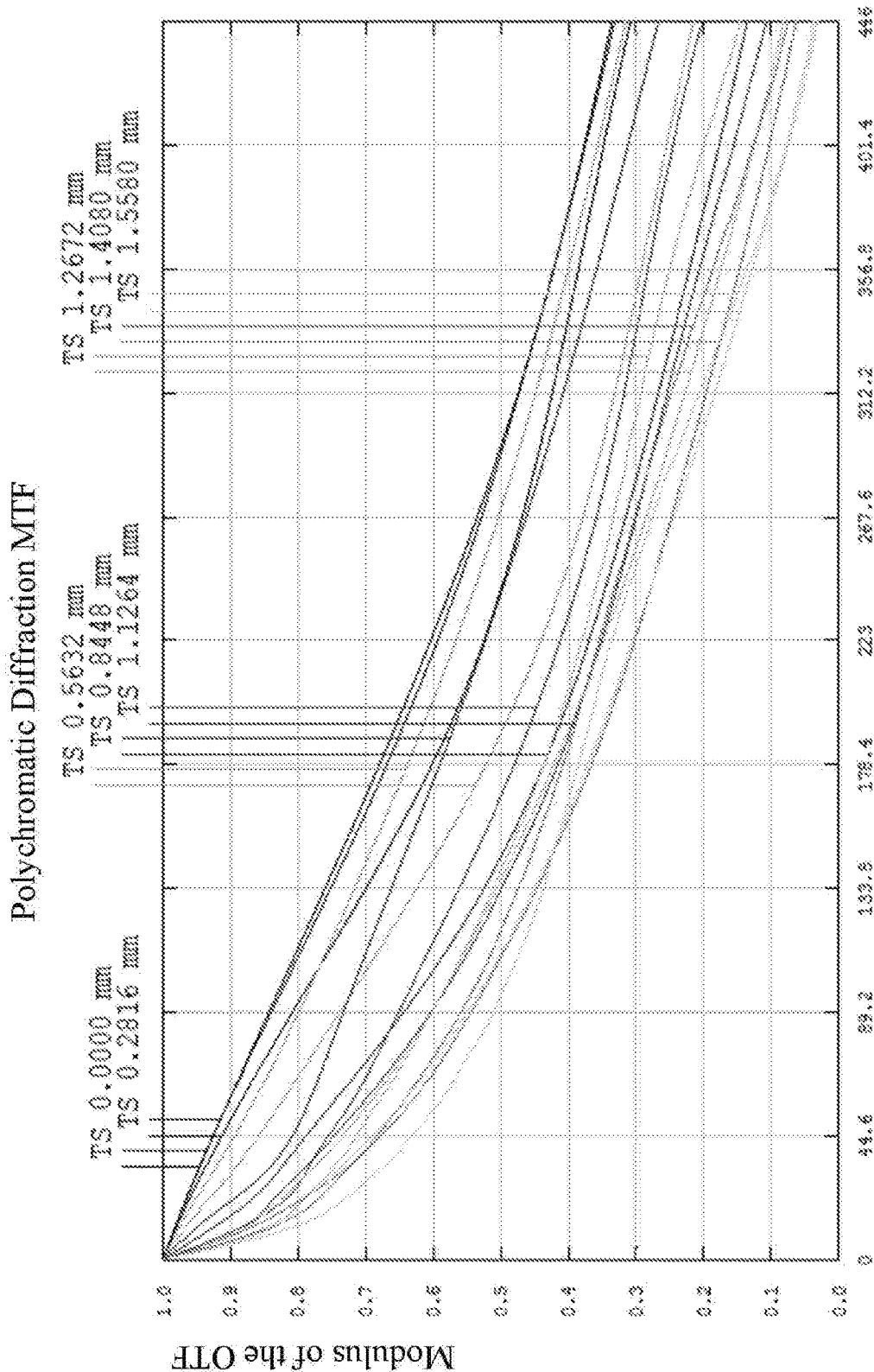
FIG. 12D is a diagram showing polychromatic diffraction modulation transfer function (MTF) of the optical lens according to the seventh embodiment of the present invention in the condition that the first aperture stop is in the active state and the second aperture stop is in the inactive state.
Figure 12E:
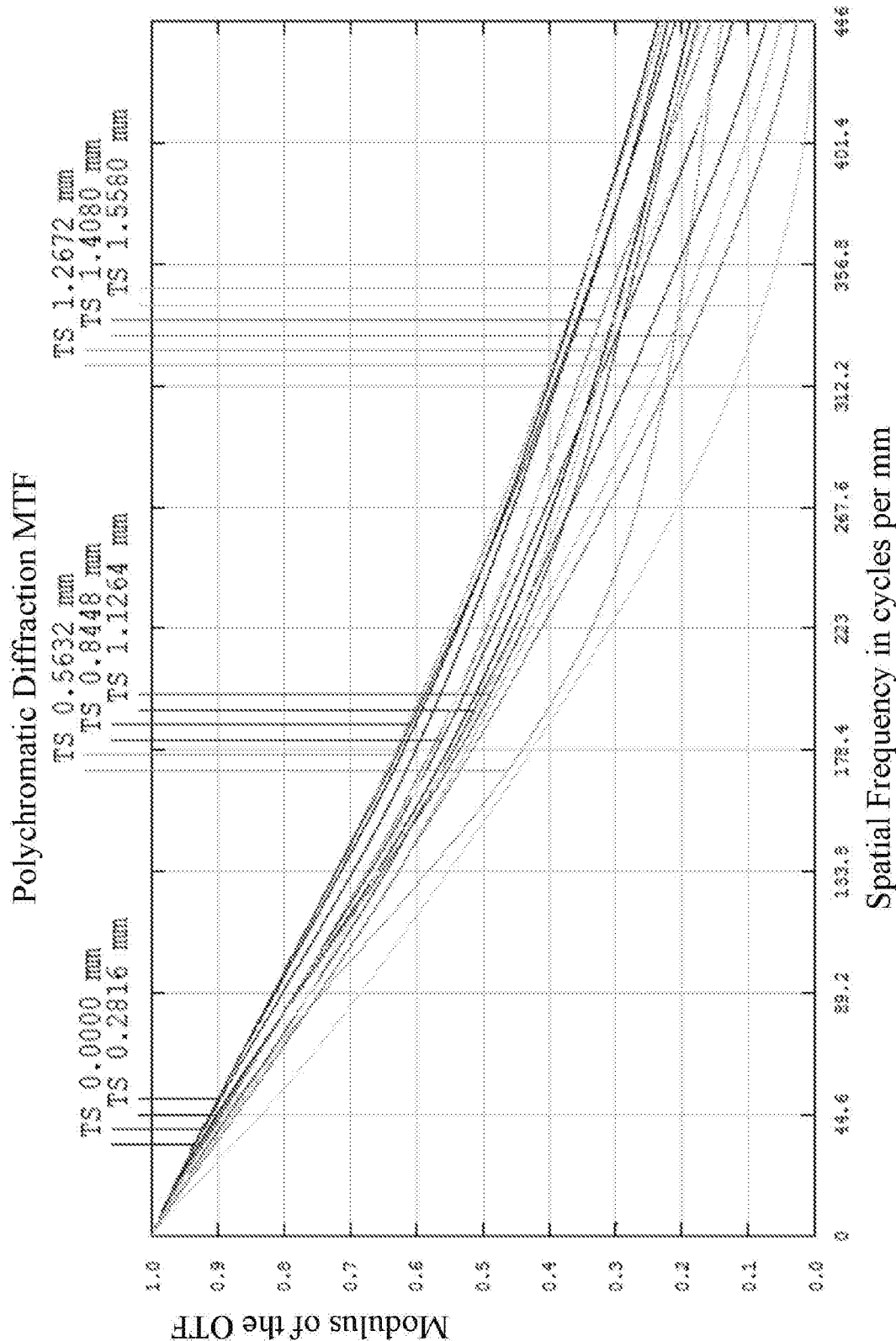
FIG. 12E is a diagram showing polychromatic diffraction modulation transfer function of the optical lens according to the seventh embodiment of the present invention in the condition that the first aperture stop is in the inactive state and the second aperture stop is in the active state.
Figure 13A:
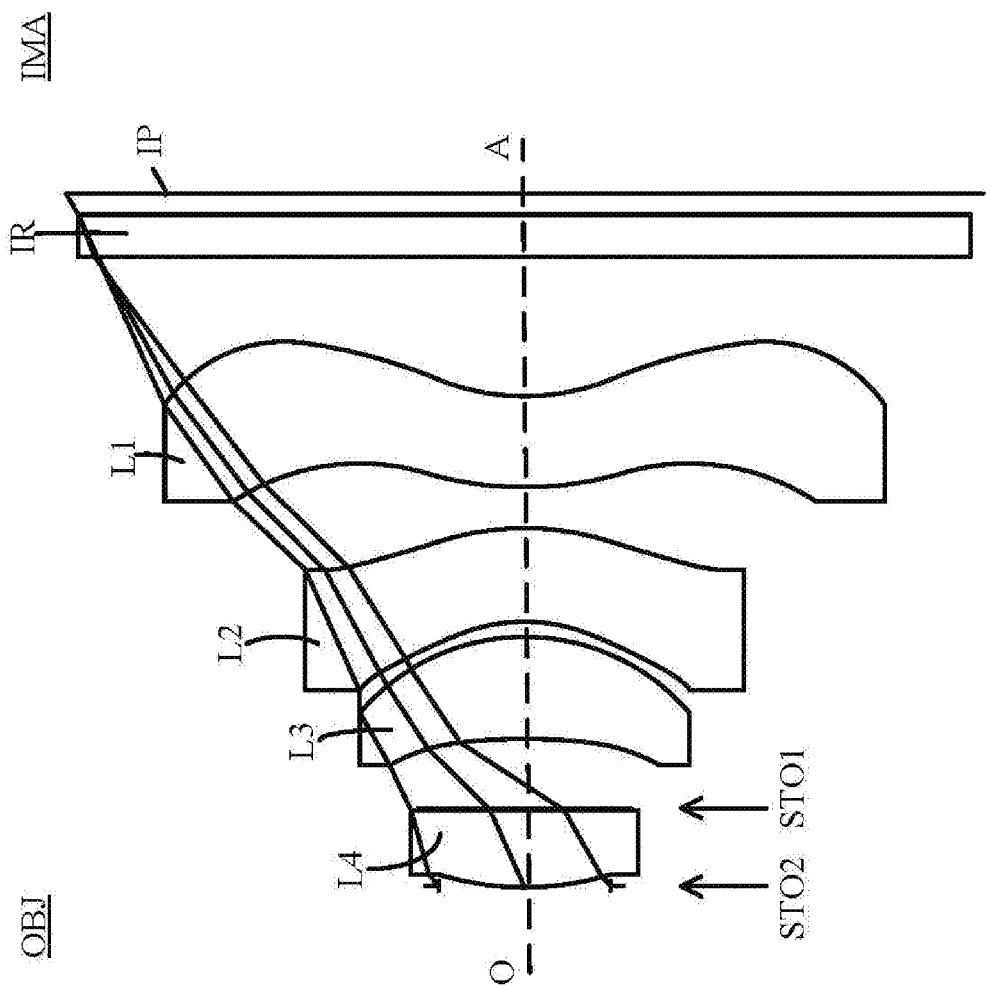
FIG. 13A is a schematic diagram showing an optical structure in accordance with an eighth embodiment of an optical lens of the present invention.
Figure 13B:
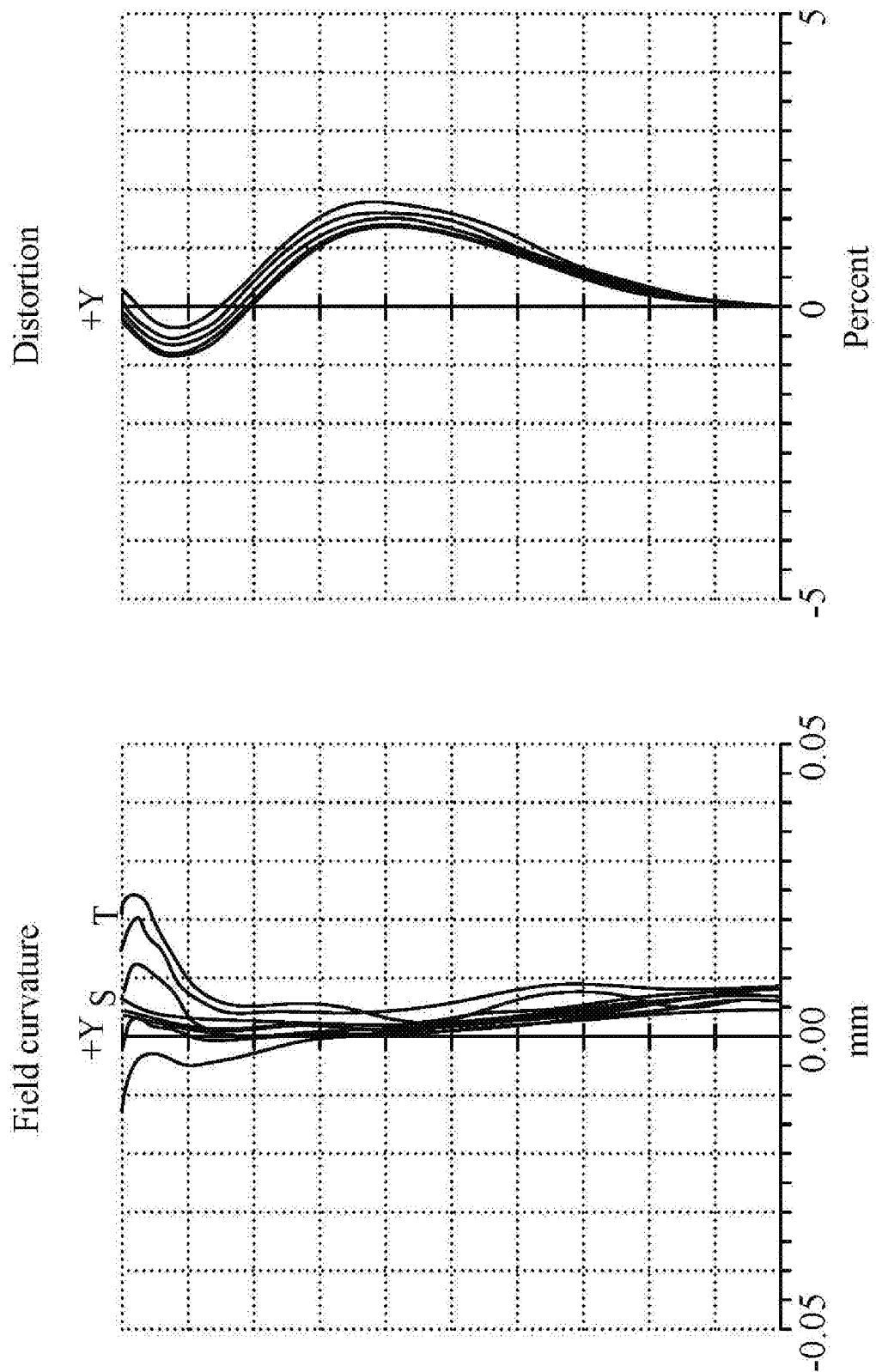
FIG. 13B is a diagram showing the optical performance including field curvature and distortion of the optical lens according to the eighth embodiment of the present invention in the condition that a first aperture stop is in an active state and a second aperture stop is in an inactive state.
Figure 13D:
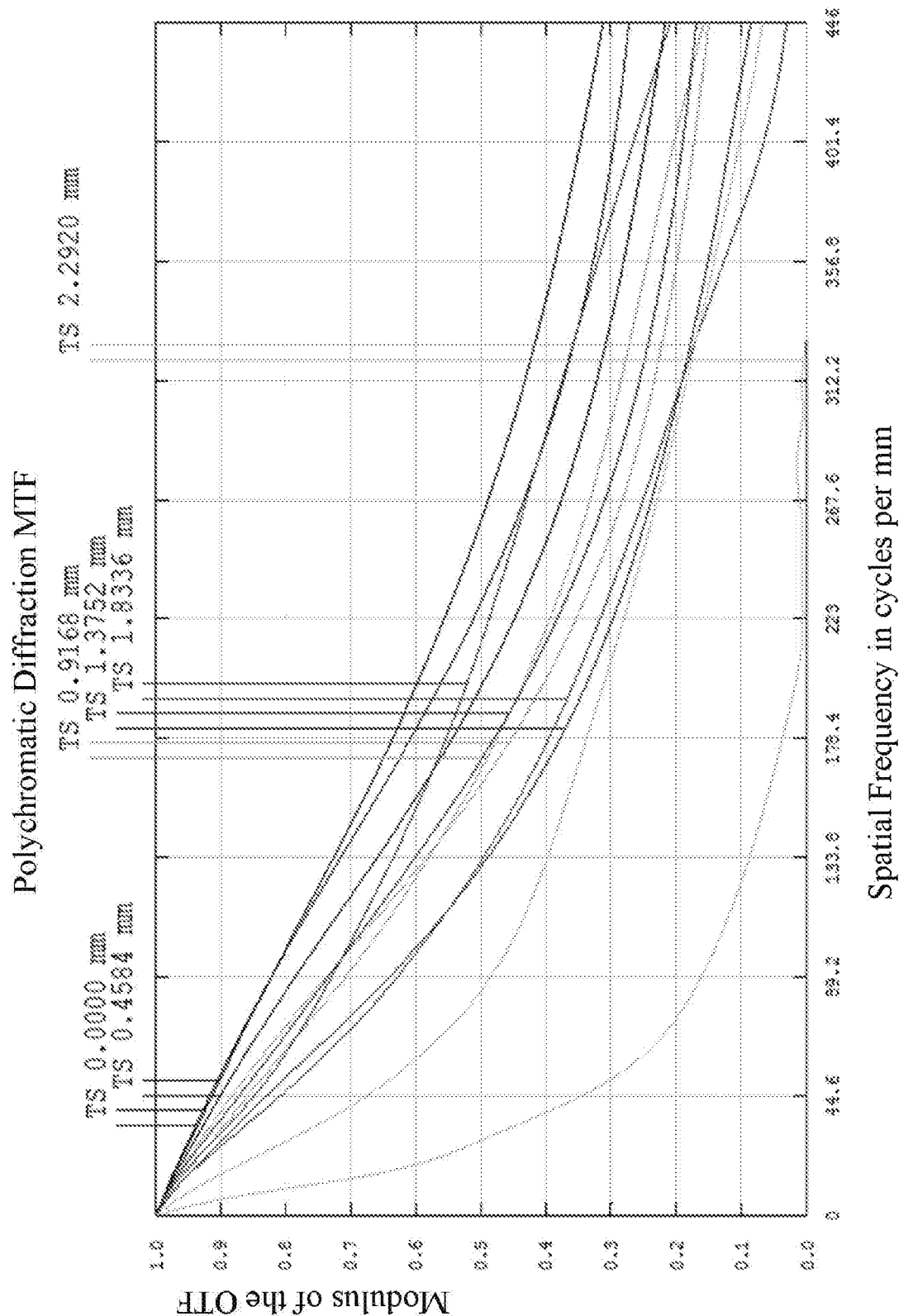
FIG. 13D is a diagram showing polychromatic diffraction modulation transfer function (MTF) of the optical lens according to the eighth embodiment of the present invention in the condition that the first aperture stop is in the active state and the second aperture stop is in the inactive state.
Figure 13E:
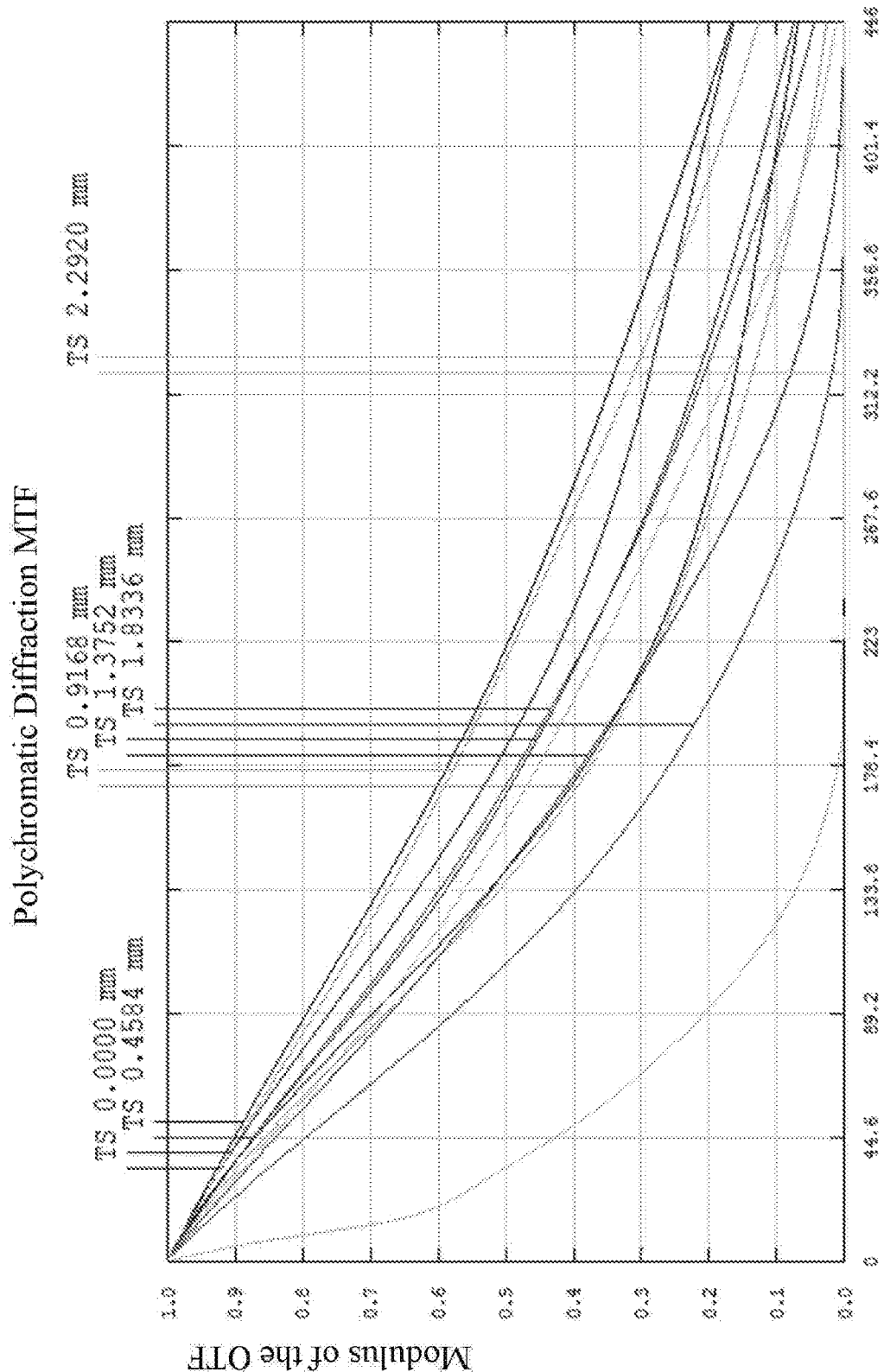
FIG. 13E is a diagram showing polychromatic diffraction modulation transfer function of the optical lens according to the eighth embodiment of the present invention in the condition that the first aperture stop is in the inactive state and the second aperture stop is in the active state.
Figure 14A:
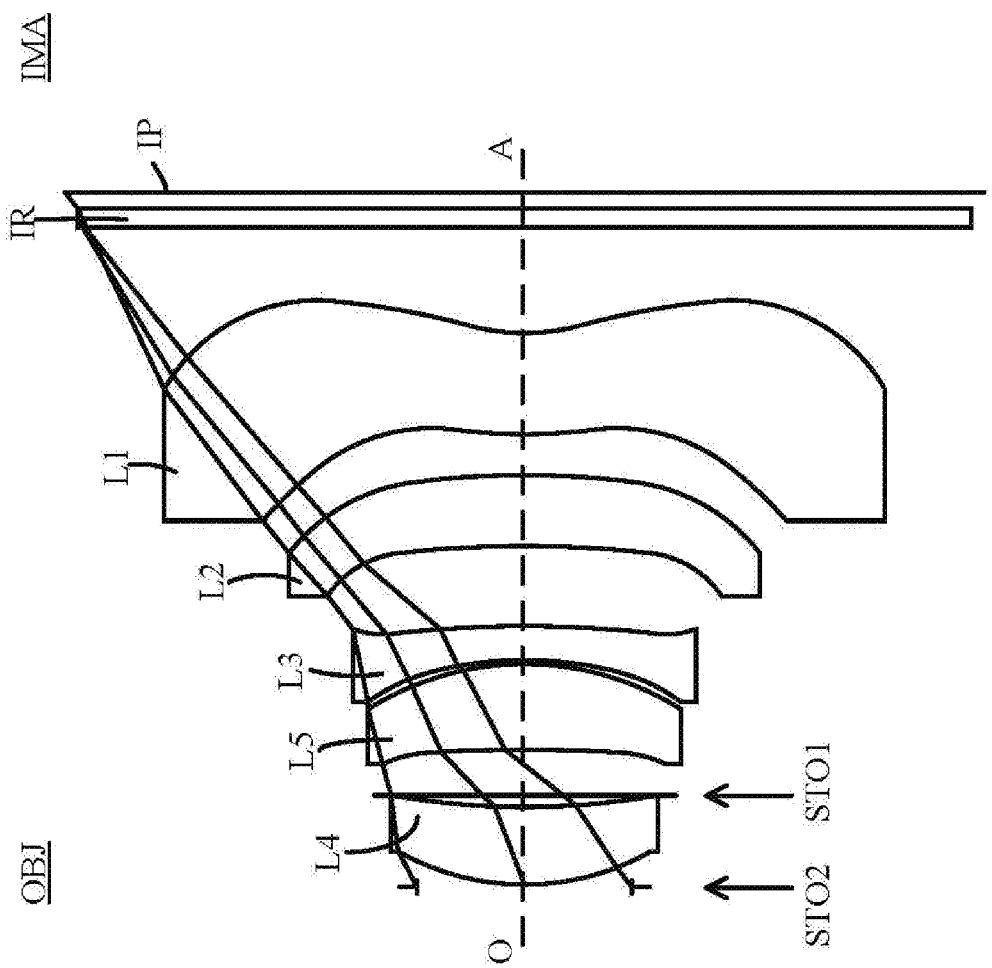
FIG. 14A is a schematic diagram showing an optical structure in accordance with a ninth embodiment of an optical lens of the present invention.
Figure 14B:
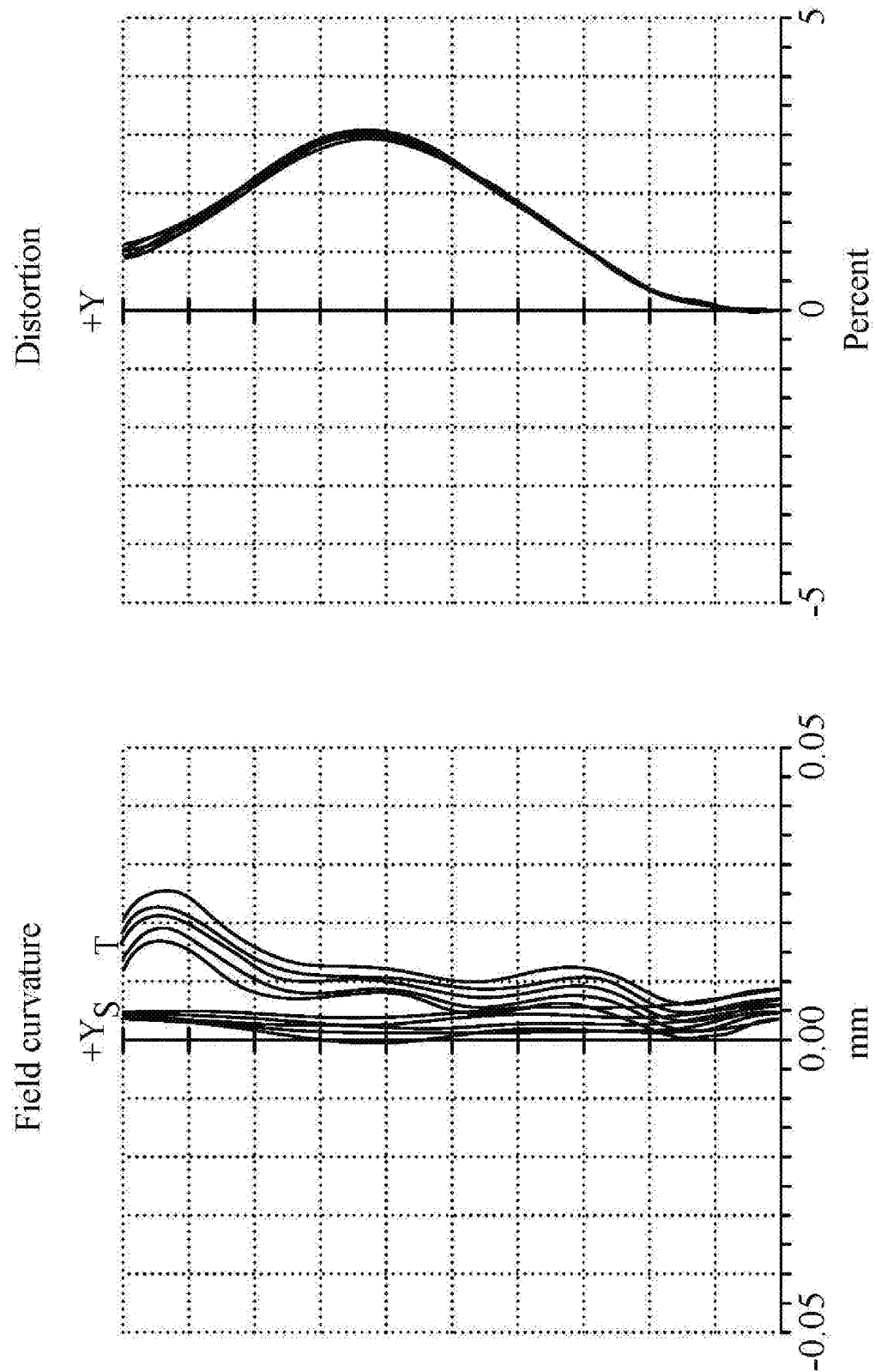
FIG. 14B is a diagram showing the optical performance including field curvature and distortion of the optical lens according to the ninth embodiment of the present invention in the condition that a first aperture stop is in an active state and a second aperture stop is in an inactive state.
Figure 14C:
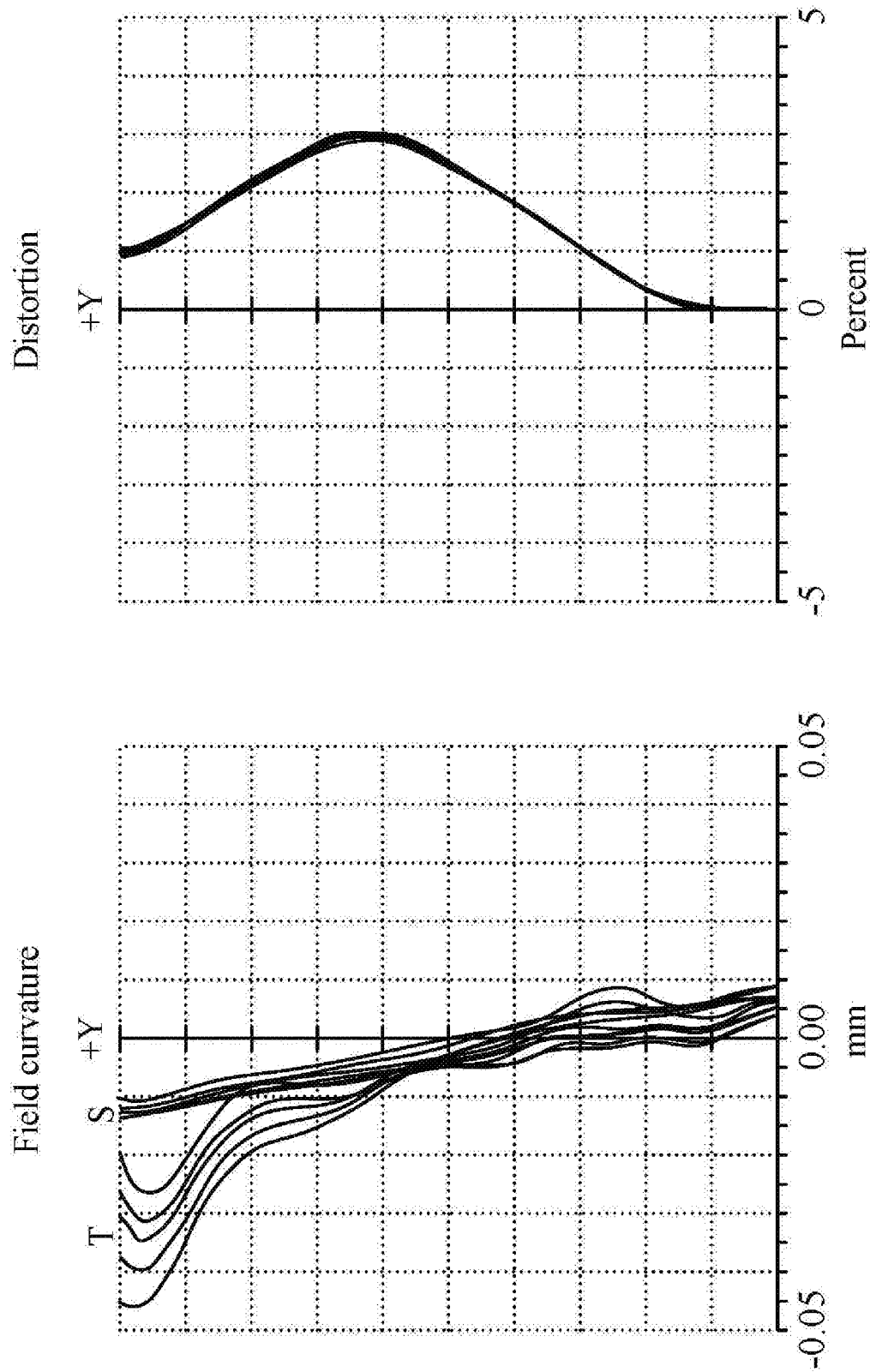
FIG. 14C is a diagram showing the optical performance including field curvature and distortion of the optical lens according to the ninth embodiment of the present invention in the condition that the first aperture stop is in the inactive state and the second aperture stop is in the active state.
Figure 14D:
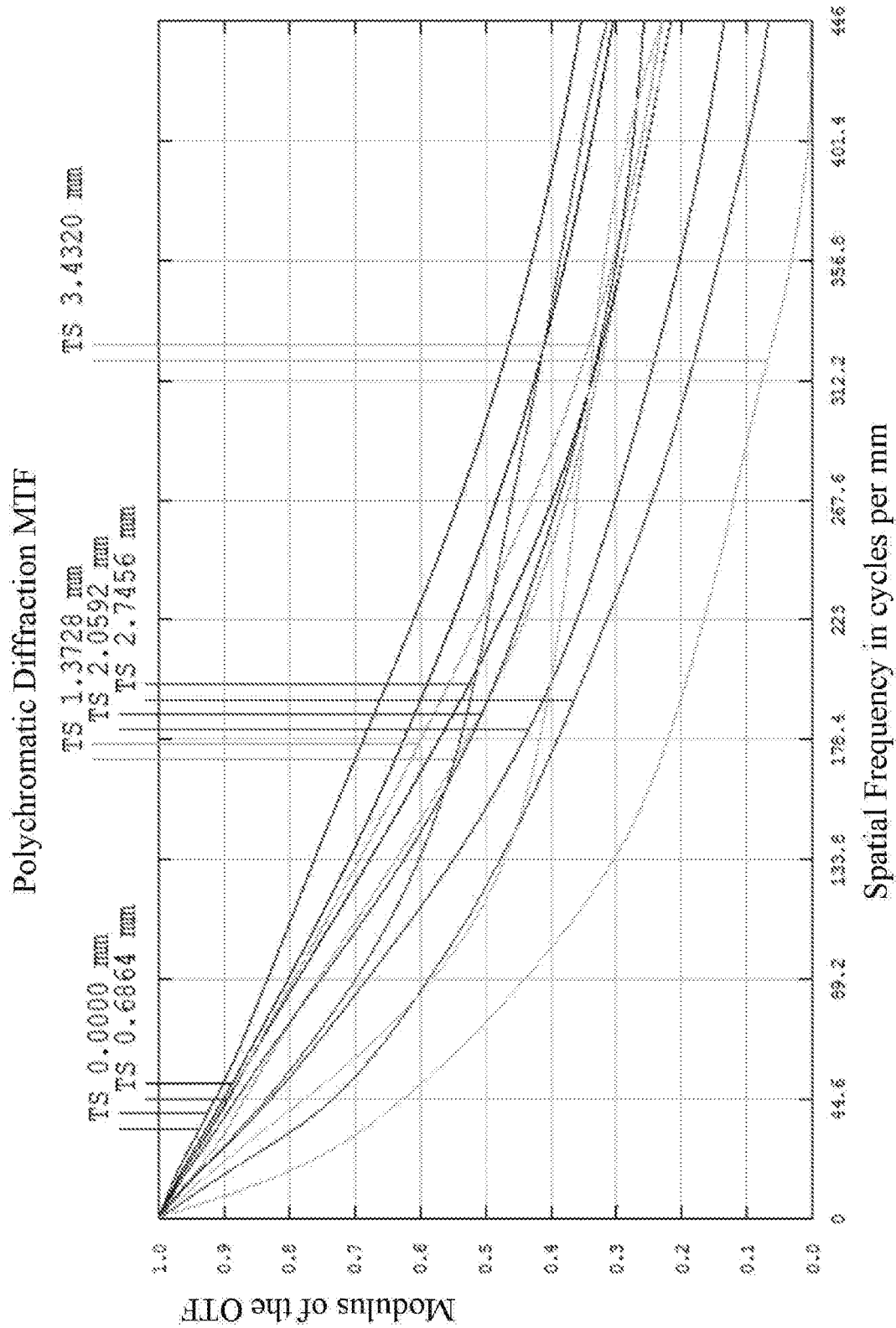
FIG. 14D is a diagram showing polychromatic diffraction modulation transfer function (MTF) of the optical lens according to the ninth embodiment of the present invention in the condition that the first aperture stop is in the active state and the second aperture stop is in the inactive state.
Figure 14E:
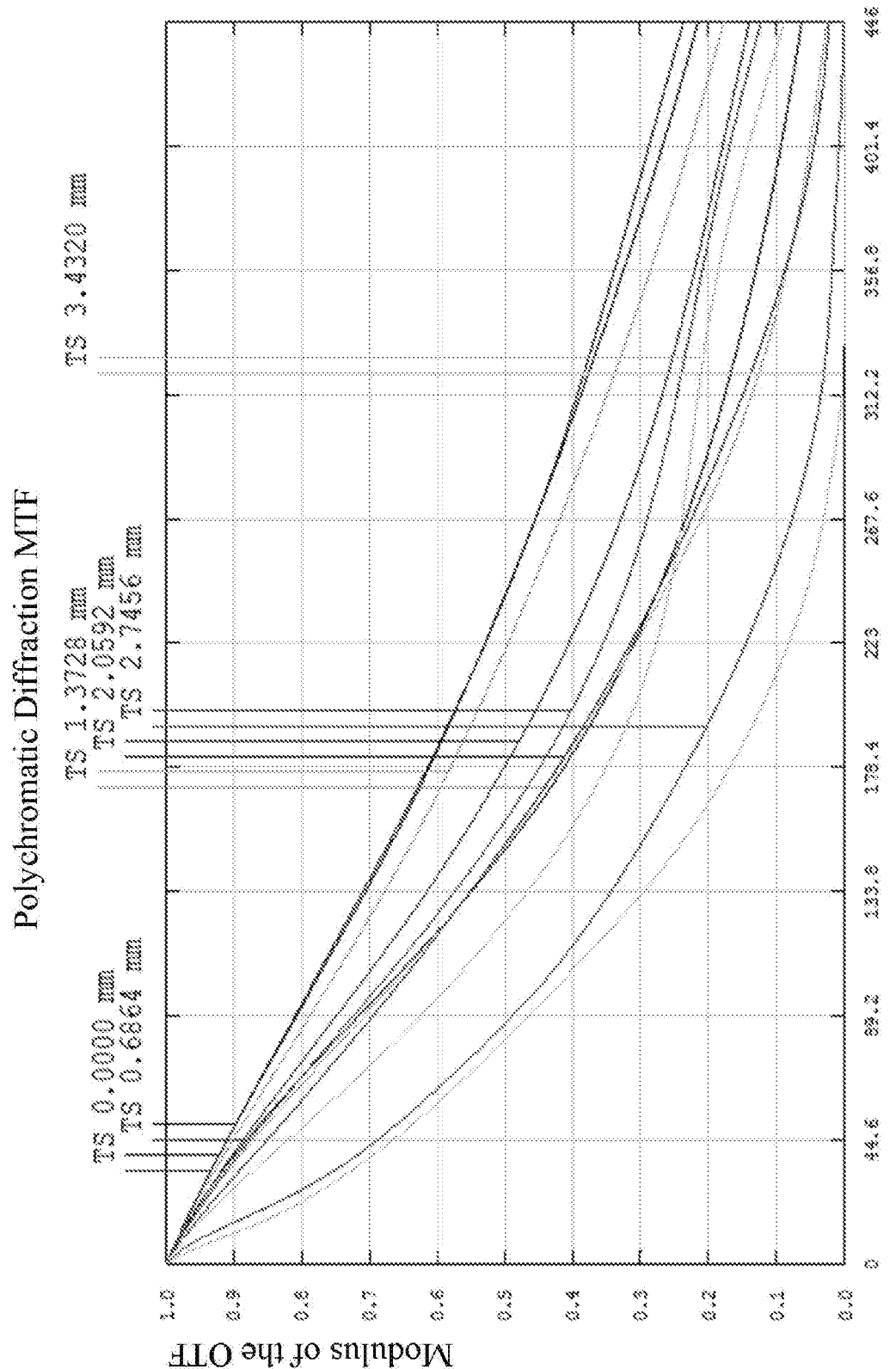
FIG. 14E is a diagram showing polychromatic diffraction modulation transfer function of the optical lens according to the ninth embodiment of the present invention in the condition that the first aperture stop is in the inactive state and the second aperture stop is in the active state.

FIG. 12B is a diagram showing the optical performance including field curvature and distortion of the optical lens according to the seventh embodiment of the present invention in the condition that the first aperture stop STO1 is in the active state and the second aperture stop STO2 is in the inactive state. FIG. 12C is a diagram showing the optical performance including field curvature and distortion of the optical lens according to the seventh embodiment of the present invention in the condition that the first aperture stop STO1 is in the inactive state and the second aperture stop STO2 is in the active state. FIG. 12D is a diagram showing polychromatic diffraction modulation transfer function (MTF) of the optical lens according to the seventh embodiment of the present invention in the condition that the first aperture stop STO1 is in the active state and the second aperture stop STO2 is in the inactive state. FIG. 12E is a diagram showing polychromatic diffraction modulation transfer function of the optical lens according to the seventh embodiment of the present invention in the condition that the first aperture stop STO1 is in the inactive state and the second aperture stop STO2 is in the active state.

TABLE 7

Focal length = 2.318 mm F-number = 1.8 Maximum half angle of view = 44.5

| Surface Index | | Radius of Curvature R (mm) | Thickness/ Distance D (mm) | Refractive Index (Nd) | Abbe No. (Vd) | Conic Constant |
|---|---|---|---|---|---|---|
| R0 | Image Side | | | | | |
| R1 | IR | Plano | 0.105362 | 1.51633 | 64.14202 | 0 |
| R2 | | Plano | 0.21 | | | 0 |
| R3 | L1 | 0.898954 | 0.6844 | 1.5441 | 56.0936 | −2.90282 |
| R4 | | 1.195782 | 0.452062 | | | −0.44492 |
| R5 | L2 | −1.26429 | 0.202173 | 1.650958 | 21.51361 | 0.051651 |
| R6 | | −0.76452 | 0.455948 | | | −0.24406 |
| R7 | L3 | −1.19373 | 0.081371 | 1.755 | 51.2 | 0.037002 |
| R8 | | 4.0376 | 0.499949 | | | 5.994392 |
| R9 | STO1 | ∞ | 0.35304 | | | 0 |
| R10 | L4 | 8.735552 | 0.003026 | 1.755 | 51.2 | 0 |
| R11 | | 1.905175 | 0.362252 | | | 2.440844 |
| R12 | STO2 | ∞ | 0 | | | 0 |
| R13 | Object Side | | | | | |

Table 8 shows related data of aspheric lenses shown in Table 7.

TABLE 8

| | | | | | |
|---|---|---|---|---|---|
| IMA surface of L1 | Coefficient on r^2<br>0 | Coefficient on r^4<br>−0.23128355 | Coefficient on r^6<br>0.14175378 | Coefficient on r^8<br>−0.067994162 | Coefficient on r^10<br>0.0213542 |
| | Coefficient on r^12<br>−0.004568351 | Coefficient on r^14<br>0.000508655 | Coefficient on r^16<br>−1.12562E−05 | Coefficient on r^18<br>−1.12562E−05 | Coefficient on r^20<br>−1.12562E−05 |
| OBJ surface of L1 | Coefficient on r^2<br>0 | Coefficient on r^4<br>−0.52650509 | Coefficient on r^6<br>0.25194 | Coefficient on r^8<br>−0.17353961 | Coefficient on r^10<br>0.14660685 |
| | Coefficient on r^12<br>−0.10183205 | Coefficient on r^14<br>0.039677909 | Coefficient on r^16<br>−0.006161127 | Coefficient on r^18<br>−0.006161127 | Coefficient on r^20<br>−0.006161127 |
| IMA surface of L2 | Coefficient on r^2<br>0 | Coefficient on r^4<br>0.27010932 | Coefficient on r^6<br>0.06650994 | Coefficient on r^8<br>−0.32301541 | Coefficient on r^10<br>0.77365395 |
| | Coefficient on r^12<br>−0.94713717 | Coefficient on r^14<br>0.59387626 | Coefficient on r^16<br>−0.14295684 | Coefficient on r^18<br>−0.14295684 | Coefficient on r^20<br>−0.14295684 |
| OBJ surface of L2 | Coefficient on r^2<br>0 | Coefficient on r^4<br>0.66898512 | Coefficient on r^6<br>−0.61306349 | Coefficient on r^8<br>1.4858343 | Coefficient on r^10<br>−1.342644 |
| | Coefficient on r^12<br>2.9844358 | Coefficient on r^14<br>−6.412385 | Coefficient on r^16<br>4.6891119 | Coefficient on r^18<br>4.6891119 | Coefficient on r^20<br>4.6891119 |
| IMA surface of L3 | Coefficient on r^2<br>0 | Coefficient on r^4<br>−0.14982592 | Coefficient on r^6<br>0.078819059 | Coefficient on r^8<br>−0.63534856 | Coefficient on r^10<br>2.5712369 |
| | Coefficient on r^12<br>−3.7370466 | Coefficient on r^14<br>1.9102048 | Coefficient on r^16<br>−0.30854624 | Coefficient on r^18<br>−0.30854624 | Coefficient on r^20<br>−0.30854624 |

TABLE 8-continued

| | | | | | |
|---|---|---|---|---|---|
| OBJ surface of L3 | Coefficient on r^2<br>0 | Coefficient on r^4<br>−0.28823379 | Coefficient on r^6<br>−0.22965413 | Coefficient on r^8<br>0.14621395 | Coefficient on r^10<br>−1.3892127 |
| | Coefficient on r^12<br>−0.77150298 | Coefficient on r^14<br>17.474959 | Coefficient on r^16<br>−20.688299 | Coefficient on r^18<br>−20.688299 | Coefficient on r^20<br>−20.688299 |
| IMA surface of L4 | Coefficient on r^2<br>0 | Coefficient on r^4<br>−0.178712 | Coefficient on r^6<br>0.39455994 | Coefficient on r^8<br>−2.7937285 | Coefficient on r^10<br>1.5267098 |
| | Coefficient on r^12<br>28.838141 | Coefficient on r^14<br>−82.831787 | Coefficient on r^16<br>66.34717 | Coefficient on r^18<br>66.34717 | Coefficient on r^20<br>66.34717 |
| OBJ surface of L4 | Coefficient on r^2<br>0 | Coefficient on r^4<br>−0.087825582 | Coefficient on r^6<br>−0.23623031 | Coefficient on r^8<br>0.25832584 | Coefficient on r^10<br>−0.042191405 |
| | Coefficient on r^12<br>4.1396749 | Coefficient on r^14<br>10.902824 | Coefficient on r^16<br>−9.0782311 | Coefficient on r^18<br>−9.0782311 | Coefficient on r^20<br>−9.0782311 |

TABLE 9

Focal length = 4.15 mm F-number = 1.6 Maximum half angle of view = 39.5

| Surface Index | | Radius of Curvature R (mm) | Thickness/ Distance D (mm) | Refractive Index (Nd) | Abbe No (Vd) | Conic Constant |
|---|---|---|---|---|---|---|
| R0 | Image Side | | | | | |
| R1 | IR | Plano | 0.11413 | 1.5168 | 64.16734 | 0 |
| R2 | | Plano | 0.145 | | | 0 |
| R3 | L1 | ∞ | 0.8 | 1.535037 | 55.71072 | −5.44208 |
| R4 | | 3.015938 | 0.745032 | | | −17.1337 |
| R5 | L2 | −6.7872 | 0.313655 | 1.651 | 21.5 | 12.06767 |
| R6 | | −16.0254 | 0.554647 | | | −2555.19 |
| R7 | L3 | −100.075 | 0.591153 | 1.651 | 21.5 | −11896 |
| R8 | | −3.08129 | 0.232166 | | | 0 |
| R9 | L5 | −2.76701 | 0.038179 | 1.79679 | 45.35 | 0 |
| R10 | | −15.7774 | 0.641223 | | | 0 |
| R11 | STO1 | ∞ | 0.345203 | | | 0 |
| R12 | L4 | 4.659665 | 0.078218 | 1.59 | 61.18 | 0 |
| R13 | | 1.870937 | 0.598805 | | | −0.69405 |
| R14 | STO2 | ∞ | 0 | | | 0 |
| R15 | Object Side | | | | | |

Table 10 shows related data of aspheric lenses shown in Table 9.

TABLE 10

| | | | | | |
|---|---|---|---|---|---|
| IMA surface of L1 | Coefficient on r^2<br>0 | Coefficient on r^4<br>−0.071190542 | Coefficient on r^6<br>0.024244691 | Coefficient on r^8<br>−0.00591398 | Coefficient on r^10<br>0.000790785 |
| | Coefficient on r^12<br>4.92E−05 | Coefficient on r^14<br>3.19E−08 | Coefficient on r^16<br>9.62427E−08 | Coefficient on r^18<br>9.62427E−08 | Coefficient on r^20<br>9.62427E−08 |
| OBJ surface of L1 | Coefficient on r^2<br>0 | Coefficient on r^4<br>−0.16500606 | Coefficient on r^6<br>0.062901685 | Coefficient on r^8<br>−0.014461672 | Coefficient on r^10<br>−0.000675361 |
| | Coefficient on r^12<br>0.000665084 | Coefficient on r^14<br>−5.40E−06 | Coefficient on r^16<br>−9.74299E−06 | Coefficient on r^18<br>−9.74299E−06 | Coefficient on r^20<br>−9.74299E−06 |
| IMA surface of L2 | Coefficient on r^2<br>0 | Coefficient on r^4<br>−0.03644324 | Coefficient on r^6<br>0.056433494 | Coefficient on r^8<br>−0.048174107 | Coefficient on r^10<br>0.01705914 |
| | Coefficient on r^12<br>−0.002686547 | Coefficient on r^14<br>−6.06425E−05 | Coefficient on r^16<br>6.32451E−05 | Coefficient on r^18<br>6.32451E−05 | Coefficient on r^20<br>6.32451E−05 |
| OBJ surface of L2 | Coefficient on r^2<br>0 | Coefficient on r^4<br>−0.035879366 | Coefficient on r^6<br>0.049041986 | Coefficient on r^8<br>−0.087187532 | Coefficient on r^10<br>0.05414856 |
| | Coefficient on r^12<br>−0.016025378 | Coefficient on r^14<br>0.000179043 | Coefficient on r^16<br>0.000657297 | Coefficient on r^18<br>0.000657297 | Coefficient on r^20<br>0.000657297 |
| IMA surface of L3 | Coefficient on r^2<br>0 | Coefficient on r^4<br>−0.061833968 | Coefficient on r^6<br>0.014413759 | Coefficient on r^8<br>0.036786997 | Coefficient on r^10<br>−0.029378927 |
| | Coefficient on r^12<br>0.008084592 | Coefficient on r^14<br>0.001797025 | Coefficient on r^16<br>0.000727565 | Coefficient on r^18<br>−0.000727565 | Coefficient on r^20<br>−0.000727565 |
| OBJ surface of L3 | Coefficient on r^2<br>0 | Coefficient on r^4<br>−0.07261039 | Coefficient on r^6<br>−0.018200106 | Coefficient on r^8<br>0.075646828 | Coefficient on r^10<br>−0.013022632 |
| | Coefficient on r^12<br>−0.024606296 | Coefficient on r^14<br>0.007762861 | Coefficient on r^16<br>−0.000321085 | Coefficient on r^18<br>−0.000321085 | Coefficient on r^20<br>−0.000321085 |
| IMA surface of L4 | Coefficient on r^2<br>0 | Coefficient on r^4<br>−0.015873347 | Coefficient on r^6<br>0.023847742 | Coefficient on r^8<br>−0.053177251 | Coefficient on r^10<br>0.022204617 |
| | Coefficient on r^12<br>0.007014824 | Coefficient on r^14<br>−0.015851821 | Coefficient on r^16<br>0.005477248 | Coefficient on r^18<br>0.005477248 | Coefficient on r^20<br>0.005477248 |

TABLE 10-continued

| | Coefficient on r^2 | Coefficient on r^4 | Coefficient on r^6 | Coefficient on r^8 | Coefficient on r^10 |
|---|---|---|---|---|---|
| OBJ surface of L4 | 0 | 0.006465554 | 0.01071186 | −0.00123002 | −0.022193926 |
| | Coefficient on r^12 | Coefficient on r^14 | Coefficient on r^16 | Coefficient on r^18 | Coefficient on r^20 |
| | 0.025220379 | −0.011482542 | 0.000917697 | 0.000917697 | 0.000917697 |
| IMA surface of L5 | Coefficient on r^2 | Coefficient on r^4 | Coefficient on r^6 | Coefficient on r^8 | Coefficient on r^10 |
| | 0 | −0.017238977 | −0.037305922 | 0.010955635 | 0.046272346 |
| | Coefficient on r^12 | Coefficient on r^14 | Coefficient on r^16 | Coefficient on r^18 | Coefficient on r^20 |
| | −0.044312667 | 0.006289162 | 0.002419004 | 0.002419004 | 0.002419004 |
| OBJ surface of L5 | Coefficient on r^2 | Coefficient on r^4 | Coefficient on r^6 | Coefficient on r^8 | Coefficient on r^10 |
| | 0 | −0.019858833 | −0.025689834 | 0.000320202 | 0.014439705 |
| | Coefficient on r^12 | Coefficient on r^14 | Coefficient on r^16 | Coefficient on r^18 | Coefficient on r^20 |
| | −0.025103433 | 0.009597725 | 0.000453701 | 0.000453701 | 0.000453701 |

In the embodiments of the present invention, the shutter blade has a hole having an aperture. The aperture of a camera lens can be adjusted by driving the shutter blade using a driver and thus making the hole move toward the optical axis and shift to a position overlapping the original aperture. There can have multiple sets of the shutter blade and the driver so as to carry out a multi-stage aperture adjustment of the camera lens. An adjustment of depth of field can thus be carried out by a selection of aperture. In addition, in the embodiments of the present invention, one shutter blade is cooperated with one driver. It is convenient in replacement when these components are malfunctioned.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A camera device, which is disposed in an electronic apparatus, comprising:
   an optical system frame;
   the electronic apparatus having an external shell with an opening exposed;
   a lens system deployed in the external shell of the electronic apparatus and mounted on the optical system frame;
   a bottom plate fastened to the optical system frame or formed by extending from the optical system frame;
   a cover plate fastened to the bottom plate and distanced away from the bottom plate;
   a fastening member having a base and an elongated part extending from the base, the base of the fastening member accommodated in the bottom plate, and the elongated part of the fastening member penetrating the bottom plate and fastened to the cover plate;
   at least one shutter blade disposed between the cover plate and the bottom plate, configured to adjust an aperture of the camera device; and
   a transparent plate forming an accommodating space for accommodating the optical system frame, the bottom plate, and the cover plate, the transparent plate being located in the external shell and a part of the transparent plate being located between the bottom plate and the opening of the external shell, or between the cover plate and the opening of the external shell.

2. The camera device according to claim 1, wherein the part of the transparent plate, the cover plate, the at least one shutter blade, and the bottom plate are arranged in order from the opening of the external shell to the lens system.

3. The camera device according to claim 2, wherein the cover plate has a first opening, the bottom plate has a second opening, and light rays are transmitted to the lens system sequentially via the opening of the external shell, the part of the transparent plate, the first opening, and the second opening or emitted out from the opening of the external shell in a reverse order.

4. The camera device according to claim 1, wherein the part of the transparent plate, the bottom plate, the at least one shutter blade, and the cover plate are arranged in order from the opening of the external shell to the lens system.

5. The camera device according to claim 4, wherein the cover plate has a first opening, the bottom plate has a second opening, and light rays are transmitted to the lens system sequentially via the opening of the external shell, the part of the transparent plate, the second opening, and the first opening or emitted out from the opening of the external shell in a reverse order.

6. The camera device according to claim 1, wherein the bottom plate has a concave part, the base of the fastening member is accommodated in the concave part of the bottom plate.

7. The camera device according to claim 1, wherein the optical system frame is made of a plastic material and the cover plate comprises a flat metal plate.

8. The camera device according to claim 1, wherein the lens system comprises at least two lenses and an aperture stop.

9. The camera device according to claim 8, wherein the aperture established by the at least one shutter blade is smaller than or equal to the aperture of the aperture stop of the lens system.

10. A camera device, which is disposed in an electronic apparatus, comprising:
    an optical system frame;
    the electronic apparatus having an external shell with an opening exposed;
    a lens system deployed in the external shell of the electronic apparatus and mounted on the optical system frame;
    a bottom plate having a first opening, the bottom plate being fastened to the optical system frame or formed by extending from the optical system frame, the bottom plate further having a concave part formed thereon;
    a cover plate having a second opening, the cover plate being distanced away from the bottom plate;
    a fastening member having a base and an elongated part extending from the base, the base of the fastening member being accommodated in the concave part of the bottom plate, and the elongated part of the fastening member penetrating the concave part of the bottom plate and being fastened to the cover plate; and at least one shutter blade disposed between the cover plate and the bottom plate, configured to adjust an aperture of the camera device, wherein light rays are transmitted to the lens system sequentially via the opening of the external shell, the first opening of the bottom plate, and an aperture established by the shutter blade, and the second opening of the cover plate, or emitted out from the opening of the external shell in a reverse order.

11. A camera device with adjustable aperture, comprising:
an optical system frame;
a lens system mounted on the optical system frame;
a plate configured to be fastened to the optical system frame or be formed by extending the optical system frame, the plate having an aperture;
a shutter blade coupled to the plate, the aperture of the plate being completely pervious to light when the shutter blade is at a first position, the aperture of the plate being partially pervious to light when the shutter blade is at a second position; and
a driver connecting to the shutter blade for causing a displacement of the shutter blade,
wherein the optical system frame comprises:
a supporting base;
a driver supporting base; and
a lens supporting base,
wherein at least two of or all of the supporting base, the driver supporting base, and the lens supporting base are integratedly formed.

12. The camera device according to claim 11, wherein the shutter blade has a hole disposed thereon, a diameter of the hole of the shutter blade is less than that of the aperture of the plate.

13. The camera device according to claim 12, wherein the driver makes the hole of the shutter blade move to a position overlapping the aperture of the plate.

14. The camera device according to claim 12, further comprising an additional shutter blade coupled to the plate.

15. The camera device according to claim 14, wherein the shutter blade and the additional shutter blade are disposed crossover from each other.

16. The camera device according to claim 15, further comprising an additional driver connecting to the additional shutter blade, the additional driver causing a displacement of the additional shutter blade.

17. The camera device according to claim 16, wherein the additional shutter blade has an additional hole disposed thereon, and wherein the additional driver makes the additional hole of the additional shutter blade move to a position overlapping the aperture of the plate.

18. The camera device according to claim 11, further comprising a cover plate configured to be distanced away from the plate, the shutter blade being disposed between the cover plate and the plate.

19. The camera device according to claim 11, wherein the shutter blade is pivotably connected to the plate.

20. The camera device according to claim 11, wherein the driver is configured to drive the shutter blade to a turn-on position or a turn-off position; wherein when the driver drives the shutter blade to the turn-off position, the aperture of the camera device is defined by the size of the hole of the shutter blade.

21. The camera device according to claim 20, wherein the shutter blade comprises an arc contour, and wherein when the driver drives the shutter blade to the turn-on position, the arc contour of the shutter blade corresponds to a part of contour of the aperture of the plate.

22. The camera device according to claim 11, wherein the shutter blade is pivotably disposed on the optical system frame, the driver has a rotating rod which is driven by the driver and thus moves in an arc orbit, the shutter blade has an applying hole disposed thereon, the rotating rod penetrates the applying hole, the rotating rod applies force to the applying hole when rotates under control of the driver, thereby bringing out the shutter blade to move toward the turn-on position or the turn-off position.

23. The camera device according to claim 17, wherein the additional shutter blade is pivotably disposed on the optical system frame, the additional driver has a rotating rod which is driven by the additional driver and thus moves in an arc orbit, the optical system frame has an orbital hole corresponding to the arc orbit, the additional shutter blade has an applying hole disposed thereon, the rotating rod penetrates the orbital hole and the applying hole, the rotating rod applies force to the applying hole when rotates under control of the additional driver, thereby bringing out the additional shutter blade to move toward the turn-on position or the turn-off position.

24. The camera device according to claim 11, wherein the supporting base is configured to mount the plate and the shutter blade thereon; the driver supporting base is configured to mount the driver; and the lens supporting base is configured to mount a lens in the lens system thereon.

25. The camera device according to claim 24, wherein the driver supporting base is disposed between the supporting base and the lens supporting base, and the driver is disposed at a lateral side of the driver supporting base.

26. The camera device according to claim 11, wherein the lens system comprises:
a lens group establishing an optical axis, the lens group comprising a first negative lens, a second positive lens, a third lens, a fifth lens and a fourth positive lens arranged in order from an image side to an object side, wherein the first negative lens has an image-side surface which is a concave face and has a point of inflection arranged thereon; the second positive lens comprises a concave surface facing the object side and a convex surface facing the image side; the third lens is a plano-concave lens; the fourth lens is a meniscus convex lens; the fifth lens is a meniscus convex lens and disposed between the third lens and the fourth lens;
a first aperture stop disposed between the image side and the lens of the lens group at the most object side; and
a second aperture disposed between the object side and a lens of the lens group at the most object side;
the camera device further comprising:
a cover plate spaced apart from the plate and fastened to the plate;
a transparent plate attached to the optical system frame; and
wherein the lens group, the plate, the shutter blade, the cover plate, and the transparent plate are arranged in order from the image side to the object side,
wherein the shutter blade is included in the second aperture, the second aperture is altered by adjusting the shutter blade, the shutter blade is disposed between the plate and the cover plate,
wherein the lens group satisfies the following equation:

$$1.2 < (SL1+SL2)/TTL < 2.5,$$

where SL1 is a distance on the optical axis from the first aperture stop to the image plane; SL2 is a distance on the optical axis from the second aperture stop to the image plane; and TTL is a distance on the optical axis from an object-side surface of a lens of the lens group at the most object side to the image plane.

27. The camera device according to claim 11, wherein the lens system comprises:
   a lens group establishing an optical axis, the lens group comprising a first negative lens, a second positive lens, a third lens, a fifth lens and a fourth positive lens arranged in order from an image side to an object side, wherein the first negative lens has an image-side surface which is a concave face and has a point of inflection arranged thereon; the second positive lens comprises a concave surface facing the object side and a convex surface facing the image side; the third lens is a plano-concave lens; the fourth lens is a meniscus convex lens; the fifth lens is a meniscus convex lens and disposed between the third lens and the fourth lens; and
   a first aperture stop and a second aperture stop separately located on the optical axis;
   the camera device further comprising:
   a cover plate spaced apart from the plate and fastened to the plate; and
   a transparent plate attached to the optical system frame;
   wherein the lens group, the plate, the shutter blade, the cover plate, and the transparent plate are arranged in order from the image side to the object side;
   wherein the shutter blade is included in the second aperture, the second aperture is altered by adjusting the shutter blade, the shutter blade is disposed between the plate and the cover plate.

28. The camera device according to claim 11, wherein the lens s stem comprises:
   a lens group establishing an optical axis, the lens group comprising a first lens, a second lens, a third lens, and a fourth positive lens arranged in order from an image side to an object side;
   a first aperture stop disposed within the lens group; and
   a second aperture disposed at the object side outside the lens group; wherein
   the lens group further comprises a fifth lens disposed between the third lens and the fourth lens, and the refractive power of the lenses of the lens group sequentially are negative, positive, negative, positive, and positive, or negative, positive, positive, negative, and positive in order from the image side to the object side, and wherein the first aperture stop is disposed between the third lens and fourth lens or between the fourth lens and the fifth lens,
   wherein the second aperture is an adjustable aperture, and the aperture of the first aperture stop is greater than that of the second aperture when the second aperture is adjusted to be in an active state;
   the camera device further comprising:
   a cover plate having an opening, the cover plate being spaced apart from the base plate and fastened to the base plate through a screw,
   wherein the lens group, the cover plate, the shutter blade, and the plate are arranged in order from the image side to the object side,
   wherein the shutter blade is included in the second aperture, the second aperture is altered by adjusting the shutter blade, the shutter blade is disposed between the plate and the cover plate.

* * * * *